US008364795B2

(12) United States Patent
Meyerzon et al.

(10) Patent No.: US 8,364,795 B2
(45) Date of Patent: Jan. 29, 2013

(54) SEARCH SERVICE ADMINISTRATION WEB SERVICE PROTOCOL

(75) Inventors: Dmitriy Meyerzon, Bellevue, WA (US); Boxin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 12/766,703

(22) Filed: Apr. 23, 2010

(65) Prior Publication Data

US 2011/0145218 A1 Jun. 16, 2011

Related U.S. Application Data

(60) Provisional application No. 61/285,931, filed on Dec. 11, 2009.

(51) Int. Cl.
G06F 15/177 (2006.01)
(52) U.S. Cl. ........................................ 709/221; 707/709
(58) Field of Classification Search .................. 709/221; 707/709
See application file for complete search history.

(56) References Cited

U.S. PATENT DOCUMENTS

| | | | |
|---|---|---|---|
| 7,349,959 B2 | 3/2008 | Imamura et al. | 709/223 |
| 7,529,840 B2 | 5/2009 | Bocq et al. | 709/227 |
| 7,552,109 B2 | 6/2009 | Balasubramanian et al. | 707/3 |
| 2005/0081039 A1 | 4/2005 | Lee et al. | 713/176 |
| 2006/0218143 A1 | 9/2006 | Najork | 707/6 |
| 2007/0276816 A1 | 11/2007 | Sample et al. | 707/3 |
| 2009/0019106 A1 | 1/2009 | Loupia | 709/203 |
| 2009/0125469 A1 | 5/2009 | McDonald et al. | 706/47 |

OTHER PUBLICATIONS

Guo, Qi, "Schema Driven and Topic Specific Web Crawling," May 4, 2005, Retrieved from the internet: URL: (http://www.springerlink.com/content/q6wtguechv5cv4t3/fulltext.pdf), 6 pp.
Hammer, Joachim, "Using Mobile Crawlers to Search the Web Efficiently," International Journal of Computer and Information Science, 1:1, pp. 36-58, 2000, Retrieved from the internet: URL: <http://citeseerx.ist.psu.edu/viewdoc/download?doi=10.1.1.19.7820&rep=repl&type=pdf>, 23 pp.
Kreger, Heather, "Web Services Conceptual Architecture (WSCA 1.0)," May 2001, Retrieved from the internet: URL: <http://www.cs.uoi.gr/~zarras/mdw-ws/WebServicesConceptualArchitectu2.pdf>, 41 pp.

Primary Examiner — John Follansbee
Assistant Examiner — Glenford Madamba
(74) Attorney, Agent, or Firm — Merchant & Gould, P.C.

(57) ABSTRACT

The embodiments described herein generally relate to a method and system for enabling a client to configure and control the crawling function available through a crawl configuration Web service. A client is able to configure and control the crawling function by defining the URL space of the crawl. Such space may be defined by configuring the starting point(s) and other properties of the crawl. The client further configures the crawling function by creating and configuring a content source and/or a crawl rule. Further, a client defines authentication information applicable to the crawl to enable the discovery and retrieval of electronic documents requiring authentication and/or authorization information for access thereof. A protocol governs the format, structure and syntax (using a Web Services Description Language schema) of messages for communicating to and from the Web crawler through an application programming interface on a server hosting the crawler application.

11 Claims, 9 Drawing Sheets

SEARCH SERVICE ADMINISTRATION WEB SERVICE PROTOCOL

CROSS-REFERENCE TO RELATED APPLICATION

This application claims the benefit of U.S. Provisional Application Ser. No. 61/285,931, filed on Dec. 11, 2009, and entitled, "SEARCH ADMIN WEB SERVICE PROTOCOL." The entirety of the aforementioned application is incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright.COPYRGT. 2010, Microsoft Corp.

BACKGROUND

Computer users access networks, such as the Internet, on a frequent basis for the discovery and retrieval of information and data. For example, particular types of content and data are searched for and accessed on the World Wide Web ("the Web"), in which the Web is a system on the Internet of interlinked electronic documents. The Web provides access to a multitude of Web sites, in which a Web site is a collection of related Web pages or other digital resources associated with a common Uniform Resource Locator (URL). Each Web site typically has multiple files and related resources that are held by a Web server and may be accessed through a network, including the Internet and/or a local area network (LAN). A Web server stores and distributes electronic documents associated with the particular Web site hosted by the Web server. These electronic documents may also include embedded hyperlinks, or other links, that reference other electronic documents, data, Web pages, Web sites, etc. Electronic documents are distributed in a format, such as Hypertext Markup Language (HTML), for example.

With the plethora of data available on the Web, computer applications have been developed to "crawl" the multitude of Web documents stored on the numerous Web servers connected to the Web to search for particular documents and/or data for retrieval. A "crawl" process thus includes traversing the URL space, in which links in the electronic documents are discovered and followed as well. Given the vast amounts of data available on the Web, such "Web crawling" may be nearly boundless and time-consuming. As a result, an exorbitant number of documents may be retrieved, causing network bandwidth to be consumed unnecessarily while hampering resource efficiency. Further, if the number of documents retrieved with regard to a particular search is particularly large, a user may not have the time or resources to carefully filter through such documents to find meaningful information. Further yet, some data may not be retrieved at all if authentication or authorization requirements at particular Web sites prevent the crawling of related Web documents. Consequently, electronic documents with valuable information to the user may be missed altogether.

Although specific problems have been addressed in this Background, this disclosure is not intended in any way to be limited to solving those specific problems.

SUMMARY

Embodiments generally relate to enabling a client, such as a client computer, to configure and control the Web crawling function provided by a crawling application of a search service application, in which such crawling application is referred to herein generally as a "Web search service." For example, in embodiments, a client configures and controls the crawling function of the index server provided by the Search Services of MICROSOFT OFFICE SHAREPOINT SERVER 2007 produced by MICROSOFT CORPORATION of Redmond, Wash. An index server is a server having the task of crawling, among other tasks. Configuring and controlling the Web crawling function allows a client to define the space crawled by the index server, such as by defining the Uniform Resource Locator (URL) space of the crawl. The URL space is defined, for example, by configuring the starting point(s) and restriction rule(s), or crawl rule(s), for the crawl. In particular embodiments, a content source is defined, in which a content source specifies the type of content to be crawled and the start addresses, e.g., URL addresses, for the content. A crawl rule is defined in embodiments as a set of preferences applicable to a specific URL or range of URLs and is used to include or exclude items in the crawl and/or to specify the content access account to use when crawling the URL or range of URLs. The configuration and control of the Web crawling function is also accomplished in embodiments by allowing the client to define authentication information, e.g., credentials, for use during a crawl to allow access to certain electronic documents, for example, or other data. Configuring a crawl also enables the client to control such features as when the crawl occurs, the duration of the crawl, etc.

The configuration and control of the Web search service by the client is enabled in embodiments by providing an application programming interface for receiving specific method calls, and providing responses thereto, for invoking the functionality of the Web search service to create specific parameters for the URL spaces, crawl rules, and credential data, for example. The format and procedures governing the transmittal and receipt of data at such application programming interface is provided by a protocol, such as the Search Service Administration Web Service protocol in accordance with embodiments disclosed herein. Inputs are received from a client for such method calls to the Web search service. The Web search service processes such inputs to configure the crawl function and sends a response to the client.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numerals refer to like items.

DETAILED DESCRIPTION

Figure 1:
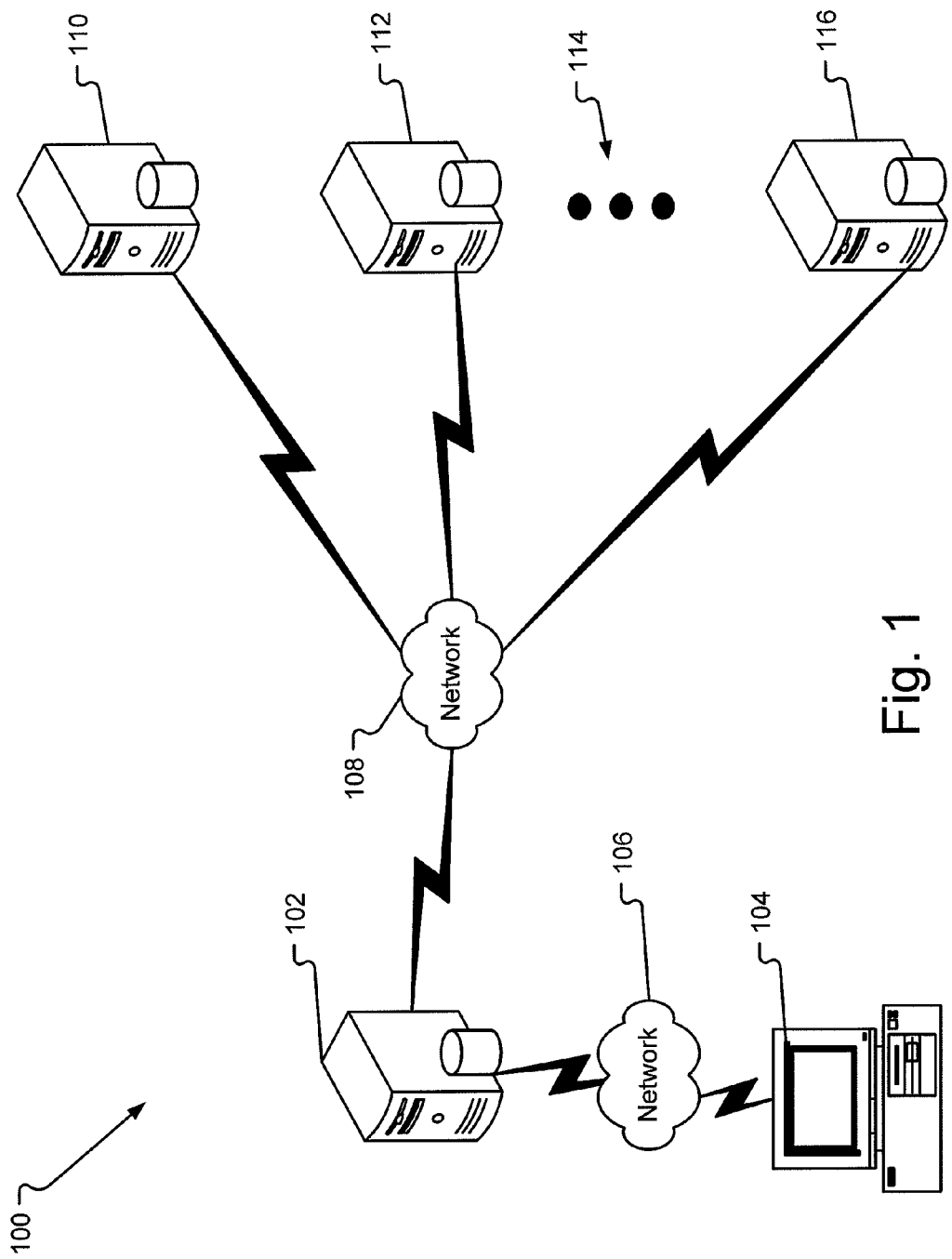
FIG. 1 illustrates an example logical representation of an environment or system for configuring the crawling function of a search service application in accordance with an embodiment of the present disclosure.

This disclosure will now more fully describe example embodiments with reference to the accompanying drawings, in which specific embodiments are shown. Other aspects may, however, be embodied in many different forms and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments generally relate to enabling a client to configure, and thus control, the crawling function of a search service application server having crawl functionality. A "crawl" process involves traversing a URL space, for example, for content in electronic documents associated with the URL space that satisfies search criteria. Links, such as hyperlinks, embedded in the electronic documents are also discovered and followed. However, according to embodiments, a given crawl is configured to prevent it from following links outside of desired boundaries of the URL space. Such control is accomplished by defining restriction rules, or "crawl rules" to restrict the boundaries of the crawl. In other embodiments, a crawl is configured not to restrict its reach but, rather, to allow it to access content by providing it with necessary authentication and/or authorization information applicable to such content.

In accordance with embodiments, the noted configuration and control of the Web search service by a client is enabled by providing an application programming interface (API) on the protocol server hosting the Web search service, or crawler application. The API processes request messages and response messages, such as messages related to configuration changes of the crawler function of the Web search service, so as to facilitate interaction between a "protocol client," for example, and the Web search service. In embodiments, the API processes request messages to put such messages in the proper format, structure, and syntax for calling the functionality of the Web search service. Such format, structure, and syntax are governed by a protocol, such as the Search Service Administration Web Service protocol according to embodiments disclosed herein. Specific methods and rules are thus defined, in accordance with the Search Service Administration Web Service protocol, for creating specific parameters for the URL spaces, crawl rules, content sources, and credential data, for example. The Search Service Administration Web Service protocol thus provides the formatting and syntax to use for defining the specific methods and rules for calling the functionality of the Web search service, providing responses thereto, and/or otherwise generally handling communications between the protocol client and a protocol server hosting the Web search service. The Search Service Administration Web Service protocol is offered for example purposes as a type of protocol to be used in accordance with embodiments disclosed herein. Other types and names of protocols providing the same or similar functionality may be used without departing from the spirit and scope of the present disclosure.

In an embodiment, the protocol client is a software module with functionality, for example, for: presenting a user interface (UI) for receiving configuration requests and input and displaying configuration response messages, receiving inputs for a configuration request, formatting the received input data into a request message, transmitting the message to the Web server hosting the Web search service, and receiving and processing any received responses from the Web search service, for example. In accordance with embodiments disclosed herein, the protocol client is stored on the client computer and is executed by the client computer's processor. In another embodiment, the protocol client is downloaded at the client computer through a Web browser, such as MICROSOFT INTERNET EXPLORER produced by MICROSOFT CORPORATION of Redmond, Wash. Various types of browsers can be used in accordance with embodiments disclosed herein. Further, while embodiments disclosed herein relate to crawls of Web sites, for example, the content to be crawled can also include specific systems, such as MICROSOFT SHAREPOINT sites, file systems, and internal and external Web sites.

In an embodiment, the protocol client presents a user interface for allowing a user to enter inputs for configuring a crawl function. For example, in an embodiment, a user indicates that for a given crawl, the crawl rule is "case sensitive," meaning that only URLs of matching links (matching uppercase and lowercase letters) are crawled. In an embodiment, the user interface for receiving configuration inputs from a user is obtained through a Web search service Web site that is identified by a URL known by the protocol client. Authentication and authorization for accessing the Web search service Web site is performed through the protocol client, and the use of any number of types of authentication and authorization protocols can be used in accordance with embodiments disclosed herein. In another embodiment, the user interface for receiving configuration inputs from a user is stored in memory on the client computer itself or removable storage means and is retrieved by clicking an icon, box, etc., to launch a Web crawl.

Upon receiving the user inputs, the protocol client formats the message, in accordance with the Search Service Administration Web Service protocol, for example, with the proper format and syntax for communicating to the Web crawler. The protocol client also uses other protocols for formatting the message for transmittal to the Web service. For example, an appropriate messaging protocol and an appropriate transport protocol are used for transmitting the message to the Web service. An example of a messaging protocol for formatting a request for transmittal to the Web search service is the Simple Object Access Protocol (SOAP) messaging protocol. An example of a transport protocol for transmitting the formatted request is the Hypertext Transfer Protocol Secure (HTTPS) protocol. These protocols are offered by way of example only. Any number of types of messaging and transport protocols can be used in embodiments disclosed herein.

In accordance with embodiments disclosed herein, upon receipt of a message requesting configuration of the crawl function, the Web search service processes the message and determines whether the configuration request is allowable. If allowable, the Web search service makes the appropriate configuration to the crawl function and sends a response message, in accordance with the Search Service Administration Web Service protocol, and through the application programming interface, to the protocol client indicating the configuration change, for example. If the configuration request is not allowable (for example, by specifying a restriction rule that already exists or conflicts with another rule), the Web search service sends a response message to the protocol client indicating a fault message or other error or indication that the requested configuration was not made or is not available.

An example logical environment or system 100 for enabling a protocol client to configure and control a crawl function of a crawler application hosted by a protocol server, or Web server, is shown in FIG. 1 in accordance with embodiments disclosed herein. A protocol server 102 hosting a search service application with a crawler application (a "Web search service") is connected to network 108 for enabling the crawler application to search the content, e.g., Web sites, held by Web servers 110, 112, and 116. In embodiments, any number of Web servers 110, 112, and 116 can be used, as shown by ellipses 114. Each Web site typically has multiple files and resources held by a Web server, such as Web servers 110, 112, 114, and 116. Web servers 110, 112, 114, and 116 distribute electronic documents associated with the particular Web sites. Storage capabilities for storing such electronic documents are shown by the databases adjacent to, or attached to, Web servers 110, 112, and 116. In embodiments, such storage means are housed within the Web servers. Protocol server 102 hosting the Web search service is also connected to client computer 104 through network 106. Client computer 104 is thus able to send configuration requests for controlling the crawling function of the Web search service through network 106 and is able to receive response messages regarding such configuration requests through network 106 as well. Any type of client computer 104 can be used in accordance with embodiments disclosed herein.

Logical environment 100 is not limited to any particular implementation and instead embodies any computing environment upon which the functionality of the environment described herein may be practiced. Further, networks 106 and 108, although shown as individual single networks may be any types of networks conventionally understood by those of ordinary skill in the art. In accordance with an example embodiment, the network may be the global network (e.g., the Internet or World Wide Web, i.e., "Web" for short). It may also be a local area network, e.g., intranet, or a wide area network. In accordance with embodiments, communications over networks 106 and 108 occur according to one or more standard packet-based formats, e.g., H.323, IP, Ethernet, and/or ATM.

Further, any type of environment or system can be used in accordance with embodiments of the present disclosure. FIG. 1 is offered as an example only for purposes of understanding the teachings of the embodiments disclosed herein. For example, FIG. 1 shows servers 102, 110, 112, 114, and 116. However, embodiments also cover any type of server, separate servers, server farm, or other message server. Further yet, FIG. 1 shows client computer 104. However, any type of small computer device can be used without departing from the spirit and scope of the embodiments disclosed herein. Indeed, environment or system 100 represents a valid way of practicing embodiments disclosed herein but is in no way intended to limit the scope of the present disclosure. Further, the example network environment 100 may be considered in terms of the specific components described, e.g., protocol server, client computer, etc., or, alternatively, may be considered in terms of the analogous modules corresponding to such units.

Although only one client computer 104 is shown, for example, another embodiment provides for multiple small computer devices to communicate with Web server 102. In an embodiment, each small computer device communicates with the network 106, or, in other embodiments, multiple and separate networks communicate with the small computer devices. In yet another embodiment, each small computer device communicates with a separate network.

Figure 2:
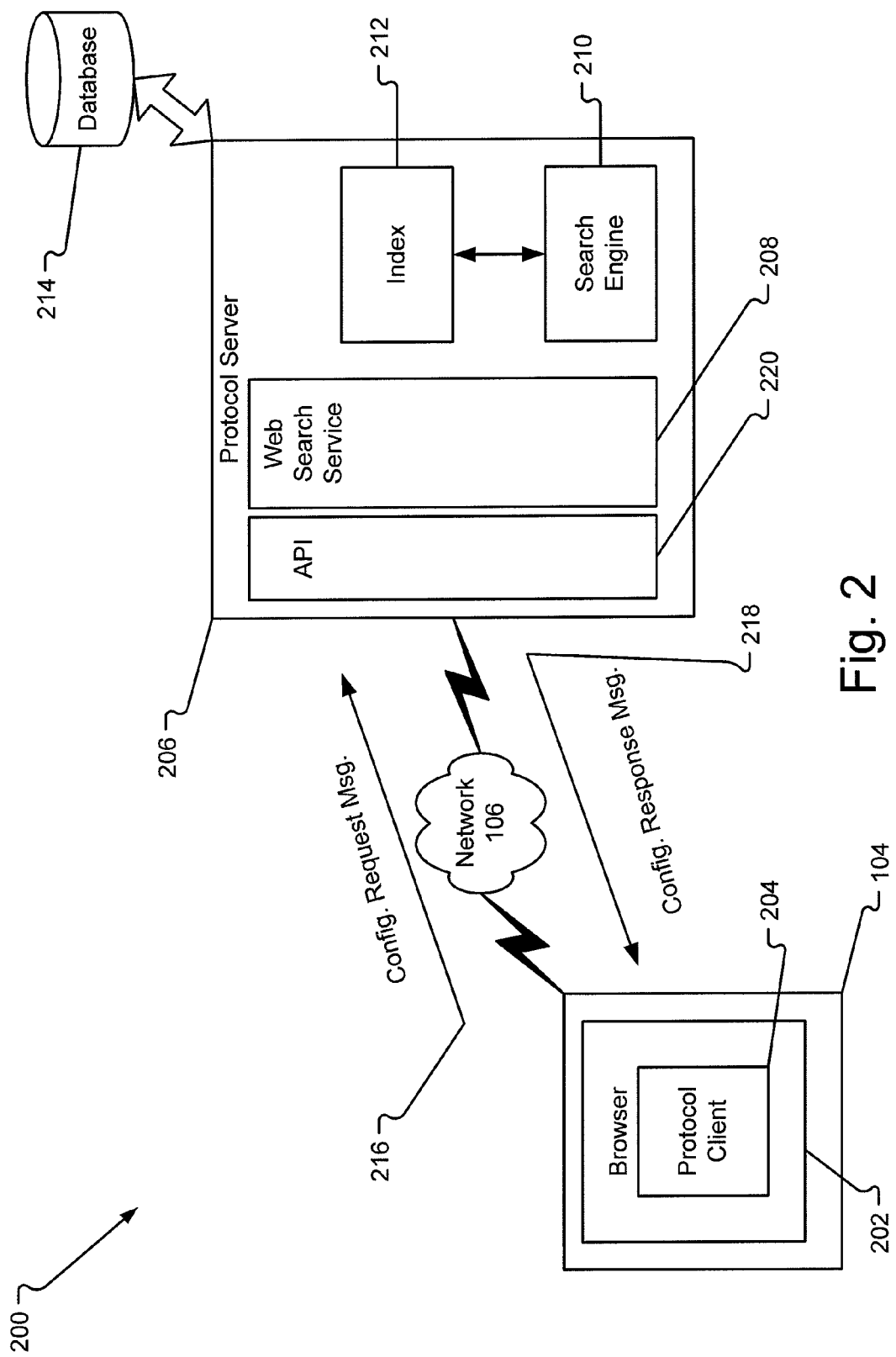
FIG. 2 depicts a logical representation of example functional component modules for an index server hosting the search service application depicted in FIG. 1 for configuring the crawling function in accordance with an embodiment of the present disclosure.

While FIG. 1 shows example environment or system 100 for configuring a crawl function on the Web search service, FIG. 2 illustrates example software functional modules 200 corresponding to such computing units for enabling such configuration by a protocol client in accordance with embodiments disclosed herein. Storage means 214 are also depicted in FIG. 2. These storage means and functional modules are offered by way of example only. Numerous types of modules, components, or storage means can be used in accordance with embodiments disclosed herein. At client computer 104, browser 202 retrieves protocol client 204. For example, in an embodiment, protocol client 204 is downloaded at client computer 104 through a Web browser, such as MICROSOFT INTERNET EXPLORER, produced by MICROSOFT CORPORATION of Redmond, Wash. Any type of browser can be used in accordance with embodiments disclosed herein. In other embodiments, the protocol client is already downloaded or otherwise available in non-removable or removable memory associated with client computer 104. Protocol client 204 receives input data from a user in accordance with embodiments. In other embodiments, protocol client 204 receives input data from another computing device(s) and/or computer program(s). Upon receiving input data indicating the configuration desired, protocol client 204 formats such data into a request message for Web search service 208. Configuration request message 216 is transmitted across network 106 to protocol server 206.

Protocol server 206, which may also be referred to as an "index server," "Web server," or "server" in general, hosts Web search service 208. As discussed above, Web search service 208 is a crawler application in embodiments disclosed herein. In further embodiments, the crawler application is part of a general search application. While configuration request message 216 is transmitted to Web search service 208 hosted by protocol server 206, a general search request (not shown) is transmitted to search engine 210 in protocol server 206 in other embodiments disclosed herein. For example, specific search criteria are provided in a search request to protocol server 206, and search engine 210 uses index 212 to determine if any electronic documents in index 212 satisfy the specified search criteria. Electronic documents are cataloged in index 212 during a crawl, in which the protocol server 206, or index server 206, produces data structures including an index catalog (not shown) and metadata index (not shown) with regard to retrieved electronic document(s). In an embodiment, where an index catalog already exists, index server 206 produces entries in the index catalog (not shown) to reflect information regarding the retrieved electronic document(s). The index catalog and metadata index are then used in later search requests to efficiently respond to such search queries. In other embodiments, where electronic documents are not found in index 212, Web search service 208 is invoked to "crawl" the Web, for example, in search of electronic documents satisfying the search criteria.

In embodiments where a configuration request message 216 is sent from protocol client 104, API 220 on protocol server 206 acts as the interface between protocol client 204 and protocol server 206. API 220 thus processes the configuration request message 216, determines that is a type of message that is appropriate for the Web search service, e.g., a request to perform a crawl or configuration of a crawl function in accordance with the Search Service Administration Web Service protocol, for example, and, according to embodiments, puts it into a format understandable by the Web search service 208. Upon receipt of configuration request message 216, Web search service 208 determines whether the configuration request is allowable and configures the crawl function if the request is allowable. Web search service 208 uses API 220 to facilitate communication of a response message 218, in accordance with the Search Service Administration Web Service protocol, to protocol client 204 and produces a response message 218 to the configuration request. Configuration response message 218 is then transmitted over network 106 to protocol client 204. In embodiments, such configuration response message 218 includes the configuration information made to the crawl function. In other embodiments, configuration response message 218 includes fault information, indicating, for example, that an authorization has failed or the configuration request could not be otherwise performed.

Figure 3:
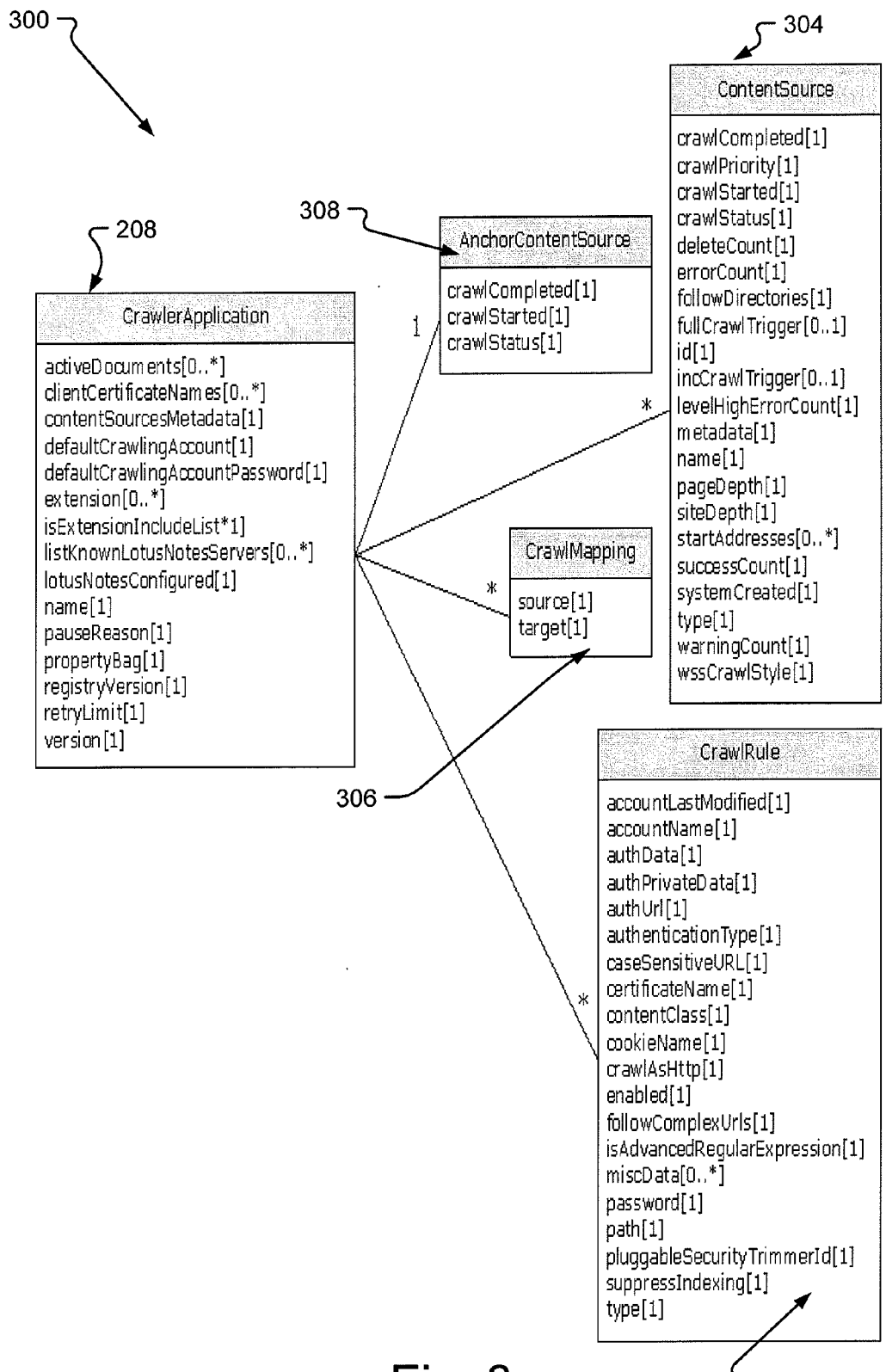
FIG. 3 illustrates an object hierarchy for a crawler application of the search service application depicted in FIGS. 1 and 2 in accordance with an embodiment of the present disclosure.

While FIG. 2 shows Web search service 208, FIG. 3 depicts object hierarchy 300 maintained by protocol server 206 and representing the state of the protocol, such as the Search Administration Web Service protocol for Web search service 208. As discussed above, the Search Service Administration Web Service protocol governs the format, structure, and syntax of messages to communicate to the Web crawler. Properties of the objects shown in object hierarchy 300 affect the behavior of protocol server 206 during crawl processes. The top level of object hierarchy 300 is crawler application 208. As noted, crawler application 208 may also be referred to as Web search service 208 (labeled as such in FIG. 2). In embodiments, one instance of crawler application 208 exists per search service application. An example embodiment disclosed herein provides for the following properties of crawler application 208 (as illustrated in FIG. 3), in accordance with the Search Service Administration Web Service protocol:

activeDocuments: The list of URLs of items currently being crawled by the index server.
  clientCertificateNames: The list of names of X.509 client certificates used by crawl rules with authentication type of 3.
  contentSourcesMetadata: A custom metadata string associated with the crawler application. The value of this property is ignored by the protocol server, but can be interpreted by the protocol client to associate arbitrary metadata with the collection of content sources.
  defaultCrawlingAccount: The account name that the index server uses to authenticate itself during the crawl, (unless a specific account is specified in a matching crawl rule).
  defaultCrawlingAccountPassword: The password required for authentication of the defaultCrawlingAccount
  extension: A list of file name extensions recognized by the index server. The index server parses all links discovered during the crawl and extracts the file extension from them. The file extension is checked against the extension list. Depending on the setting of isExtensionIncludeList property the link, in embodiments, can be discarded or added to the crawl queue.
  isExtensionIncludeList: A Boolean value that specifies whether the list of file extensions in extension is an inclusion list or an exclusion list. If true, extension is an inclusion list; otherwise, extension is an exclusion list.
  listKnownLotusNotesServers: The list of known Lotus Notes server names. This is specific for crawl configuration for Lotus Notes content sources.
  lotusNotesConfigured: If true, the Lotus Notes configuration was complete. This is specific for crawl configuration of the Lotus Notes content source. The configuration details for a Lotus Notes content source is specific to the implementation of the index server, but the protocol server, in embodiments, is aware when the Lotus Notes configuration took place and communicates this information to the protocol client.
  name: A GUID that uniquely identifies the crawler application.
  pauseReason: A 32-bit number that contains the set of reasons why the search catalog is paused. Each bit indicates a particular reason. If there is more than one reason why the search catalog was paused, multiple bits corresponding to the reasons are turned on. The search catalog is resumed when all bits are turned off. In embodiments, only the following bits are turned on:

| Value | Meaning |
| --- | --- |
| 0x00000001 | Internal pause, not initiated by the protocol client. |
| 0x00000002 | Internal pause, not initiated by the protocol client. |
| 0x00000004 | Paused for back-up/restore. |
| 0x00000008 | Paused for query component initialization. |
| 0x00000010 | Internal pause, not initiated by the protocol client. | propertyBag: A collection of name/value pairs for storing arbitrary values. A value can be retrieved using the same name with which it was stored previously.
  registryVersion: The version of the settings stored in the registry for this crawler application. The version is incremented whenever the settings are updated.
  retryLimit: The number of times the index server will retry fetching the item from any content source, (for example, a Web server) during the crawl in case certain types of recoverable protocol errors occur, for example, timeouts.
  version: The configuration version of this crawler application. The version, in accordance with embodiments, is incremented when the application state is updated by the protocol client. Any method that updates the application state requires the last known configuration version from the protocol client. If the protocol client version does not match with the current application version, the operation fails. This will typically happen when multiple protocol clients try to update the application state at the same time.

In addition, FIG. 3 depicts "Content Source" 304. A content source is a set of options for specifying the type of content to be crawled and the start addresses, e.g., URL addresses, for the content to be indexed. A content source thus includes a plurality of start addresses from which to start a crawl, in accordance with embodiments disclosed herein. In an embodiment, crawler application 208 depicted in FIG. 3 includes content source objects 304. In another embodiment, crawler application 208 includes zero content source objects. The content source objects 304 represent content sources used to start a crawl. The following example properties apply to Content Source 304 in accordance with embodiments disclosed herein:

crawlCompleted: The timestamp of when the last crawl was completed for this content source.

crawlPriority: Priority of crawl processing this content source. In embodiments, the following values apply:

| Value | Meaning |
| --- | --- |
| 1 | Normal |
| 2 | High. When picking the next URL to crawl from the crawl queue, the protocol server, in an embodiment, gives preferential consideration to URL's discovered from crawling high priority content sources over URL's discovered from crawling normal priority content sources. | crawlStarted: The timestamp of when the last crawl was started for this content source.

crawlStatus: Identifies whether a crawl for this content source is running, what type of crawl it is, (full crawl or incremental crawl), and what the crawl status is.

deleteCount: The number of items deleted during the last crawl.

errorCount: The number of items, (during the last crawl), where the crawler attempted to crawl the items, but did not succeed.

followDirectories: If true, only links provided by the repository being crawled are followed during the crawl, and links discovered within items are discarded. If false, only links discovered within items are followed.

fullCrawlTrigger: Defines the full crawl schedule. The crawl can be started either by explicit request from the protocol client, or automatically, at specified points of time, according to the schedule.

id: The unique identifier of the content source in the collection. Assigned by the protocol server when a new content source is added.

incCrawlTrigger: Defines the incremental crawl schedule.

levelHighErrorCount: The number of important items crawled with error during the last crawl.

metadata: The arbitrary metadata associated by the protocol client with the content source. The value of this property is ignored by the protocol server, but can be interpreted by the protocol client to associate arbitrary metadata with the collection of content sources.

name: The content source name. This is the label intended to be read in user interfaces, for example by search administrators.

pageDepth: The maximum permitted depth of the URL space traversal, including traversal within a single site or across different sites. Whenever a link is followed by the index server during the crawl the depth counter is incremented. The depth counter cannot increase beyond the pageDepth of the content source. For example, if the pageDepth is 1 and Page A links to Page B, which links to Pages C and D, then neither pages C nor D will be crawled because the depth counter would exceed pageDepth.

siteDepth: The depth of the URL space traversal in terms of authority hops. This is analogous to the pageDepth variable, but at a domain level. A server domain hop is made when a link points to a URL from a different server domain. Whenever a link is followed by the index server during the crawl to a different host (or item repository server), the site depth counter is incremented. The site depth counter cannot exceed the siteDepth of the content source.

startAddress: The start address URL. The first step of starting the crawl is to add the start address URLs to the crawl queue. The crawl then begins by following links from these start addresses.

successCount: The number of items successfully crawled during the last crawl.

systemCreated: If true, the content source was created during the initial system configuration and cannot be deleted by the protocol client. Any content sources added by the protocol client will have the systemCreated set to false.

type: The content source type. This type is used by the crawler as a hint to determine which technology to use to crawl the repository pointed to by the start addresses. In embodiments, one of the following values applies:

| Value | Meaning |
| --- | --- |
| 0 | Enables specifying settings that control the depth of crawl for a Web site based on start address server, host hops and page depth |
| 1 | Enables specifying settings that control the depth of crawl for a Web site based on discovering everything under the hostname for each start address or only crawling the site collection of each start address |
| 2 | Lotus Notes database |
| 3 | File shares |
| 4 | Exchange public folders |
| 5 | Custom |
| 6 | Legacy<2> Business Data Catalog |
| 8 | Custom search connector |
| 9 | Business Data Connectivity (BDC) | warningCount: The number of items crawled with warning during the last crawl.

wssCrawlStyle: The type of the crawl performed while crawling sites. In embodiments, this is one of the following values:

| Value | Meaning |
| --- | --- |
| CrawlVirtualServers | The entire Web applications pointed to by start addresses are crawled. |
| CrawlSites | Only the specific sites pointed by the start addresses are crawled without enumerating all sites in the Web application. | throttleBegin: This property is not interpreted by the protocol server. It can be set and retrieved by the protocol client.

throttleDuration: This property is not interpreted by the protocol server. It can be set and retrieved by the protocol client.

In further embodiments, crawler application 208 includes an ordered collection of zero or more crawl rule objects 302. Crawl rules define the URL space of the crawl. For example, crawl rules are used to restrict the URL space of the crawl in certain embodiments. When a link is discovered in a crawl, the crawl rule(s) is checked to determine if the item should be included or excluded from the crawl. In embodiments, crawl rules in crawl rule object 302 contain one or more wildcard expressions for determining matches against the URLs of discovered links. In such determinations, all characters in a discovered link are matched exactly against the crawl rule expression, with the exception of the wildcard characters. According to embodiments disclosed herein, the "*" and "?" wildcard characters are allowed in defining crawl rules with wildcards. Where wildcard characters and expressions are used, embodiments provide for determining the crawl behavior of a link according to the first rule found to match the link. In further embodiments, a crawl rule specifies authentication parameters for accessing items matching certain URLs. The following example properties apply to crawl rule object 302 according to embodiments of the present disclosure:

accountLastModified: The last date the authentication information of the crawl rule was changed.

accountName: The user name for integrated authentication or basic authentication.

authData: When authenticationType is 4, this is the portion of the opaque authentication BLOB used for forms-based authentication that does not need to be stored securely.

authPrivateData: When authenticationType is 4, this is the portion of the opaque authentication BLOB used for forms-based authentication that needs to be stored securely.

authUrl: When authenticationType is 4, this property contains the authentication method and URL.

authenticationType: The authentication type the index server will use for the matching URLs.

caseSensitiveURL: If true, links are matched in a case sensitive manner, and URLs of matching links are not normalized to lower case; otherwise, links are matched in a case insensitive manner, and URLs of matching links are normalized to lower case.

certificateName: When authenticationType is 3, this is the X.509 certificate used for authentication.

contentClass: Arbitrary metadata for the crawl rule. The content of this property can be interpreted by the index server as additional context used during the crawl of a particular item repository. As far as this protocol is concerned, the value of this property can be modified and retrieved by the protocol client.

cookieName: When authenticationType is 5, this is the opaque cookie used for cookie based authentication.

crawlAsHttp: If true, matching links with an HTTP: scheme are crawled using the HTTP protocol, regardless of the default protocol normally used to crawl the repository. Crawling with the HTTP protocol implies that the process relies on discovered links instead of getting the repository to provide the set of links that need to be crawled.

followComplexUrls: If true, links that have query components as described in [RFC2396], section 3.4 are followed by the crawl; otherwise, links that have query components are discarded, even if the crawl rule type is 0. [RFC2396] ("Request for Comments: 2396—Uniform Resource Identifiers (URI): Generic Syntax," The Internet Society, 1998) is incorporated by reference herein in its entirety.

isAdvancedRegularExpression: If true, regular expression syntax is used to match links; otherwise, regular expression syntax is not used.

miscData: When authenticationType is 4 or 5, this is a list of URLs that correspond to the error pages for forms-based authentication.

password: The account password for integrated authentication or basic authentication.

path: The wildcard expression of the crawl rule. This also serves as a unique identifier of the crawl rule in the collection.

pluggableSecurityTrimmerId: The protocol server can interpret this property as an identifier of a component that can validate if a user issuing the search query has read permission on the item. Any item corresponding to the link matching this crawl rule will be assigned the security trimmer identifier if the pluggableSecurityTrimmerId was set for the crawl rule.

suppressIndexing: If true, content of the URLs matching the crawl rule are not indexed, even if the crawl rule type is set to 0, (include). The links discovered from the matching URLs can still be followed during the crawl.

type: If 0, the links matching the crawl rule are included in the crawl URL Space; otherwise, excluded.

Default access implies integrated authentication using credentials of the default crawl account for the crawler application. The following examples of possible implementation of various authentication types by the index server are provided for information only. The details are specific to the protocol server implementation.

Integrated authentication using the account credentials specified for the crawl rule.

Basic authentication, in embodiments, is accomplished by passing the account and the password to the item repository in plain text.

Authentication using certificates, in embodiments, is accomplished by presenting to the item repository a valid client certificate by the index server.

Forms-based authentication, in embodiments, is accomplished by issuing an HTTP GET or HTTP POST against a specified form URL with required fields, acquiring a cookie from the form server and presenting the cookie in subsequent HTTP requests.

Cookie based authentication, in embodiments, is accomplished by presenting a persistent cookie in the HTTP requests to the item repository.

In embodiments disclosed herein, crawler application 208 also includes an anchor content source 308, which represents the status of an anchor crawl. An anchor crawl, according to an embodiment, is the process of adding the text that is included with a hyperlink to a full-text index catalog. The text included with a hyperlink describes the target content of the hyperlink in embodiments. This text is referred to as "anchor text," for example. Further, a "full-text index catalog" is defined in embodiments as a collection of full-text index components and other files organized in a specific directory structure and containing the data needed to perform queries. In turn, a full-text index component is defined in an embodiment as a set of files that contain all of the index keys extracted from a set of items, in which an index key is a key referencing a record in a content index file or a scope index file and consisting of an index key string and a property identifier. Properties of the anchor content source 308 include the following according to embodiments of the present disclosure:

crawlStatus: The status of the anchor crawl. crawlStatus specifies whether the anchor crawl is currently in progress or not.

crawlStarted: The timestamp of when the last anchor crawl started.

crawlCompleted: The timestamp of when the last anchor crawl completed.

Anchor content source object 308 thus allows crawler application 208 to track the start and end times of an anchor crawl, according to embodiments described herein.

According to the embodiment depicted in FIG. 3, crawler application 208 also includes zero or more crawl mapping objects 306. In an embodiment, a crawl mapping is a mapping of an access URL and a display URL of an item. Protocol server 206 uses the access URL of a crawled item to obtain the item from a content source, including an item repository, for example. Further, protocol server 206 uses the display URL as a URL of the item to store in a metadata index. The display URL is the address of the item according to embodiments. Protocol server 206 returns the display URL of the item to a client, e.g., a user, in response to a search query requesting such item. During a crawl process, each item's access URL and display URL are checked against the crawl mapping objects, which contain a Source property and a Target property. A match occurs if any prefix of the URL covering complete path segments equals the Source property or Target property of the mapping. If more than one mapping matches the URL, the mapping that matches the longest prefix is used. As an example, http://site/pathseg1/pathseg2/file.htm matches http://site, or http://site/pathseg1, or http://site/pathseg1/pathseg2, but does not match http://site/pathse or http://saite/pathseg1/path. If the access URL matches the Source property of the mapping, the matching prefix is replaced by the Target property to construct the display URL, while preserving the suffix of the URL. In embodiments, the crawl mappings collection does not allow mappings with duplicate Source or Target properties:

Source: source URL prefix for access URLs

Target: target URL prefix for the display URLs.

Returning to FIG. 2, crawler application 208 (Web search service 208) receives configuration request messages from, and transmits configuration response messages (including fault messages) to, protocol client 204. Examples of these configuration messages include the following, which are communicated in operations, such as Web Services Description Language (WSDL) operations for example, according to embodiments of the present disclosure and in accordance with the format and syntax of messages communicated to the Web crawler as governed by the Search Service Administration Web Service protocol:

| WSDL Operation | Description |
| --- | --- |
| AddAdvancedCrawlRule | This operation is used to create a new crawl rule for the crawler application. It allows two more parameters to be specified than the AddCrawlRule operation. |
| AddContentSource | This operation is used to create a new content source in the crawler application. |
| AddCrawlMapping | This operation creates a new crawl mapping for the crawler application. |
| AddCrawlRule | This operation is used to create a new crawl rule for the crawler application. |
| AddExtension | This operation is used to add a file extension to the file extensions collection contained in the crawler application. |
| CatalogPauseStatus | This operation is used to retrieve the pauseReason property of the crawler application. |
| ClearExtensionList | This operation is used to empty the list of file extensions recognized by the index server. |
| EditContentSource | This operation is used to edit the content source properties in the crawler application. |
| GetConnectorProperty | This operation is used to retrieve a previously stored value from the propertyBag collection of the crawler application. |
| GetContentSources | This operation is used to get information about all the content sources for the specified project of the crawler application. |
| GetContentState | This operation is used to retrieve the states and various properties of the crawler application. |
| GetCrawlMappings | This method is used to retrieve all crawl mappings existing in the crawler application. |
| GetCrawlRuleList | This operation is used to retrieve the crawler application's list of crawl rules. |
| GetExtensionList | This operation is used to retrieve the crawler application's list of file extensions. |

-continued

| WSDL Operation | Description |
| --- | --- |
| GetVersion | This operation is used to retrieve the configuration version of the crawler application. |
| IncreaseRegistryVersion | This operation is used increase the registry version of the crawler application by one. |
| IncrementVersion | This operation is used to increase the configuration version of the crawler application by one. |
| IsAnchorCrawlIdle | This operation is used to check if an anchor crawl in the crawler application is in progress. |
| IsCaseSensitiveURL | This operation is used to check if the crawler application treats the specified URL in a case sensitive manner. |
| IsCatalogPauseCompleted | This operation is used to check if the action of pausing all crawls on the crawler application for the specified reason has been completed. |
| IsDeleteCrawlInProgress | This operation is used to check if a delete crawl in the crawler application is in progress. |
| IsExtensionIncludeList | This operation is used to determine whether the file extensions list in the crawler application is an inclusion list or an exclusion list. |
| ListKnownLotusNotesDatabases | This operation is used to retrieve a list of known Lotus Notes database names for a given Lotus Notes server name. |
| PauseCrawl | This operation is used to pause a crawl of a content source of the crawler application. |
| RefreshAnchorContentSource | This method is used to retrieve the current status of the anchor content source of the crawler application. |
| RefreshContentSource | This operation is used to retrieve the current status of a content source from the crawler application. |
| RemoveContentSource | This operation is used to remove a content source from the crawler application. |
| RemoveCrawlMapping | This method is used to remove a crawl mapping from the crawler application. |
| RemoveCrawlRule | This operation removes a crawl rule from the crawler application. |
| RemoveExtension | This operation is used to remove a file extension from the extensions list defined for the crawler application. |
| ResumeCrawl | This operation is used to resume a crawl of a content source of the crawler application. |
| SetConnectorProperty | This operation is used to store a value in the propertyBag collection of the crawler application. |
| SetContentSourcesMetadata | This operation is used to set the metadata property associated with the crawler application. This metadata string, in embodiments, is intended for protocol client use only, the protocol server just stores it without interpreting. Once set, metadata string can be obtained by calling GetContentSources operation. |
| SetCrawlRuleCredentials | This operation is used to configure the authentication method and crawl account for a crawl rule. |
| SetCrawlRuleCredentials2 | This operation is used to configure the authentication method and crawl account for a crawl rule. |
| SetCrawlRulePriority | This operation is used to modify the order of the crawl rules in the ordered collection of the crawl rules in the crawler application. |
| SetDefaultGatheringAccount | This operation is used to set the default crawl account for the crawler application. |
| SetIsExtensionIncludeList | This operation is used to set whether the list of file extensions in the crawler application is an inclusion list or an exclusion list. |

| WSDL Operation | Description |
| --- | --- |
| SetRetryLimit | This operation is used to set the retry limit for the crawler application. |
| StartCrawl | This operation is used to start a crawl of a content source of the crawler application. |
| StartRankingUpdate | This operation is used to start the anchor crawl of the anchor content source. |
| StopCrawl | This operation is used to stop a crawl of a content source of the crawler application. |
| TestCrawlRule | This operation is used to check if a specified URL matches the specified crawl rule. |
| TestCrawlRules | This operation is used to find the first crawl rule in the crawler application's crawl rules collection that matches a specified URL |
| UpdateCrawlRule | This operation is used to update a crawl rule for the crawler application. |
| ValidateScheduleTrigger | This operation is used to validate that a trigger, as specified in [MS-TSCH], 2.4.2.11|Triggers, can be used to schedule a crawl. [MS-TSCH] ("Task Scheduler Service Remoting Protocol Specification," MICROSOFT CORPORATION of Redmond, Washington, © 2010 MICROSOFT CORPORATION) is incorporated by reference herein in its entirety. |
| WaitForInProgressAnchorCrawlToComplete | This operation is used to wait until no anchor crawl is in progress. |

While the above messages are included in WSDL operations in embodiments described herein, such is offered by way of example. Other language can be used for such operations in accordance with other embodiments disclosed herein and without departing from the spirit and scope of the present disclosure. "WSDL" operations are offered by way of example only.

The messages transmitted between protocol client 204 and protocol server 206 thus allow for configuring the crawling function of Web search service 208, in accordance with embodiments described herein. In embodiments, these messages comprise a structure, format and syntax consistent with the Search Service Administration Web Service protocol. For example, the AddAdvancedCrawlRule operation allows protocol client 204 to create a new crawl rule, including specifying parameters for the rule, for crawler application 208. With the AddAdvancedCrawlRule operation, protocol client 204 sends an ISearchApplicationAdminWebService_AddAdvancedCrawlRule_InputMessage request message 216. Protocol server 206 responds with an ISearchApplicationAdminWebService_AddAdvancedCrawlRule_OutputMessage response message 218 as follows:

Before responding, protocol server 206 determines whether the request message is allowable. For example, the path specified, in embodiments, is not a valid regular expression. Or, in other embodiments, the length of the path exceeds a maximum number of characters. The following response message applies in embodiments:

If is AdvancedRegularExpression is true, the protocol server, in embodiments, throws a FaultException<ExceptionDetail> message when path is not a valid regular expression.

The protocol server, in embodiments, normalizes the path element from the request message as follows:

If the path is empty or contains only white-space characters, the protocol server, in embodiments, throws a FaultException<ExceptionDetail> message.

If the length of the path is greater than or equal to 2048 characters, the protocol server, in embodiments, throws a FaultException<ExceptionDetail> message.

If the path is a UNC path expression, the protocol server, in embodiments, converts it to the URL with a "file" URL scheme as described in [RFC2396], 3.1|Scheme Component.

```
<wsdl:operation name="AddAdvancedCrawlRule">
    <wsdl:input
wsam:Action="http://tempuri.org/ISearchApplicationAdminWebService/AddAdvanc
edCrawlRule"
message="tns:ISearchApplicationAdminWebService_AddAdvancedCrawlRule_Input
Message"/>
    <wsdl:output
wsam:Action="http://tempuri.org/ISearchApplicationAdminWebService/AddAdvanc
edCrawlRuleResponse"
message="tns:ISearchApplicationAdminWebService_AddAdvancedCrawlRule_Outp
utMessage"/>
</wsdl:operation>
```

If the path is not a UNC path expression, the protocol server, in embodiments, replaces all '\' characters with the '/' character.

If the URL scheme, as described in [RFC2396], 3.1|Scheme Component is not specified in the path, the protocol server, in embodiments, prepends path with the "http" scheme.

If prepending the path with the "http" scheme causes the length of the resulting path to become greater than or equal to 2048 characters, the protocol server, in embodiments, throws a FaultException<ExceptionDetail> message.

If the host name in the path contains a '@' character, a '#' character, a '|' character, or a white-space character, the protocol server, in embodiments, throws a FaultException<ExceptionDetail> message.

If the URL scheme as described in [RFC2396], 3.1|Scheme Component in the path is "http" or "https", the protocol server, in embodiments, converts it to a URL encoded string.

If a crawl rule with the same normalized path already exists in the crawler application, the protocol server, in embodiments, throws a FaultException<ExceptionDetail> message.

If the protocol server has not thrown an exception, it, in embodiments, now creates a new crawl rule with:
path property set to the normalized path
isIncludeRule property set to the isIncludeRule element from the request message
is AdvancedRegularExpression property set to the is AdvancedRegularExpression element from the request message.
caseSensitiveURL property set to the caseSensitiveUR element from the request message.

The protocol server, in embodiments, adds the created crawl rule to the end of the crawl rules collection in the crawler application.

If the crawl rule was successfully added, the protocol server, in embodiments, returns the normalized path property of the newly created crawl rule in the AddCrawlRuleResult element of the response message.

On error, the protocol server, in embodiments, sends a FaultException<ExceptionDetail> message to the protocol client.

Examples of the request, or input, message for configuring the crawl function with the AddAdvancedCrawlRule operation include:
ISearchApplicationAdminWeb-
    Service_AddAdvancedCrawlRule_InputMessage
The requested WSDL message for the AddAdvanced-CrawlRule WSDL operation.
The SOAP action value is:
    http://tempuri.org/ISearchApplicationAdminWeb-
        Service/AddAdvancedCrawl Rule
The SOAP body contains the AddAdvancedCrawlRule element.
Input data for such a request message includes, in embodiments, the following:
The input data for the AddAdvancedCrawlRule WSDL operation.

```
<xs:element name="AddAdvancedCrawlRule">
    <xs:complexType>
        <xs:sequence>
```

-continued

```
            <xs:element minOccurs="0" name="versionIn"
    type="xs:int"/>
            <xs:element minOccurs="0" name="currentUser"
    nillable="true" type="xs:string"/>
            <xs:element minOccurs="0" name="isIncludeRule"
    type="xs:boolean"/>
            <xs:element minOccurs="0"
    name="isAdvancedRegularExpression" type="xs:boolean"/>
            <xs:element minOccurs="0" name="caseSensitiveUR"
    type="xs:boolean"/>
            <xs:element minOccurs="0" name="path" nillable="true"
    type="xs:string"/>
        </xs:sequence>
    </xs:complexType>
</xs:element>
``` versionIn: The configuration version of the crawler application. This element, in embodiments, contains a value greater than or equal to zero.

currentUser: User name of the current logged on user, used for auditing purposes.

isIncludeRule: An interpretation of the rule which, in embodiments, contains one of the values specified in the following table.

| Value | Meaning |
| --- | --- |
| 0 | Inclusion rule. URLs matching the path are included in the crawl. |
| 1 | Exclusion rule. URLs matching the path are not included in the crawl. | isAdvancedRegularExpression: If true, regular expression syntax is used to match links; otherwise, regular expression syntax is not used.

caseSensitiveUR: If true, links are matched in a case sensitive manner, and URLs of matching links are not normalized to lower case; otherwise, links are matched in a case insensitive manner, and URLs of matching links are normalized to lower case.

path: A crawl rule path expression. In embodiments, the path is present and the length is greater than 0 and less than 2048 characters.

In turn, examples of the response, or output, message for the AddAdvancedCrawlRule operation include:
ISearchApplicationAdminWeb-
    Service_AddAdvancedCrawlRule_OutputMessage
The response WSDL message for the AddAdvancedCrawlRule method.
The SOAP action value is:
    http://tempuri.org/ISearchApplicationAdminWebService/
        AddAdvancedCrawlRuleResponse
The SOAP body contains the AddAdvancedCrawlRuleResponse element.
The result data for the response message for the AddAdvancedCrawlRuleResponse operation includes, for example:

```
<xs:element name="AddAdvancedCrawlRuleResponse">
    <xs:complexType>
        <xs:sequence>
            <xs:element minOccurs="0"
```

```
            name="AddAdvancedCrawlRuleResult" nillable="true"
            type="xs:string"/>
        </xs:sequence>
    </xs:complexType>
</xs:element>
```

AddAdvancedCrawlRuleResult: The normalized crawl rule path expression used by the protocol server. In embodiments, this expression is present and the length is greater than 0 and less than 2048 characters.

In another embodiment, the configuration request involves retrieving a previously stored value from a "propertyBag" collection of crawler application 208 through the use of the "GetConnector" message operation. As shown in FIG. 3, the "propertyBag" is a property of crawler application 208 and includes a collection of name/value pairs for storing arbitrary values. The "propertyBag" property thus allows a value to be retrieved using the name with which it was stored. An example configuration request message 216 for this operation includes: ISearchApplicationAdminWebService_GetConnectorProperty_InputMessage. An example configuration response message 218 includes: ISearchApplicationAdminWebService_GetConnectorProperty_OutputMessage. An example input/output operation is as follows:

```
<wsdl:operation name="GetConnectorProperty">
    <wsdl:input
wsam:Action="http://tempuri.org/ISearchApplicationAdminWebService/GetConnect
orProperty"
message="tns:ISearchApplicationAdminWebService_GetConnectorProperty_InputM
essage"/>
    <wsdl:output
wsam:Action="http://tempuri.org/ISearchApplicationAdminWebService/GetConnect
orPropertyResponse"
message="tns:ISearchApplicationAdminWebService_GetConnectorProperty_Output
Message"/>
</wsdl:operation>
```

The following response messages, e.g., fault messages, are provided by protocol server 206 in accordance with embodiments disclosed herein:
- If the name element in the request message is null or empty, the protocol server, in embodiments, throws a FaultException<ExceptionDetail> message.
- If there is no name/value pair with the same name in the propertyBag collection of the crawler application as the name element in the request message, the protocol server, in embodiments, throws a FaultException<ExceptionDetail> message.
- The protocol server, in embodiments, returns value corresponding to the requested name in the GetConnectorPropertyResult element of the response message.
- On error, the protocol server, in embodiments, sends a FaultException<ExceptionDetail> message to the protocol client.

In embodiments, input data for the GetConnectorProperty operation include, for example:

```
<xs:element name="GetConnectorProperty">
    <xs:complexType>
        <xs:sequence>
            <xs:element minOccurs="0" name="name" nillable="true"
```
```
            type="xs:string"/>
        </xs:sequence>
    </xs:complexType>
</xs:element>
``` name: The name for which to retrieve the corresponding value. In embodiments, the name is less than or equal to 16369 characters.

Output data for the configuration response message includes, in embodiments, the following for the GetConnectorProperty message operation:
The result data for the GetConnectorProperty WSDL operation.

```
<xs:element name="GetConnectorPropertyResponse">
    <xs:complexType>
        <xs:sequence>
            <xs:element minOccurs="0"
            name="GetConnectorPropertyResult" nillable="true"
            type="xs:string"/>
        </xs:sequence>
    </xs:complexType>
</xs:element>
```

GetConnectorPropertyResult: String value corresponding to the name element of the request message.

Further, the action values for the GetConnectorProperty operation, using the SOAP protocol for example, include in embodiments:
ISearchApplicationAdminWebService_GetConnectorProperty_InputMessage The requested WSDL message for the GetConnectorProperty WSDL operation.

The SOAP action value is:

http://tempuri.org/ISearchApplicationAdminWebService/GetConnectorProperty

The SOAP body contains the GetConnectorProperty element.

ISearchApplicationAdminWebService_GetConnectorProperty_OutputMessage

The response WSDL message for the GetConnectorProperty method.

The SOAP action value is:

http://tempuri.org/ISearchApplicationAdminWebService/GetConnectorPropertyResponse The SOAP body contains the GetConnectorPropertyResponse element.

In other embodiments, configuration request message 216 includes an IncrementRegistryVersion message for increasing the registry version of crawler application 208 by a value, such as by "one," for example. Request message 216 includes, for example: ISearchApplicationAdminWebService_IncreaseRegistryVersion_InputMessage. Response message 218 includes, for example: ISearchApplicationAdminWebService_IncreaseRegistryVersion_OutputMessage. An example input/output operation is as follows:

```
<xs:element name="IncreaseRegistryVersion">
    <xs:complexType>
        <xs:sequence/>
    </xs:complexType>
</xs:element>
```

```
<wsdl:operation name="IncreaseRegistryVersion">
    <wsdl:input
wsam:Action="http://tempuri.org/ISearchApplicationAdminWebService/IncreaseRegistryVersion"
message="tns:ISearchApplicationAdminWebService_IncreaseRegistryVersion_InputMessage"/>
    <wsdl:output
wsam:Action="http://tempuri.org/ISearchApplicationAdminWebService/IncreaseRegistryVersionResponse"
message="tns:ISearchApplicationAdminWebService_IncreaseRegistryVersion_OutputMessage"/>
</wsdl:operation>
```

With this type of configuration request, protocol server 206, in embodiments, increases the registryVersion of crawler application 208 by one, for example. If an error exists in incrementing the registryVersion, protocol server 206 sends a FaultException<ExceptionDetail> message to protocol client 204. The following input and output message and input/output data are examples of operations for this configuration type:

ISearchApplicationAdminWebService_IncreaseRegistryVersion_InputMessage

The requested WSDL message for the IncreaseRegistryVersion WSDL operation.

The SOAP action value is:

http://tempuri.org/ISearchApplicationAdminWebService/IncreaseRegistryVersion

The SOAP body contains the IncreaseRegistryVersion element.

ISearchApplicationAdminWebService_IncreaseRegistryVersion_OutputMessage

The response WSDL message for the IncreaseRegistryVersion method.

The SOAP action value is:

http://tempuri.org/ISearchApplicationAdminWebService/IncreaseRegistryVersionResponse The SOAP body contains the IncreaseRegistryVersionResponse element.

The input data for the IncreaseRegistryVersion WSDL operation.

The result data for the IncreaseRegistryVersion WSDL operation.

```
<xs:element name="IncreaseRegistryVersionResponse">
    <xs:complexType>
        <xs:sequence/>
    </xs:complexType>
</xs:element>
```

Embodiments also provide for the "IncrementVersion" message operation, in which the configuration version of crawler application 208 is increased by a value, such as by "one," for example. Request message 216 for such an operation includes, for example: ISearchApplicationAdminWebService_IncrementVersion_InputMessage. Protocol server 206 responds with response message 218: ISearchApplicationAdminWebService_IncrementVersion_OutputMessage. An example input/output operation is as follows:

```
    <wsdl:input
wsam:Action="http://tempuri.org/ISearchApplicationAdminWebService/IncrementVersion"
message="tns:ISearchApplicationAdminWebService_IncrementVersion_InputMessage"/>
    <wsdl:output
wsam:Action="http://tempuri.org/ISearchApplicationAdminWebService/IncrementVersionResponse"
message="tns:ISearchApplicationAdminWebService_IncrementVersion_OutputMessage"/>
</wsdl:operation>
```

Fault messages are sent by protocol server 206 in the following situations, for example:

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

On success, the protocol server, in embodiments, returns the updated configuration version of the crawler application in the IncrementVersionResult element in the response message.

On error, the protocol server, in embodiments, sends a FaultException<ExceptionDetail> message to the protocol client.

The following input and output messages and input/output data are examples of operations for this IncrementVersion configuration of crawler application 208, in accordance with embodiments herein:

ISearchApplicationAdminWeb-
Service_IncrementVersion_InputMessage The requested WSDL message for the IncrementVersion WSDL operation.

```
<wsdl:operation name="SetConnectorProperty">
    <wsdl:input
wsam:Action="http://tempuri.org/ISearchApplicationAdminWebService/SetConnecto
rProperty"
message="tns:ISearchApplicationAdminWebService_SetConnectorProperty_InputMe
ssage"/>
    <wsdl:output
wsam:Action="http://tempuri.org/ISearchApplicationAdminWebService/SetConnecto
rPropertyResponse"
message="tns:ISearchApplicationAdminWebService_SetConnectorProperty_Output
Message"/>
</wsdl:operation>.
```

The SOAP action value is:
   http://tempuri.org/ISearchApplicationAdminWeb-
      Service/IncrementVersion
The SOAP body contains the IncrementVersion element.
ISearchApplicationAdminWeb-
   Service_IncrementVersion_OutputMessage
The response WSDL message for the IncrementVersion method.
The SOAP action value is:
   http://tempuri.org/ISearchApplicationAdminWeb-
      Service/IncrementVersionResponse
The SOAP body contains the IncrementVersionResponse element.
The input data for the IncrementVersion WSDL operation.

```
<xs:element name="IncrementVersion">
    <xs:complexType>
        <xs:sequence>
    <xs:element minOccurs="0" name="versionIn" type="xs:int"/>
        </xs:sequence>
    </xs:complexType>
</xs:element>
``` versionIn: The configuration version of the crawler application. This element, in embodiments, contains a value greater than or equal to 0.
The result data for the IncrementVersion WSDL operation.

```
<xs:element name="IncrementVersionResponse">
    <xs:complexType>
        <xs:sequence>
```

```
    <xs:element minOccurs="0" name="IncrementVersionResult"
type="xs:int"/>
        </xs:sequence>
    </xs:complexType>
</xs:element>
```

IncrementVersionResult: The configuration version of the crawler application. This element, in embodiments, contains a value greater than or equal to 0.

In other embodiments, a configuration request is made to store a value in the "propertyBag" collection of crawler application 208. For example, the "SetConnectorProperty" message operation allows for such storage with a configuration request message 216 of: ISearchApplicationAdminWeb-Service_SetConnectorProperty_InputMessage. In turn, a configuration response message 218, for example, is: ISearchApplicationAdminWeb-Service_SetConnectorProperty_OutputMessage. An example input/output operation is as follows:

Protocol server 206 responds with fault messages in embodiments described as follows, for example:
   If the name element in the request message is null or empty, the protocol server, in embodiments, throws a FaultException<ExceptionDetail> message.
   If the value element in the request message is null, the protocol server, in embodiments, throws a FaultException<ExceptionDetail> message.
   If there is a name/value pair with the same name as the name element in the request message, the protocol server, in embodiments, updates the value of the existing pair with the value element in the request message. Otherwise, the protocol server, in embodiments, creates a new pair with the requested name and value.
   On error, the protocol server, in embodiments, sends a FaultException<ExceptionDetail> message to the protocol client.

The following input and output message and input/output data are examples of operations for this type of configuring of crawler application 208 by setting connector properties, as described in embodiments herein:
   ISearchApplicationAdminWeb-
      Service_SetConnectorProperty_InputMessage
   The requested WSDL message for the SetConnectorProperty WSDL operation.
   The SOAP action value is:
   http://tempuri.org/ISearchApplicationAdminWebService/
      SetConnectorProperty
   The SOAP body contains the SetConnectorProperty element.
   ISearchApplicationAdminWeb-
      Service_SetConnectorProperty_OutputMessage
   The response WSDL message for the SetConnectorProperty method.

The SOAP action value is:
http://tempuri.org/ISearchApplicationAdminWebService/SetConnectorPropertyResponse The SOAP body contains the SetConnectorPropertyResponse element.

The input data for the SetConnectorProperty WSDL operation.

```
<xs:element name="SetConnectorProperty">
<xs:complexType>
    <xs:sequence>
        <xs:element minOccurs="0" name="name" nillable="true"
        type="xs:string"/>
        <xs:element minOccurs="0" name="value" nillable="true"
        type="xs:string"/>
    </xs:sequence>
</xs:complexType>
</xs:element>
``` name: The name for which to store the corresponding value. In embodiments, the name is less than or equal to 16369 characters.

value: The value to store. In embodiments, the value is less than or equal to 4000 characters.

The result data for the SetConnectorProperty WSDL operation.

```
        <xs:element name="SetConnectorPropertyResponse">
            <xs:complexType>
                <xs:sequence/>
            </xs:complexType>
        </xs:element>
```

Further embodiments provide for configuring the crawler function of crawler application 208 by defining credentials for authentication purposes for the crawl rule. For example, the "SetCrawlRuleCredentials2" message operation is used in accordance with embodiments disclosed herein to configure the authentication method and crawl account for a crawl rule. A crawl account is a user account having access to the content traversed by a crawl component, according to embodiments. For such an authentication configuration request message 216, the following request message 216 is used in embodiments: ISearchApplicationAdminWebService_SetCrawlRuleCredentials2_InputMessage. A configuration response message 218 includes the following in embodiments: ISearchApplicationAdminWebService_SetCrawlRuleCredentials2_OutputMessage. An example input/output operation for this configuration request and response is as follows:

```
<wsdl:operation name="SetCrawlRuleCredentials2">
    <wsdl:input
wsam:Action="http://tempuri.org/ISearchApplicationAdminWebService/SetCrawlRul
eCredentials2"
message="tns:ISearchApplicationAdminWebService_SetCrawlRuleCredentials2_Inp
utMessage"/>
    <wsdl:output
wsam:Action="http://tempuri.org/ISearchApplicationAdminWebService/SetCrawlRul
eCredentials2Response"
message="tns:ISearchApplicationAdminWebService_SetCrawlRuleCredentials2_Out
putMessage"/>
</wsdl:operation>.
```

Further, the following messages are sent and/or actions taken based on the request message received, in accordance with embodiments disclosed herein:

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

If the authentication type specified by the authType element of the request message is not one of the allowed values, the protocol server, in embodiments, throws a FaultException<ExceptionDetail> message.

The protocol server, in embodiments, normalizes the path element of the request message the same way it normalizes the path element of the AddAdvancedCrawlRule operation request message.

If there is no crawl rule in the crawl rule collection which has a URL equal to the normalized path, the protocol server, in embodiments, throws a FaultException<ExceptionDetail> message.

The protocol server updates the authType property of the crawl rule from the corresponding parameter of the method.

If the authType is 0, the protocol server, in embodiments, sets the accountName property of the crawl rule to empty string, and the password property of the crawl rule to an empty string.

If the authType is 1, the protocol server, in embodiments, sets the accountName property of the crawl rule to the value of authString1, and the password property of the crawl rule to the value of authString2. The protocol server, in embodiments, validates the correctness of the credentials on the index server. If credentials are not valid, the protocol server, in embodiments, throws a FaultException<ExceptionDetail> message.

If the authType is 2, the protocol server, in embodiments, sets the accountName property of the crawl rule to the value of authString1 element, and the password property of the crawl rule to the value of authString2 element.

If the authType is 3, the protocol server, in embodiments, sets the certificateName property of the crawl rule to the value of authString1 element.

If the authType is 4, the protocol server, in embodiments, sets the authUrl, authData, authPrivateData, and miscData properties of the crawl rule to the values of the authString1, authString2, authString3, and authString4 elements respectively.

If the authType is 5, the protocol server, in embodiments, sets the cookieName property of the crawl rule to the value of the authString1 element, and sets the miscData property of the crawl rule to the value of the authString2 element.

If the lastModified element of the request message is not equal to 0001-01-01T00:00:00, then the protocol server, in embodiments, sets the accountLastModified property of the crawl rule to the value of the lastModified element.

On success, the protocol server, in embodiments, returns the updated configuration version of the crawler application in the SetCrawlRuleCredentialsResult element of the response message.

On error, the protocol server, in embodiments, sends a FaultException<ExceptionDetail> message to the protocol client.

The following input and output message and input/output data are examples of operations for this configuring of crawler application 208 by setting credentials to configure the authentication method and crawl account for a crawl rule, as described in embodiments herein:

ISearchApplicationAdminWebService_SetCrawlRuleCredentials2_InputMessage

The requested WSDL message for the SetCrawlRuleCredentials2 WSDL operation. The SOAP action value is:
http://tempuri.org/ISearchApplicationAdminWebService/SetCrawlRuleCredentials2

The SOAP body contains the SetCrawlRuleCredentials2 element.

ISearchApplicationAdminWebService_SetCrawlRuleCredentials2_OutputMessage

The response WSDL message for the SetCrawlRuleCredentials2 method.

The SOAP action value is:
http://tempuri.org/ISearchApplicationAdminWebService/SetCrawlRuleCredentials2Response The SOAP body contains the SetCrawlRuleCredentials2Response element.

The input data for the SetCrawlRuleCredentials2 WSDL operation.

```
<xs:element name="SetCrawlRuleCredentials2">
    <xs:complexType>
        <xs:sequence>
            <xs:element minOccurs="0" name="versionIn"
                type="xs:int"/>
            <xs:element minOccurs="0" name="currentUser"
                nillable="true" type="xs:string"/>
            <xs:element minOccurs="0" name="path" nillable="true"
                type="xs:string"/>
            <xs:element minOccurs="0" name="authType"
                type="xs:int"/>
            <xs:element minOccurs="0" name="authString1"
                nillable="true" type="xs:string"/>
            <xs:element minOccurs="0" name="authString2"
                nillable="true" type="xs:string"/>
            <xs:element minOccurs="0" name="authString3"
                nillable="true" type="xs:string"/>
            <xs:element minOccurs="0" name="authString4"
                nillable="true" type="xs:string"/>
            <xs:element minOccurs="0" name="lastModified"
                type="xs:dateTime"/>
        </xs:sequence>
    </xs:complexType>
</xs:element>
``` versionIn: The configuration version of the crawler application. This element, in embodiments, contains a value greater than or equal to zero.

currentUser: User name of the current logged on user, used for auditing purposes.

path: The path expression corresponding to the URL of the crawl rule. In embodiments, the path is present and length, in embodiments, is greater than 0 and less than 2048 characters. In embodiments, it corresponds to a path of a crawl rule in the crawler application's crawl rule collection.

authType: The type of the authentication to access matching URLs. In embodiments, it has one of the following values:

| Value | Meaning |
| --- | --- |
| 0 | Default access |
| 1 | Integrated Windows authentication |
| 2 | Basic authentication |
| 3 | Authentication using certificates |
| 4 | Forms authentication |
| 5 | Cookie based authentication | authString1:
If authType is 0, the protocol server, in embodiments, ignores this element.
If authType is 1 or 2, this element contains the information corresponding to the accountName property of the crawl rule, and the length, in embodiments, is less than 256 characters.
If authType is 3, this element contains the information corresponding to the certificateName property of the crawl rule, and the length, in embodiments, is greater than 0 characters.
If authType is 4, this element contains the information corresponding to the authUrl property of the crawl rule.
If authType is 5, this element contains the information corresponding to the cookieName property of the crawl rule.

authString2:
If authType is 0 or 3, the protocol server, in embodiments, ignores this element.
If authType is 1 or 2, this element contains the information corresponding to the password property of the crawl rule.
If authType is 4, this element contains the information corresponding to the authData property of the crawl rule.
If authType is 5, this element contains the information corresponding to the miscData property of the crawl rule.

authString3:
If authType is 0, 1, 2, 3, or 5, the protocol server, in embodiments, ignores this element.
If authType is 4, this element contains the information corresponding to the authPrivateData property of the crawl rule.

authString4:
If authType is 0, 1, 2, 3, or 5, the protocol server, in embodiments, ignores this element.
If authType is 4, this element contains the information corresponding to the miscData property of the crawl rule.

lastModified: A data time value used to derive the date the authentication information of the crawl rule was last changed. In embodiments, the value is between 0001-01-01T00:00:00 and 9999-12-31T23:59:99 inclusively.

The result data for the SetCrawlRuleCredentials2 WSDL operation.

```
<xs:element name="SetCrawlRuleCredentials2Response">
    <xs:complexType>
        <xs:sequence>
            <xs:element minOccurs="0"
            name="SetCrawlRuleCredentials2Result"
            type="xs:int"/>
        </xs:sequence>
    </xs:complexType>
</xs:element>
```

SetCrawlRuleCredentials2Result: The configuration version of the crawler application. This element, in embodiments, contains a value greater than or equal to zero.

A further message operation in embodiments includes the "IsCaseSensitiveURL" operation for checking if the crawler application treats the URL specified for the crawl in a case-sensitive manner. Configuration request message 216 includes the following example input message: ISearchApplicationAdminWebService_IsCaseSensitiveURL_InputMessage. The following configuration response message 218 applies in an embodiment: ISearchApplicationAdminWebService_IsCaseSensitiveURL_OutputMessage. Protocol server 206 returns the following response messages, for example, depending on the success of the particular configuration request for case-sensitivity:

On success, the protocol server returns, in the IsCaseSensitiveURLResult element of the response message, the flag that specifies whether the URL, specified in the strURL element of the request message, is treated in a case sensitive manner or not.

On error, the protocol server, in embodiments, sends a FaultException<ExceptionDetail> message to the protocol client.

The following input and output message and input/output data are examples of operations for this case-sensitivity configuring of crawler application 208, as described in embodiments herein:

```
<wsdl:operation name="IsCaseSensitiveURL">
    <wsdl:input
wsam:Action="http://tempuri.org/ISearchApplicationAdminWebService/IsCaseSensitiveURL"
message="tns:ISearchApplicationAdminWebService_IsCaseSensitiveURL_InputMessage"/>
    <wsdl:output
wsam:Action="http://tempuri.org/ISearchApplicationAdminWebService/IsCaseSensitiveURLResponse"
message="tns:ISearchApplicationAdminWebService_IsCaseSensitiveURL_OutputMessage"/>
</wsdl:operation>
```

ISearchApplicationAdminWebService_IsCaseSensitiveURL_InputMessage

The requested WSDL message for the IsCaseSensitiveURL WSDL operation.

The SOAP action value is:

http://tempuri.org/ISearchApplicationAdminWebService/IsCaseSensitiveURL

The SOAP body contains the IsCaseSensitiveURL element.

ISearchApplicationAdminWebService_IsCaseSensitiveURL_OutputMessage

The response WSDL message for the IsCaseSensitiveURL method.

The SOAP action value is:

http://tempuri.org/ISearchApplicationAdminWebService/IsCaseSensitiveURLResponse

The SOAP body contains the IsCaseSensitiveURLResponse element.

The input data for the IsCaseSensitiveURL WSDL operation.

```
<xs:element name="IsCaseSensitiveURL">
    <xs:complexType>
        <xs:sequence>
            <xs:element minOccurs="0" name="strURL"
            nillable="true"
            type="xs:string"/>
        </xs:sequence>
    </xs:complexType>
</xs:element>
``` strURL: A single URL or UNC path. In embodiments, this is present.

The result data for the IsCaseSensitiveURL WSDL operation.

```
<xs:element name="IsCaseSensitiveURLResponse">
    <xs:complexType>
        <xs:sequence>
            <xs:element minOccurs="0"
            name="IsCaseSensitiveURLResult" type="xs:boolean"/>
        </xs:sequence>
    </xs:complexType>
</xs:element>
```

IsCaseSensitiveURLResult: A flag that specifies whether the crawler application treats strURL in a case sensitive manner. In embodiments, this is present and is one of the following values:

| Value | Meaning |
| --- | --- |
| false | Case insensitive manner. |
| true | Case sensitive manner. |

In further embodiments, configuration request message 216, "WaitForInProgressAnchorCrawlToComplete," is used to configure the crawl function of crawler application 208 to wait until no anchor crawl is in progress before proceeding with another crawl. An example input/output operation for "WaitForInProgressAnchorCrawlToComplete" is as follows:

```
<wsdl:operation name="WaitForInProgressAnchorCrawlToComplete">
    <wsdl:input
wsam:Action="http://tempuri.org/ISearchApplicationAdminWebService/WaitForInProgress
AnchorCrawlToComplete"
message="tns:ISearchApplicationAdminWebService_WaitForInProgressAnchorCrawlToCo
mplete_InputMessage"/>
    <wsdl:output
wsam:Action="http://tempuri.org/ISearchApplicationAdminWebService/WaitForInProgress
AnchorCrawlToCompleteResponse"
message="tns:ISearchApplicationAdminWebService_WaitForInProgressAnchorCrawlToCo
mplete_OutputMessage"/>
</wsdl:operation>
```

The input request message for such an operation includes, for example: ISearchApplicationAdminWebService_WaitForInProgressAnchorCrawlToComplete_InputMessage. The output response message, in an embodiment, is: ISearchApplicationAdminWebService_WaitForInProgressAnchorCrawlToComplete_Output Message. The following applies in embodiments to such configuration messages:
- If there is no anchor crawl in progress, the protocol server, in embodiments, returns true in the WaitForInProgressAnchorCrawlToCompleteResult element of the response message.
- Otherwise, the protocol server, in embodiments, waits until anchor crawl has been completed and then returns true in the WaitForInProgressAnchorCrawlToCompleteResult element of the response message.
- On error, the protocol server, in embodiments, returns false in the WaitForInProgressAnchorCrawlToCompleteResult element of the response message.

ISearchApplicationAdminWebService_WaitForInProgressAnchorCrawlToComplete_InputMessage
The requested WSDL message for the WaitForInProgressAnchorCrawlToComplete WSDL operation.
The SOAP action value is:
http://tempuri.org/ISearchApplicationAdminWebService/WaitForInProgressAnchorCrawlTo Complete
The SOAP body contains the WaitForInProgressAnchorCrawlToComplete element.
ISearchApplicationAdminWebService_WaitForInProgressAnchorCrawlToComplete_OutputMessage
The response WSDL message for the WaitForInProgressAnchorCrawlToComplete method.
The SOAP action value is:
http://tempuri.org/ISearchApplicationAdminWebService/WaitForInProgressAnchorCrawlTo CompleteResponse
The SOAP body contains the WaitForInProgressAnchorCrawlToCompleteResponse element.
The input data for the WaitForInProgressAnchorCrawlToComplete WSDL operation.

```
<xs:element name="WaitForInProgressAnchorCrawlToComplete">
    <xs:complexType>
        <xs:sequence/>
```

```
    </xs:complexType>
</xs:element>
```

The result data for the WaitForInProgressAnchorCrawlToComplete WSDL operation.

```
<xs:element
name="WaitForInProgressAnchorCrawlToCompleteResponse">
    <xs:complexType>
        <xs:sequence>
            <xs:element minOccurs="0"
name="WaitForInProgressAnchorCrawlToCompleteResult"
type="xs:boolean"/>
        </xs:sequence>
    </xs:complexType>
</xs:element>
```

Further, the response message includes the following status information, for example:
WaitForInProgressAnchorCrawlToCompleteResult: A status of the operation. In embodiments, this status is present and is one of the following values:

| Value | Meaning |
| --- | --- |
| false | The operation was not successful. The protocol server encountered an error while waiting for an anchor crawl to complete. |
| true | The operation was successful. An anchor crawl was not in progress or has been completed after the protocol server received the request message. |

Embodiments also provide for determining whether an anchor crawl in crawler application 208 is in progress. Input request message 216 for such a determination includes, for example: ISearchApplicationAdminWebService_IsAnchorCrawlIdle_InputMessage. An example response message includes: ISearchApplicationAdminWebService_IsAnchorCrawlIdle_OutputMessage. An example input/output operation is as follows:

```
<wsdl:operation name="IsAnchorCrawlIdle">
    <wsdl:input
wsam:Action="http://tempuri.org/ISearchApplicationAdminWebService/IsAnchorCrawlIdle"
message="tns:ISearchApplicationAdminWebService_IsAnchorCrawlIdle_InputMessage"/>
    <wsdl:output
wsam:Action="http://tempuri.org/ISearchApplicationAdminWebService/IsAnchorCrawlIdle
Response"
message="tns:ISearchApplicationAdminWebService_IsAnchorCrawlIdle_OutputMessage"/>
</wsdl:operation>
```

ISearchApplicationAdminWeb-
Service_IsAnchorCrawlIdle_InputMessage

The requested WSDL message for the IsAnchorCrawlIdle WSDL operation.

The SOAP action value is:

http://tempuri.org/ISearchApplicationAdminWebService/IsAnchorCrawlIdle

The SOAP body contains the IsAnchorCrawlIdle element.

ISearchApplicationAdminWeb-
Service_IsAnchorCrawlIdle_OutputMessage

The response WSDL message for the IsAnchorCrawlIdle method.

The SOAP action value is:

http://tempuri.org/ISearchApplicationAdminWebService/IsAnchorCrawlIdleResponse

The SOAP body contains the IsAnchorCrawlIdleResponse element.

The input data for the IsAnchorCrawlIdle WSDL operation.

```
<xs:element name="IsAnchorCrawlIdle">
    <xs:complexType>
        <xs:sequence/>
    </xs:complexType>
</xs:element>
```

The result data for the IsAnchorCrawlIdle WSDL operation.

```
<xs:element name="IsAnchorCrawlIdleResponse">
    <xs:complexType>
        <xs:sequence>
            <xs:element minOccurs="0"
                name="IsAnchorCrawlIdleResult" type="xs:boolean"/>
        </xs:sequence>
    </xs:complexType>
</xs:element>
```

IsAnchorCrawlIdleResult: A flag that specifies whether an anchor crawl is in progress. In embodiments, this is present and is one of the following values:

| Value | Meaning |
|---|---|
| false | An anchor crawl is in progress. |
| true | An anchor crawl is not in progress. |

Further, embodiments also provide for "SetProperty" and "GetProperty" configuration request operations, in which a particular property of a crawl is set and retrieved. For example, such input and output messages are used in embodiments for such configuration operations:

```
<xs:element name="SetProperty">
    <xs:complexType>
        <xs:sequence>
            <xs:element minOccurs="0" name="propertyName"
                nillable="true" type="xs:string" />
            <xs:element minOccurs="0" name="value" nillable="true"
                type="xs:anyType" />
        </xs:sequence>
    </xs:complexType>
</xs:element>
<xs:element name="SetPropertyResponse">
    <xs:complexType>
        <xs:sequence>
            <xs:element minOccurs="0" name="SetPropertyResult"
                type="xs:boolean" />
        </xs:sequence>
    </xs:complexType>
</xs:element>
<xs:element name="GetProperty">
    <xs:complexType>
        <xs:sequence>
            <xs:element minOccurs="0" name="propertyName"
                nillable="true" type="xs:string" />
        </xs:sequence>
    </xs:complexType>
</xs:element>
<xs:element name="GetPropertyResponse">
    <xs:complexType>
        <xs:sequence>
            <xs:element minOccurs="0" name="GetPropertyResult"
                nillable="true" type="xs:anyType" />
        </xs:sequence>
    </xs:complexType>
</xs:element>
```

In further embodiments, configuration operations 216 and 218 are used to set and retrieve one or more properties of the content source. For example, "SetContentSourceProperty" and "GetContentSourceProperty" messages are used to set and retrieve, respectively, properties of the content source for a particular crawl. In embodiments, request and response messages for such configuration operations include:

```
</xs:element>
<xs:element name="SetContentSourceProperty">
    <xs:complexType>
        <xs:sequence>
            <xs:element minOccurs="0" name="versionIn" type="xs:int"
/>
            <xs:element minOccurs="0" name="contentSource"
    type="xs:int" />
            <xs:element minOccurs="0" name="propertyName"
    nillable="true" type="xs:string" />
            <xs:element minOccurs="0" name="value" nillable="true"
    type="xs:anyType" />
        </xs:sequence>
    </xs:complexType>
</xs:element>
            <xs:element name="SetContentSourcePropertyResponse">
    <xs:complexType>
        <xs:sequence>
<xs:element
xmlns:q22="http://schemas.datacontract.org/2004/07/Microsoft.Office.Server.Search.
Internal.Administration" minOccurs="0" name="SetContentSourcePropertyResult"
nillable="true" type="q22:ContentSourceDynamicPropsInternal" />
            </xs:sequence>
        </xs:complexType>
</xs:element>
<xs:element name="GetContentSourceProperty">
    <xs:complexType>
        <xs:sequence>
            <xs:element minOccurs="0" name="versionIn" type="xs:int"
/>
            <xs:element minOccurs="0" name="contentSource"
    type="xs:int" />
            <xs:element minOccurs="0" name="propertyName"
    nillable="true" type="xs:string" />
        </xs:sequence>
    </xs:complexType>
</xs:element>
<xs:element name="GetContentSourcePropertyResponse">
    <xs:complexType>
        <xs:sequence>
<xs:element minOccurs="0" name="GetContentSourcePropertyResult"
nillable="true" type="xs:anyType" />
        </xs:sequence>
    </xs:complexType>
</xs:element>
```

Further embodiments include example configuration operations 216 and 218 as follows:

EditContentSource: Edit the content source properties in crawler application 208. The input and output messages include, for example:
ISearchApplicationAdminWeb-Service_EditContentSource_InputMessage
ISearchApplicationAdminWeb-Service_EditContentSource_OutputMessage On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

```
<wsdl:operation name="EditContentSource">
    <wsdl:input
wsam:Action="http://tempuri.org/ISearchApplicationAdminWebService/EditContent
Source"
message="tns:ISearchApplicationAdminWebService_EditContentSource_InputMessa
ge"/>
    <wsdl:output
wsam:Action="http://tempuri.org/ISearchApplicationAdminWebService/EditContent
SourceResponse"
message="tns:ISearchApplicationAdminWebService_EditContentSource_OutputMes
sage"/>
</wsdl:operation>
```

If the content source with the identifier specified in the id element in the request message does not exist, the protocol server, in embodiments, throws a FaultException<ExceptionDetail> message.

The protocol server, in embodiments, normalizes each startAddress.string element from the request message as follows:

If the string is not a valid URI or UNC path, the protocol server, in embodiments, throws a FaultException<ExceptionDetail> message.

Convert the scheme to lowercase.

Convert the host name to lowercase.

Remove the default and empty port numbers.

Remove all trailing '/' characters.

If the string represents a local path, the protocol server, in embodiments, throws a FaultException<ExceptionDetail> message.

If the scheme is http or https, convert to a URL escaped string.

If the scheme is file, or if the string is a UNC path, and the character '*' is present in the string, the protocol server, in embodiments, throws a FaultException<ExceptionDetail> message.

If the scheme is file, convert the string to a UNC path, and replace every '/' character with the '\' character.

If the scheme is other than file, replace every '\' character with the '/' character.

If there are any duplicate startAddress.string elements in the request message, the protocol server, in embodiments, throws a FaultException<ExceptionDetail> message.

If values of any of the startAddress.string elements in the request message already exist as start addresses in another content source, the protocol server, in embodiments, throws a FaultException<ExceptionDetail> message.

The protocol server updates the content source's name, metadata, followDirectories, startAddress, fullCrawl-Trigger, incCrawlTrigger, and crawlPriority properties to the values specified in the corresponding elements in the request message, the pageDepth property to the value specified in the enumerationDepth element in the request message, and the siteDepth property to the value specified in the hostDepth element in the request message.

On success, the protocol server, in embodiments, returns the updated configuration version of the crawler application in the EditContentSourceResult element in the response message.

On error, the protocol server, in embodiments, sends a FaultException<ExceptionDetail> message to the protocol client.

ISearchApplicationAdminWeb-Service_EditContentSource_InputMessage

The requested WSDL message for the EditContentSource WSDL operation.

The SOAP action value is:

http://tempuri.org/ISearchApplicationAdminWebService/EditContentSource

The SOAP body contains the EditContentSource element.

ISearchApplicationAdminWeb-Service_EditContentSource_OutputMessage

The response WSDL message for the EditContentSource method.

The SOAP action value is:

http://tempuri.org/ISearchApplicationAdminWebService/EditContentSourceResponse

The SOAP body contains the EditContentSourceResponse element.

The input data for the EditContentSource WSDL operation.

```
<xs:element name="EditContentSource">
    <xs:complexType>
        <xs:sequence>
            <xs:element minOccurs="0" name="versionIn" type="xs:int"/>
            <xs:element minOccurs="0" name="currentUser" nillable="true" type="xs:string"/>
            <xs:element minOccurs="0" name="id" type="xs:int"/>
            <xs:element minOccurs="0" name="name" nillable="true" type="xs:string"/>
            <xs:element minOccurs="0" name="metadata" nillable="true" type="xs:string"/>
            <xs:element minOccurs="0" name="hostDepth" type="xs:int"/>
            <xs:element minOccurs="0" name="enumerationDepth" type="xs:int"/>
            <xs:element minOccurs="0" name="followDirectories" type="xs:boolean"/>
            <xs:element minOccurs="0" name="startAddresses" nillable="true" xmlns:q16="http://schemas.microsoft.com/2003/10/Serialization/Arrays" type="q16:ArrayOfstring"/>
            <xs:element minOccurs="0" name="fullCrawlTrigger" nillable="true" type="xs:base64Binary"/>
            <xs:element minOccurs="0" name="incCrawlTrigger" nillable="true" type="xs:base64Binary"/>
            <xs:element minOccurs="0" name="crawlPriority" type="xs:int"/>
        </xs:sequence>
    </xs:complexType>
</xs:element>
``` versionIn: The configuration version of the crawler application. This element, in embodiments, contains a value greater than or equal to zero.

currentUser: User name of the current logged on user, used for auditing purposes.

id: The content source identifier. The identifier, in embodiments, is greater than 0.

name: The content source name. This element, in embodiments, is present. Length of the content source name, in embodiments, is greater than 0 characters, and less than or equal to 255 characters. The specified name, in embodiments, is unique among the content source names existing in the crawler application.

metadata: Arbitrary metadata associated by the protocol client with the content source. If present, the length, in embodiments, is less than 1024 characters. The value of this property is ignored by the protocol server, but can be interpreted by the protocol client to associate arbitrary metadata with the content source collection.

hostDepth: The number of host hops allowed when crawling this content source. The value, in embodiments, is greater than or equal to 0. For unlimited host hops the number, in embodiments, is 2147483647.

enumerationDepth: The maximum number of page hops allowed when crawling this content source. The number, in embodiments, is greater than or equal to 0. For unlimited page hops the number, in embodiments, is 2147483647.

followDirectories: Determines how URLs are discovered during the crawl. If true, URLs are discovered through directory links; otherwise, URLs are discovered through links.

startAddresses: An array of zero or more start addresses. This element, in embodiments, is present. The size of the array is the number of startAddresses.string elements. Each startAddresses.string element, in embodiments, contains a single URL or UNC path of a start address, and the length, in embodiments, is less than 2048 characters.

fullCrawlTrigger: A trigger as defined in [MS-TSCH], 2.4.2.11|Triggers for scheduling full crawls. If this element is present, the content of the element, in embodiments, is a Base64 encoded trigger structure. Otherwise, no crawl schedule is defined.

incCrawlTrigger: A Trigger as defined in [MS-TSCH], 2.4.2.11|Triggers for scheduling incremental crawls. If this element is present, the content of the element, in embodiments, is Base64 encoded trigger structure. Otherwise, no crawl schedule is defined.

crawlPriority: Priority of crawl processing the content source. In embodiments, the priority is one of the following values:

| Value | Meaning |
|---|---|
| 1 | Normal |
| 2 | High |

The result data for the EditContentSource WSDL operation.

```
<xs:element name="EditContentSourceResponse">
    <xs:complexType>
        <xs:sequence>
            <xs:element minOccurs="0"
                name="EditContentSourceResult" type="xs:int"/>
        </xs:sequence>
    </xs:complexType>
</xs:element>
```

EditContentSourceResult: The configuration version of the crawler application. This element, in embodiments, contains a value greater than or equal to 0.

AddExtension: Add a file extension to the file extensions collection contained in crawler application 208.

ISearchApplicationAdminWebService_AddExtension_InputMessage

ISearchApplicationAdminWebService_AddExtension_OutputMessage

```
<wsdl:operation name="AddExtension">
    <wsdl:input
wsam:Action="http://tempuri.org/ISearchApplicationAdminWebService/AddExtensio
n"
message="tns:ISearchApplicationAdminWebService_AddExtension_InputMessage"/
>
    <wsdl:output
wsam:Action="http://tempuri.org/ISearchApplicationAdminWebService/AddExtensio
nResponse"
message="tns:ISearchApplicationAdminWebService_AddExtension_OutputMessage
"/>
</wsdl:operation>
```

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

The protocol server first removes any leading or trailing white space characters from the ext element of the request message.

The protocol server then removes the first character of the ext element if it is the '.' character.

If the ext element becomes empty, contains any white space character, or contains any of the invalid characters ('.', '/', '?', '*', ':', '\', '#'), the protocol server, in embodiments, throws a FaultException<ExceptionDetail> message.

If the file extension specified by the ext element already exists in the list, the protocol server, in embodiments, throws a FaultException<ExceptionDetail> message.

The protocol server adds the file extension specified by the ext element to the crawler application's list of extensions.

On success, the protocol server, in embodiments, returns the updated configuration version of the crawler application in the AddExtensionResult element in the response message.

On error, the protocol server, in embodiments, sends a FaultException<ExceptionDetail> message to the protocol client.

ISearchApplicationAdminWebService_AddExtension_InputMessage

The requested WSDL message for the AddExtension WSDL operation.

The SOAP action value is:

http://tempuri.org/ISearchApplicationAdminWebService/AddExtension

The SOAP body contains the AddExtension element.

ISearchApplicationAdminWebService_AddExtension_OutputMessage

The response WSDL message for the AddExtension method.

The SOAP action value is:

http://tempuri.org/ISearchApplicationAdminWebService/AddExtensionResponse

The SOAP body contains the AddExtensionResponse element.

The input data for the AddExtension WSDL operation.

```
<xs:element name="AddExtension">
    <xs:complexType>
        <xs:sequence>
<xs:element minOccurs="0" name="versionIn" type="xs:int"/>
<xs:element minOccurs="0" name="currentUser" nillable="true" type="xs:string"/>
<xs:element minOccurs="0" name="ext" nillable="true" type="xs:string"/>
        </xs:sequence>
    </xs:complexType>
</xs:element>
``` versionIn: The configuration version of the crawler application. This element, in embodiments, contains a value greater than or equal to 0.

currentUser: User name of the current logged on user, used for auditing purposes.

ext: A file extension. In embodiments, the currentUser is present, and the length, in embodiments, is greater than 0 and less than 16 characters.

The result data for the AddExtension WSDL operation.

```
<xs:element name="AddExtensionResponse">
    <xs:complexType>
        <xs:sequence>
<xs:element minOccurs="0" name="AddExtensionResult" type="xs:int"/>
        </xs:sequence>
    </xs:complexType>
</xs:element>
```

AddExtensionResult: The configuration version of the crawler application. This element, in embodiments, contains a value greater than or equal to 0.

RemoveExtension: Remove a file extension from the extensions list defined for crawler application 208.

ISearchApplicationAdminWebService_RemoveExtension_InputMessage

ISearchApplicationAdminWebService_RemoveExtension_OutputMessage

```
<wsdl:operation name="RemoveExtension">
    <wsdl:input
wsam:Action="http://tempuri.org/ISearchApplicationAdminWebService/RemoveExtension"
message="tns:ISearchApplicationAdminWebService_RemoveExtension_InputMessage"/>
    <wsdl:output
wsam:Action="http://tempuri.org/ISearchApplicationAdminWebService/RemoveExtensionResponse"
message="tns:ISearchApplicationAdminWebService_RemoveExtension_OutputMessage"/>
</wsdl:operation>
```

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

If the file extension specified by ext element in the request message does not exist in the list, the protocol server, in embodiments, throws a FaultException<ExceptionDetail> message.

The protocol server removes a file extension specified by the ext element in the request message from extension list property of the crawler application.

On success, the protocol server, in embodiments, returns the updated configuration version of the crawler application in the RemoveExtensionResult element in the response message.

On error, the protocol server, in embodiments, sends a FaultException<ExceptionDetail> message to the protocol client.

ISearchApplicationAdminWebService_RemoveExtension_InputMessage

The requested WSDL message for the RemoveExtension WSDL operation.

The SOAP action value is:

http://tempuri.org/ISearchApplicationAdminWebService/RemoveExtension

The SOAP body contains the RemoveExtension element.

ISearchApplicationAdminWeb-
Service_RemoveExtension_OutputMessage

The response WSDL message for the RemoveExtension method.

The SOAP action value is:
http://tempuri.org/ISearchApplicationAdminWebService/RemoveExtensionResponse The SOAP body contains the RemoveExtensionResponse element.

The input data for the RemoveExtension WSDL operation.

```
<xs:element name="RemoveExtension">
    <xs:complexType>
        <xs:sequence>
<xs:element minOccurs="0" name="versionIn" type="xs:int"/>
<xs:element minOccurs="0" name="currentUser" nillable="true" type="xs:string"/>
<xs:element minOccurs="0" name="ext" nillable="true" type="xs:string"/>
        </xs:sequence>
    </xs:complexType>
</xs:element>
``` versionIn: The configuration version of the crawler application. This element, in embodiments, contains a value greater than or equal to zero.

currentUser: User name of the current logged on user, used for auditing purposes.

ext: file extension. In embodiments, the currentUser is present. Length, in embodiments, is greater than 0 and less than 16 characters.

The result data for the RemoveExtension WSDL operation.

```
<xs:element name="RemoveExtensionResponse">
    <xs:complexType>
        <xs:sequence>
<xs:element minOccurs="0" name="RemoveExtensionResult" type="xs:int"/>
        </xs:sequence>
    </xs:complexType>
</xs:element>
```

RemoveExtensionResult: The configuration version of the crawler application. This element, in embodiments, contains a value greater than or equal to 0.

ClearExtensionList: Empty the list of file extensions recognized by protocol server 206.
ISearchApplicationAdminWeb-
Service_ClearExtensionList_InputMessage
ISearchApplicationAdminWeb-
Service_ClearExtensionList_OutputMessage.

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

The protocol server clears the extension property of the crawler application.

On success, the protocol server, in embodiments, returns the updated configuration version of the crawler application in the ClearExtensionListResult element in the response message.

On error, the protocol server, in embodiments, sends a FaultException<ExceptionDetail> message to the protocol client.

ISearchApplicationAdminWeb-
Service_ClearExtensionList_InputMessage

The requested WSDL message for the ClearExtensionList WSDL operation.

The SOAP action value is:
http://tempuri.org/ISearchApplicationAdminWebService/ClearExtensionList The SOAP body contains the ClearExtensionList element.

ISearchApplicationAdminWeb-
Service_ClearExtensionList_OutputMessage

The response WSDL message for the ClearExtensionList method.

The SOAP action value is:
http://tempuri.org/ISearchApplicationAdminWebService/ClearExtensionListResponse The SOAP body contains the ClearExtensionListResponse element.

The input data for the ClearExtensionList WSDL operation.

```
<xs:element name="ClearExtensionList">
    <xs:complexType>
        <xs:sequence>
            <xs:element minOccurs="0" name="versionIn" type="xs:int"/>
            <xs:element minOccurs="0" name="currentUser" nillable="true" type="xs:string"/>
        </xs:sequence>
    </xs:complexType>
</xs:element>
``` versionIn: The configuration version of the crawler application. This element, in embodiments, contains a value greater than or equal to 0.

```
<wsdl:operation name="ClearExtensionList">
    <wsdl:input
wsam:Action="http://tempuri.org/ISearchApplicationAdminWebService/ClearExtensionList"
message="tns:ISearchApplicationAdminWebService_ClearExtensionList_InputMessage"/>
    <wsdl:output
wsam:Action="http://tempuri.org/ISearchApplicationAdminWebService/ClearExtensionListResponse"
message="tns:ISearchApplicationAdminWebService_ClearExtensionList_OutputMessage"/>
</wsdl:operation>
``` currentUser: User name of the current logged on user, used for auditing purposes.

The result data for the ClearExtensionList WSDL operation.

```
<xs:element name="ClearExtensionListResponse">
    <xs:complexType>
        <xs:sequence>
            <xs:element minOccurs="0"
name="ClearExtensionListResult" type="xs:int"/>
        </xs:sequence>
    </xs:complexType>
</xs:element>
```

ClearExtensionListResult: The configuration version of the crawler application. This element, in embodiments, contains a value greater than or equal to 0.

AddCrawlMapping: Creates a new crawl mapping for crawler application 208.

ISearchApplicationAdminWebService_AddCrawlMapping_InputMessage

ISearchApplicationAdminWebService_AddCrawlMapping_OutputMessage

```
<wsdl:operation name="AddCrawlMapping">
    <wsdl:input
wsam:Action="http://tempuri.org/ISearchApplicationAdminWebService/AddCrawlMapping"
message="tns:ISearchApplicationAdminWebService_AddCrawlMapping_InputMessage"/>
    <wsdl:output
wsam:Action="http://tempuri.org/ISearchApplicationAdminWebService/AddCrawlMappingResponse"
message="tns:ISearchApplicationAdminWebService_AddCrawlMapping_OutputMessage"/>
</wsdl:operation>
```

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

The protocol server, in embodiments, normalizes the source and target strings as follows:

Trim the leading and trailing spaces.

Remove the final character if it is the back slash ('\') character, or the forward slash ('/') character.

If the source and target strings become the same, (case insensitive), after the previous step, the protocol server, in embodiments, throws a FaultException<ExceptionDetail> message.

If the URL scheme as described in [RFC2396], 3.1|Scheme Component is not present, and string is not an UNC path, the protocol server, in embodiments, prepends the path with the "http" scheme.

If the URL scheme, as described in [RFC2396], 3.1|Scheme Component is "file", convert the string to a UNC path, removing "file" prefix from the string, and replacing every forward slash ('/') character with the back slash ('\') character.

If the URL scheme, as described in [RFC2396], 3.1|Scheme Component is "http" or "https", replace every back slash ('\') character with the forward slash ('/') character.

If normalization failed, the protocol server, in embodiments, throws a FaultException<ExceptionDetail> message.

If the crawl mapping for the same normalized source or target exists, the protocol server, in embodiments, throws a FaultException<ExceptionDetail> message.

The protocol server, in embodiments, then creates a new crawl mapping and appends it to the mappings collection in the crawler application with the source property set to the normalized source, and the target property set to the normalized target.

On success, the protocol server, in embodiments, returns the updated configuration version of the crawler application in the AddCrawlMappingResult element in the response message.

On error, the protocol server, in embodiments, sends a FaultException<ExceptionDetail> message to the protocol client.

ISearchApplicationAdminWebService_AddCrawlMapping_InputMessage

The requested WSDL message for the AddCrawlMapping WSDL operation.

The SOAP action value is:

http://tempuri.org/ISearchApplicationAdminWebService/AddCrawlMapping

The SOAP body contains the AddCrawlMapping element.

ISearchApplicationAdminWebService_AddCrawlMapping_OutputMessage

The response WSDL message for the AddCrawlMapping method.

The SOAP action value is:

http://tempuri.org/ISearchApplicationAdminWebService/AddCrawlMappingResponse

The SOAP body contains the AddCrawlMappingResponse element.

The input data for the AddCrawlMapping WSDL operation.

```
<xs:element name="AddCrawlMapping">
    <xs:complexType>
        <xs:sequence>
            <xs:element minOccurs="0" name="versionIn"
type="xs:int"/>
            <xs:element minOccurs="0" name="currentUser"
nillable="true" type="xs:string"/>
            <xs:element minOccurs="0" name="source" nillable="true"
type="xs:string"/>
```

```
        <xs:element minOccurs="0" name="target" nillable="true"
type="xs:string"/>
            </xs:sequence>
        </xs:complexType>
</xs:element>
``` versionIn: The configuration version of the crawler application. This element, in embodiments, contains a value greater than or equal to 0.

currentUser: User name of the current logged on user, used for auditing purposes.

source: The access URL prefix. This element, in embodiments, is present and its contents, in embodiments, are less than 2048 characters in length.

target: The display URL prefix. This element, in embodiments, is present and its contents, in embodiments, are less than 2048 characters in length.

The result data for the AddCrawlMapping WSDL operation.

```
<xs:element name="AddCrawlMappingResponse">
    <xs:complexType>
        <xs:sequence>
            <xs:element minOccurs="0"
name="AddCrawlMappingResult" type="xs:int"/>
        </xs:sequence>
    </xs:complexType>
</xs:element>
```

AddCrawlMappingResult: The configuration version of the crawler application. This element, in embodiments, contains a value greater than or equal to 0.

AddContentSource: Create a new content source in crawler application 208.

ISearchApplicationAdminWebService_AddContentSource_InputMessage

ISearchApplicationAdminWebService_AddContentSource_OutputMessage

```
<wsdl:operation name="AddContentSource">
    <wsdl:input
wsam:Action="http://tempuri.org/ISearchApplicationAdminWebService/AddContent
Source"
message="tns:ISearchApplicationAdminWebService_AddContentSource_InputMessa
ge"/>
    <wsdl:output
wsam:Action="http://tempuri.org/ISearchApplicationAdminWebService/AddContent
SourceResponse"
message="tns:ISearchApplicationAdminWebService_AddContentSource_OutputMes
sage"/>
</wsdl:operation>
```

The protocol server creates a new content source with the properties type, wssCrawlStyle and name set to the values of the corresponding elements in the request message.

The id property of the newly created content source, in embodiments, is unique within the collection of content sources.

If the content source is created successfully, the protocol server, in embodiments, returns the content source identifier in the AddContentSourceResult element in the response message.

On error, the protocol server, in embodiments, sends a FaultException<ExceptionDetail> message to the protocol client.

ISearchApplicationAdminWebService_AddContentSource_InputMessage

The requested WSDL message for the AddContentSource WSDL operation.

The SOAP action value is:

http://tempuri.org/ISearchApplicationAdminWebService/AddContentSource

The SOAP body contains the AddContentSource element.

ISearchApplicationAdminWebService_AddContentSource_OutputMessage

The response WSDL message for the AddContentSource method.

The SOAP action value is:

http://tempuri.org/ISearchApplicationAdminWebService/AddContentSourceResponse

The SOAP body contains the AddContentSourceResponse element.

The input data for the AddContentSource WSDL operation.

```
<xs:element name="AddContentSource">
    <xs:complexType>
        <xs:sequence>
            <xs:element minOccurs="0" name="versionIn" type="xs:int"/>
            <xs:element minOccurs="0" name="currentUser" nillable="true"
type="xs:string"/>
            <xs:element minOccurs="0" name="type" type="xs:int"/>
            <xs:element minOccurs="0" name="wssCrawlStyle"
xmlns:q9="http://schemas.datacontract.org/2004/07/Microsoft.Office.Server.Search.A
dministration" type="q9:SharePointCrawlBehavior"/>
            <xs:element minOccurs="0" name="name" nillable="true"
type="xs:string"/>
        </xs:sequence>
    </xs:complexType>
</xs:element>
``` versionIn: The configuration version of the crawler application. This element, in embodiments, contains a value greater than or equal to 0.

currentUser: User name of the current logged on user, used for auditing purposes.

type: The content source type. In embodiments, the type is one of the following values:

| Value | Meaning |
|---|---|
| 0 | Enables specifying settings that control the depth of crawl for a Web site based on start address server, host hops and page depth |
| 1 | Enables specifying settings that control the depth of crawl for a Web site based on discovering everything under the hostname for each start address or only crawling the site collection of each start address |
| 2 | Lotus Notes database |
| 3 | File shares |
| 4 | Exchange public folders |
| 5 | Custom |
| 6 | Legacy<3> Business Data Catalog |
| 8 | Custom search connector |
| 9 | Business Data Connectivity (BDC) | wssCrawlStyle: The type of the crawl performed while crawling sites. This element, in embodiments, is present and conforms to the schema of the SharePointCrawlBehavior simple type.

name: The content source name. This element, in embodiments, is present. The length of the content source name, in embodiments, is less than or equal to 255 characters.

The specified name, in embodiments, is unique among the content source names existing in the crawler application.

The result data for the AddContentSource WSDL operation.

```
<xs:element name="AddContentSourceResponse">
    <xs:complexType>
        <xs:sequence>
            <xs:element minOccurs="0"
name="AddContentSourceResult" type="xs:int"/>
        </xs:sequence>
    </xs:complexType>
</xs:element>
```

AddContentSourceResult: Identifier of the newly created content source. In embodiments, the AddContentSourceResult is greater than 0.

RemoveCrawlMapping: Remove a crawl mapping from crawler application 208.

ISearchApplicationAdminWebService_RemoveCrawlMapping_InputMessage

ISearchApplicationAdminWebService_RemoveCrawlMapping_OutputMessage.

```
<wsdl:operation name="RemoveCrawlMapping">
    <wsdl:input
wsam:Action="http://tempuri.org/ISearchApplicationAdminWebService/RemoveCra
wlMapping"
message="tns:ISearchApplicationAdminWebService_RemoveCrawlMapping_Input
Message"/>
    <wsdl:output
wsam:Action="http://tempuri.org/ISearchApplicationAdminWebService/RemoveCra
wlMappingResponse"
message="tns:ISearchApplicationAdminWebService_RemoveCrawlMapping_Output
Message"/>
</wsdl:operation>
```

On receipt the protocol server validates the versionIn value from the request message. If it does not match the current configuration version of the crawler application, the protocol server, in embodiments, throws a FaultException<ExceptionDetail> message.

The protocol server then updates the current configuration version of the crawler application to the value of versionIn+1.

If no crawl mapping can be found which has an access URL matching the source element in the request message, the protocol server, in embodiments, throws a FaultException<ExceptionDetail> message.

If the crawl mapping exists, the protocol server, in embodiments, removes the crawl mapping from the crawler application.

On success, the protocol server, in embodiments, returns the updated configuration version of the crawler application in the RemoveCrawlMappingResult element in the response message.

On error, the protocol server, in embodiments, sends a FaultException<ExceptionDetail> message to the protocol client.

ISearchApplicationAdminWeb-Service_RemoveCrawlMapping_InputMessage

The requested WSDL message for the RemoveCrawlMapping WSDL operation.

The SOAP action value is:
http://tempuri.org/ISearchApplicationAdminWebService/RemoveCrawlMapping The SOAP body contains the RemoveCrawlMapping element.

ISearchApplicationAdminWeb-Service_RemoveCrawlMapping_OutputMessage

The response WSDL message for the RemoveCrawlMapping method.

The SOAP action value is:
http://tempuri.org/ISearchApplicationAdminWebService/RemoveCrawlMappingResponse The SOAP body contains the RemoveCrawlMappingResponse element.

The input data for the RemoveCrawlMapping WSDL operation.

```
<xs:element name="RemoveCrawlMapping">
    <xs:complexType>
        <xs:sequence>
            <xs:element minOccurs="0" name="versionIn"
               type="xs:int"/>
            <xs:element minOccurs="0" name="currentUser"
nillable="true" type="xs:string"/>
            <xs:element minOccurs="0" name="source" nillable="true"
type="xs:string"/>
        </xs:sequence>
    </xs:complexType>
</xs:element>
``` versionIn: configuration version of the crawler application. This element, in embodiments, contains a value greater than or equal to zero.

currentUser: User name of the current logged on user, used for auditing purposes.

source: The access URL prefix. This element, in embodiments, is present and its content, in embodiments, is less than 2048 characters in length. In embodiments, it matches an access URL of an existing crawl mapping.

The result data for the RemoveCrawlMapping WSDL operation.

```
<xs:element name="RemoveCrawlMappingResponse">
    <xs:complexType>
<xs:sequence>
<xs:element minOccurs="0" name="RemoveCrawlMappingResult"
type="xs:int"/>
        </xs:sequence>
    </xs:complexType>
</xs:element>
```

RemoveCrawlMappingResult: The configuration version of the crawler application. This element, in embodiments, contains a value greater than or equal to zero.

While the above describes and defines the format and syntax of the messages for communicating with the Web crawler, according to embodiments governed by the Search Service Administration Web Service protocol, Appendix A herein, entitled "Embodiment of Web Services Description Language ("WSDL") Schema," includes a full example WSDL schema illustrating the structure, format, and syntax of the messages, including those described above, for communicating to the Web crawler. As shown, the syntax of the structures uses example Extensible Markup Language ("XML") schema, as well as WSDL. Appendix A is incorporated herein in full.

Figure 4:
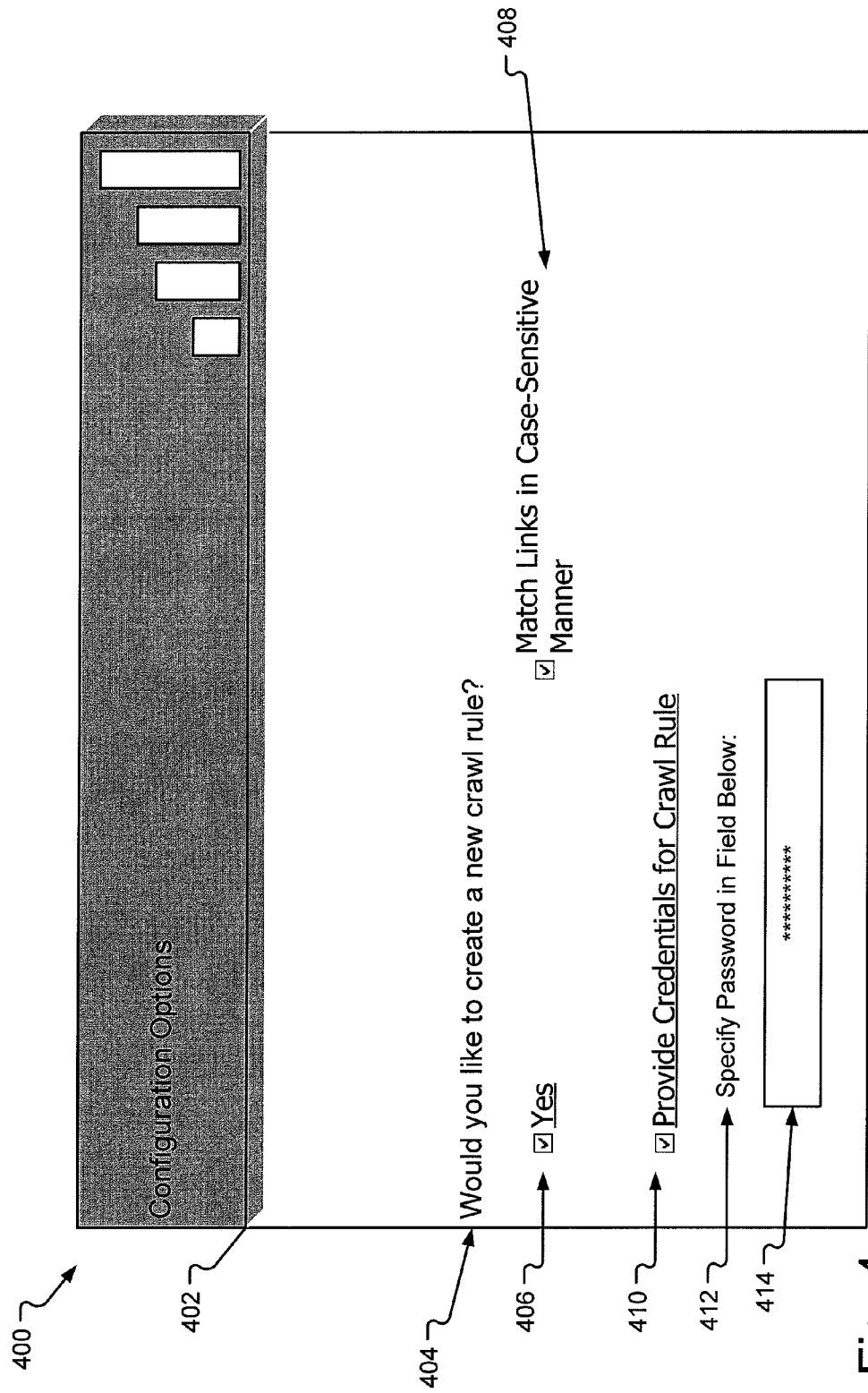
FIG. 4 depicts an example user interface showing data entry fields for allowing a user to configure a crawling function of a crawler application in accordance with an embodiment of the present disclosure.

While FIG. 2 shows the configuration request and response messages for configuring the crawl function of crawler application 208, FIG. 4 illustrates an example user interface 400 for allowing a user to enter inputs for the configuration requests 216 illustrated in FIG. 2, in accordance with embodiments disclosed herein. In an embodiment, protocol client 204 presents user interface 400 for allowing a user to enter data for configuring the crawl function of crawler application 208. User interface 400 is displayed on the user interface of client computer 104, for example. Configuration options 402 are displayed to the user in user interface 400. While a single user interface 400 is shown in FIG. 4, multiple user interfaces can be used in accordance with embodiments disclosed herein. User interface 400 prompts a user to create a new crawl rule 404 by allowing the user to mark checkbox 406. Further, a user configures the crawl function by marking checkbox 408 to indicate that only URLs of matching links (including case-sensitive considerations) should be crawled, according to embodiments disclosed herein. In an embodiment, user interface 400 allows a user to configure the crawl function by defining authentication information for the crawl by marking checkbox 410 to indicate that the user desires to provide credentials for the crawl rule. For example, the user is prompted to enter credentials, such as a password 412 by way of example only, in data entry field 414. User interface 400 is offered for purposes of illustration only. Any type of user interfaces can be used in accordance with embodiments disclosed herein. In other embodiments, no user interface is used, and configuration requests and input data are instead provided directly by another computing device, a computer program, etc.

Figure 5:
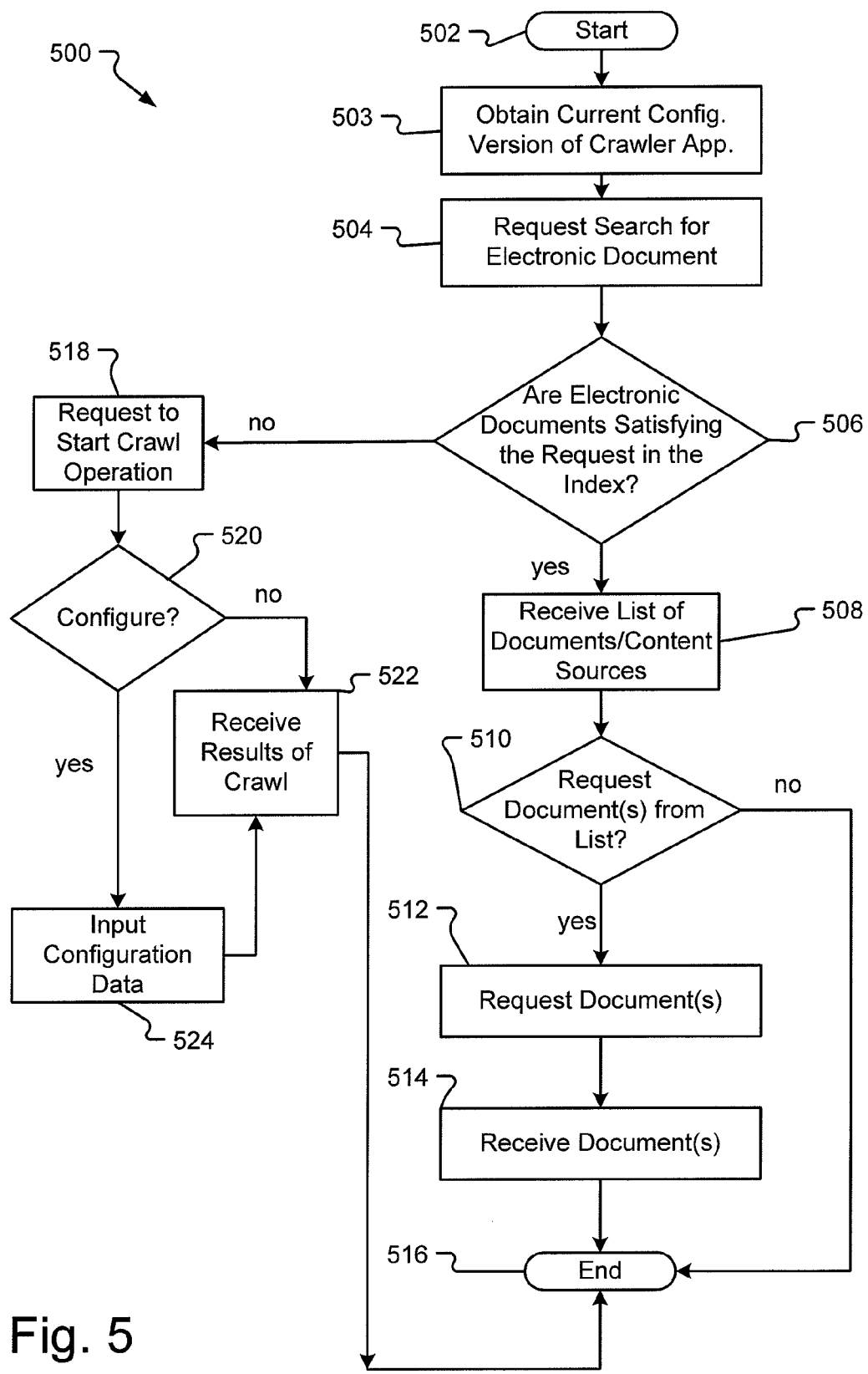
FIG. 5 illustrates a flow diagram illustrating the operational characteristics of a process for searching for an electronic document(s) by executing a crawler application in accordance with an embodiment of the present disclosure.

While FIG. 4 shows an example user interface for allowing a user to provide input data for configuring the crawl function of crawler application 208, FIG. 5 depicts the operational steps 500 for requesting a search for a specific type of information and determining whether a configuration request applies to a Web crawl. Start operation 502 is initiated, and process 500 proceeds to obtain the current configuration version of crawler application operation 503, in which the crawler application is launched in response to an indication by a user, protocol client, etc. For example, a protocol client obtains the current configuration version of the Web search service. Next, a request is made to search for an electronic document 504. This search requests a specific type of information and/or provides specific search criteria. A search engine, such as search engine 210 in FIG. 2, receives the search request and determines 506 whether any electronic documents satisfying the request are indexed in an index catalog, such as index 212 in FIG. 2. Such indexing allows for fast search responses and is based on previous Web crawling results. If the index contains an item(s) matching the search criteria, process 500 branches YES to receive list of documents/content sources 508, in which a list of electronic documents/content sources matching the search criteria is provided to, and received by, the protocol client, for example. Next, the user, or client, determines 510 whether any documents/content sources should be requested from the list received of indexed documents at operation 508. If no indexed documents are desired, process 500 branches NO to end operation 516, and process 500 terminates. If an indexed document(s)/content source(s) from the list is desired, process 500 branches YES to request document operation 512. In response to request operation 512, the electronic document(s) is then received at operation 514. Process 500 then terminates at end operation 516.

Returning to operation 506, if no electronic documents satisfying the search request are indexed in index 212, for example, process 500 branches NO to request to start crawl operation 518. In initiating the Web crawl 518, the user is prompted to determine whether to configure the crawl function 520. If NO, the crawl proceeds, and the client, or user, for example, receives results of the crawl at receive operation 522. If the client desires to configure the crawl function, process 500 branches YES to provide input data 524. The crawl then proceeds, and the client receives the results of the crawl at operation 522. Process 500 then terminates at end operation 516. Although FIG. 5 depicts the prompting of a user to configure a crawl function, it should be noted that this illustration is offered by way of example only in accordance with an embodiment disclosed herein. In other embodiments, no prompt is given, and the client, instead, initiates a configuration request. In still other embodiments, such configuration request occurs before any Web crawling begins for a particular search. Further, while FIG. 5 separates the steps for determining whether an index includes a document/content source satisfying search criteria from the steps for starting a Web crawl (if no document/content source satisfying the search criteria is indexed), in other embodiments, a request to start a crawl operation also applies to retrieving documents/content sources from an index. In other words, a Web crawl is initiated to discover both documents/content sources in the index of the protocol server and external Web sites in accordance with other embodiments disclosed herein. FIG. 5 is merely an example of possible operational characteristics for requesting a search and configuring a crawl function in accordance with embodiments disclosed herein. Operational steps depicted may be combined into other steps, or additional steps may be added, for example.

Figure 6:
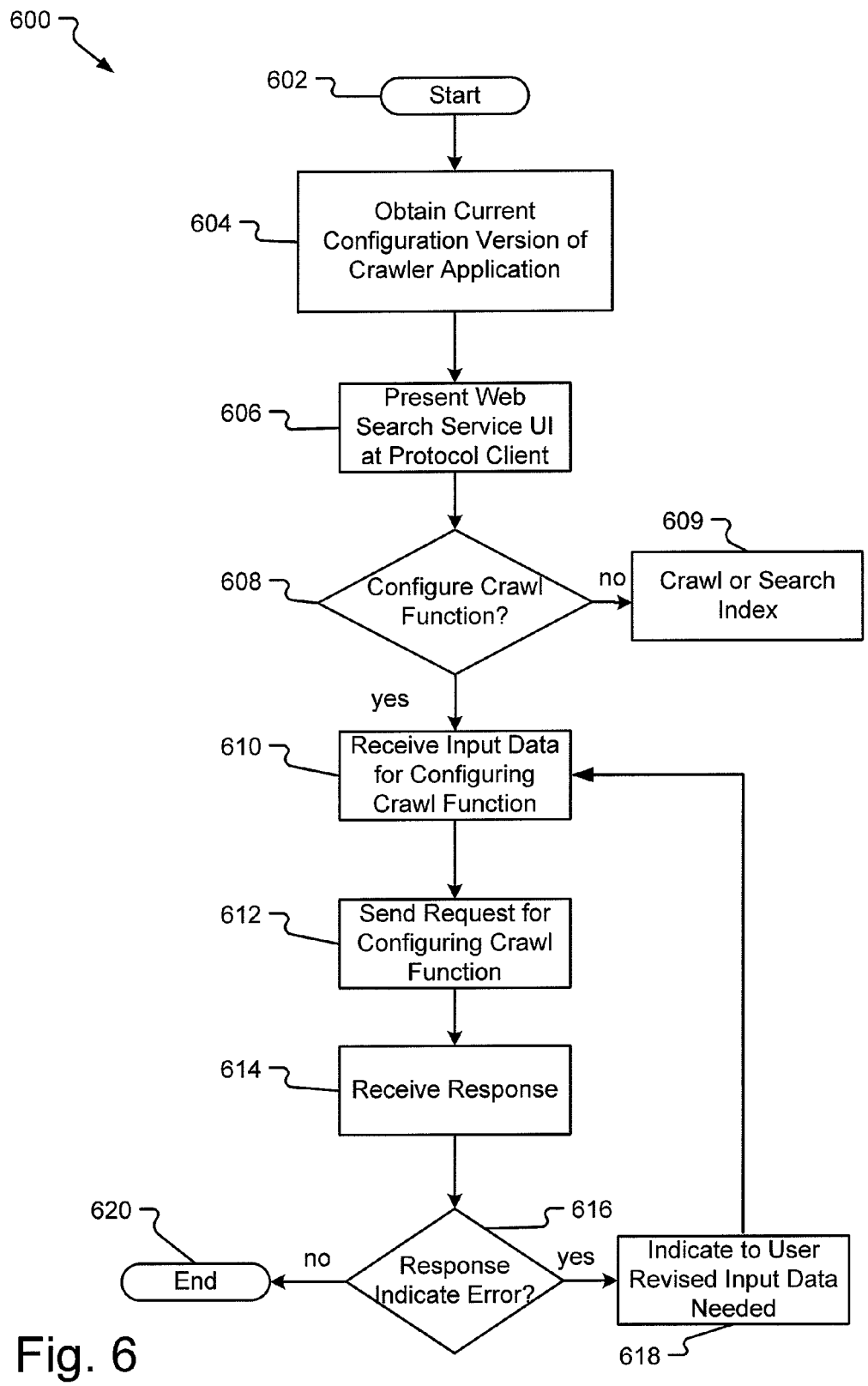
FIG. 6 depicts a flow diagram illustrating the operational characteristics of a process for configuring a crawling function of a crawler application in accordance with an embodiment of the present disclosure.

While FIG. 5 depicts the operational steps for prompting a client as to whether configuration of a crawl function is desired, FIG. 6 illustrates the operational steps for sending a configuration request from a protocol client, such as protocol client 204 in FIG. 2, to a protocol server, such as protocol server 206 in FIG. 2, in accordance with embodiments disclosed herein. Start operation 602 is initiated and process 600 proceeds to a protocol client obtaining the current configuration version of a Web search service 604, or crawler application. For example, a Web site for the Web search service is accessed in accordance with an embodiment. The protocol client knows the address of the Web site for the Web search service in one embodiment and accesses such Web site upon an indication to invoke or launch the Web search service. As an example, a user "clicks" on a box, icon, or other component indicating that the Web search service should be launched. This box, icon, or other component, in embodiments, is on a user's desktop, within another application, etc. Numerous types of ways to launch the Web search service can be used in accordance with embodiments of the present disclosure. In an embodiment, the protocol client accesses the Web search service by connecting to it by its network address, in which any authentication and/or authorization methods are automatically executed for access by the protocol client. Upon obtaining the current configuration version of the Web search service, or crawler application, the protocol client presents a user interface for initiating a crawl by the Web search service or configuring a crawl 606. It should be noted that steps 604 and 606 are offered by way of example only. For example, in other embodiments, the protocol client automatically displays the user interface or other interface mechanism for enabling configuration of the crawl function. The protocol client thus presents the user interface for requesting Web crawling prior to any received indication to launch the Web search service. In still other embodiments, the protocol client does not display such user interface. Rather, the user interface is displayed by other software running in conjunction with the protocol client. In yet further embodiments, the protocol client displays the user interface for requesting Web crawling and/or configuring of the crawl function in response to a user launching the Web search service by directly accessing a Web site for such service.

Next, the user interface, such as user interface 400, prompts the user to determine whether the user would like to configure the crawl function 608. If the user (or other client, such as computing device or computer program) desires to configure the crawl function, process 600 branches YES to receive input data for configuring the crawl function 610. Examples of such input data are shown with respect to the sample message operations discussed above. Upon receiving the input data, the protocol client formats the input data into a configuration request for communication to the API on the protocol server and sends the request for configuring the crawl function 612 to the protocol server. After the protocol server (through the Web search service 208, for example, depicted in FIG. 2) processes the configuration request, the protocol client receives a response 614 from the protocol server. The protocol client parses the response to determine whether it indicates a fault exception or other error 616. If an error is detected, process 600 branches YES to indicate to the user, for example, that revised input data is needed 618 to make the configuration request allowable. Process 600 then proceeds to receive input data 610 operation. If no error is indicated, process 600 terminates at end operation 620. Returning to operation 608, if it is not desired to configure the crawl function, process 600 proceeds to crawl or search index operation 609, in which a crawl process or other search process is conducted by the crawler application or search engine, respectively. FIG. 6 is merely an example of possible operational characteristics for requesting a search and configuring a crawl function in accordance with embodiments disclosed herein. Operational steps depicted may be combined into other steps, or additional steps may be added, for example.

Figure 7:
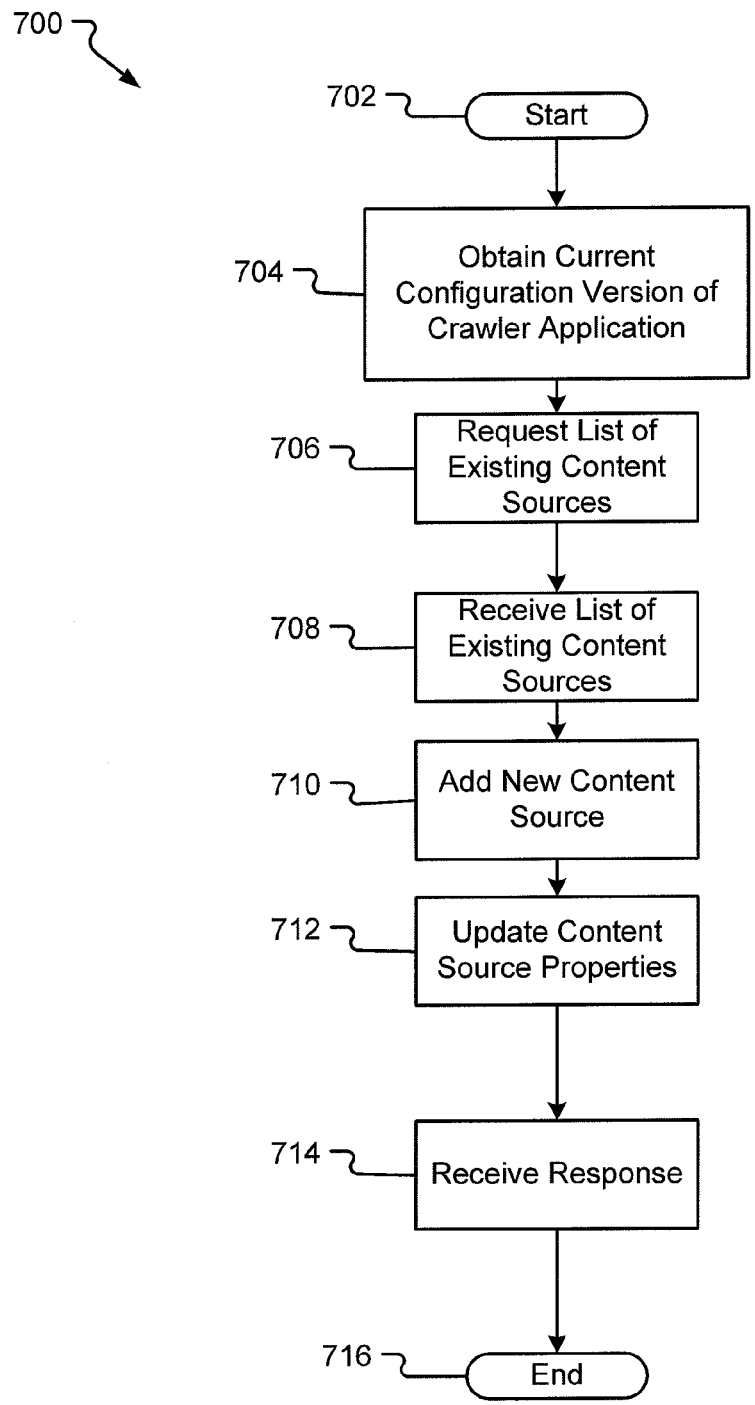
FIG. 7 illustrates a flow diagram illustrating the operational characteristics of a process for creating and configuring a content source in accordance with an embodiment of the present disclosure.

While FIG. 6 depicts the operational steps for sending a configuration request from a protocol client to a protocol server, FIG. 7 illustrates the operational steps for creating and configuring a content source, in accordance with embodiments disclosed herein. Start operation 702 is initiated, and process 700 proceeds to obtain the current configuration version of the crawler application 704. In an embodiment, the protocol client obtains the current configuration version of the crawler application in response to an indication by a user to perform a crawl or configure an existing crawl function by using the "GetVersion" operation, for example. After obtaining the crawler application, process 700 proceeds to request the list of existing content sources 706, in which indexed content sources, for example, are compiled into a list according to embodiments. In other embodiments, the list of content sources already exists and no compilation is required. In accordance with an embodiment disclosed herein, the list of content sources is obtained by using the "GetContentSources" operation. Next, the protocol client receives the list of existing content sources 708, and adds a new content source 710, such as through an "AddContentSource" input message. After adding a new content source, the content source properties are updated in embodiments at update operation 712. For example, the protocol client requests to edit the content source and an "EditContentSource" input message is relayed to the crawler application through the use of an API on the protocol server. The protocol client then receives a response message to the configuration request for updating the content source properties at receive operation 714, and process 700 terminates at end operation 716. FIG. 7 is merely an example of possible operational characteristics for creating and configuring a content source in accordance with embodiments disclosed herein. Operational steps depicted may be combined into other steps, or additional steps may be added, for example.

Figure 8:
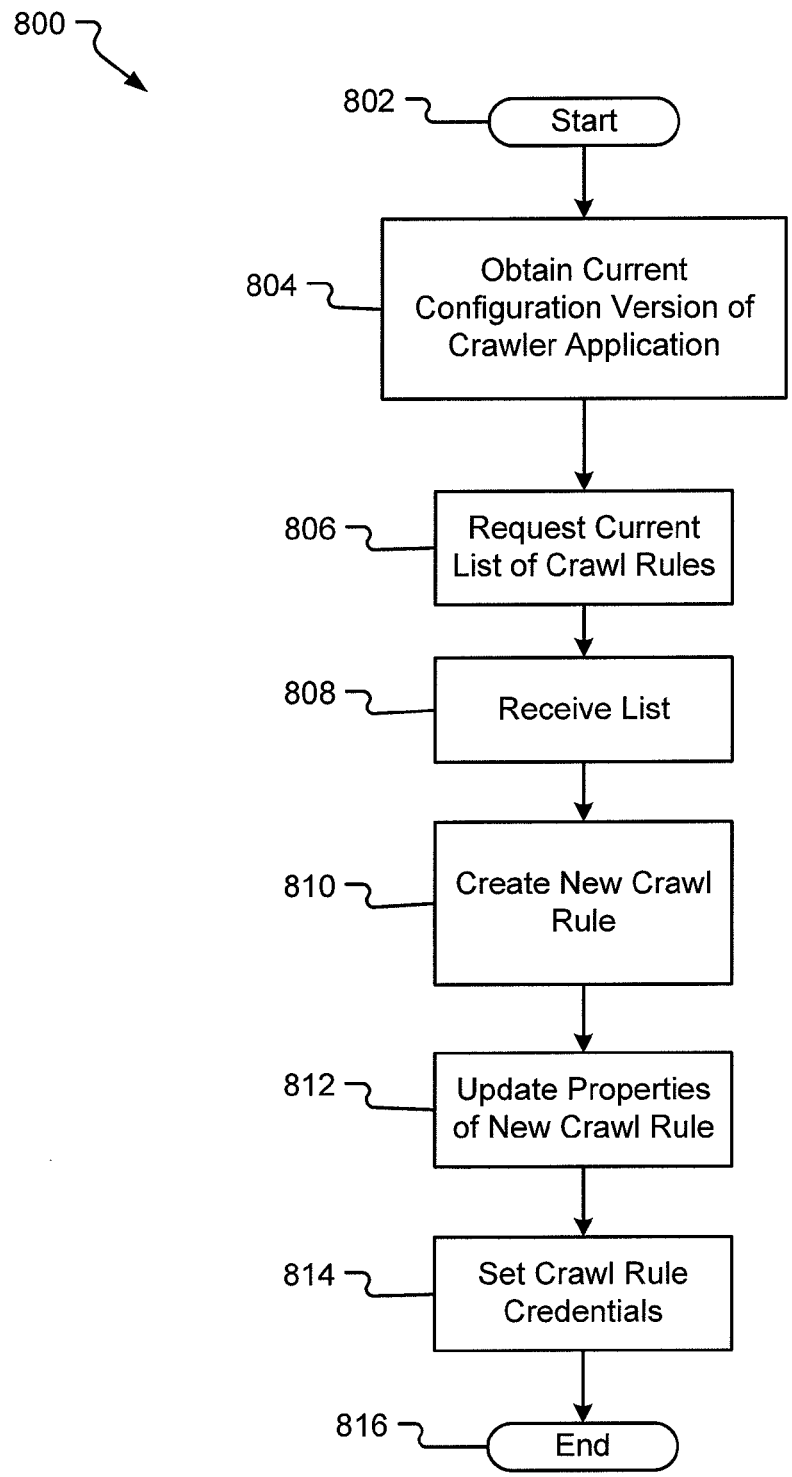
FIG. 8 depicts a flow diagram illustrating the operational characteristics of a process for configuring a crawl rule in accordance with an embodiment of the present disclosure.

Further, while FIG. 7 illustrates the operational steps for creating and configuring a content source, FIG. 8 depicts the operational steps for configuring a crawl rule, such as by setting credentials for an authentication method using message "SetCredentials2," as disclosed herein in accordance with embodiments of the present disclosure. Process 800 is initiated at start operation 802 and proceeds to obtain the current configuration version of the crawler application 804, such as by "GetVersion" operation according to an embodiment. To configure a crawl rule, the protocol client next requests the current list of crawl rules 806, such as by "GetCrawlRuleList" operation, and receives the list at operation 808. After obtaining the current list of crawl rules, process 800 proceeds to create a new crawl rule 810, such as through "AddAdvancedCrawlRule" operation, according to embodiments. The client, or user, then updates one or more properties of the new crawl rule 812, such as through the "UpdateCrawlRule" operation, and process 800 proceeds to set crawl rule credentials 814 for defining an authentication method for the crawl. In an embodiment, the "SetCrawlRuleCredentials2" operation is used to configure the authentication method and crawl account for the new crawl rule. Process 800 then terminates at end operation 816. FIG. 8 is merely an example of possible operational characteristics for configuring a crawl rule in accordance with embodiments disclosed herein. Operational steps depicted may be combined into other steps, or additional steps may be added, for example.

Figure 9:
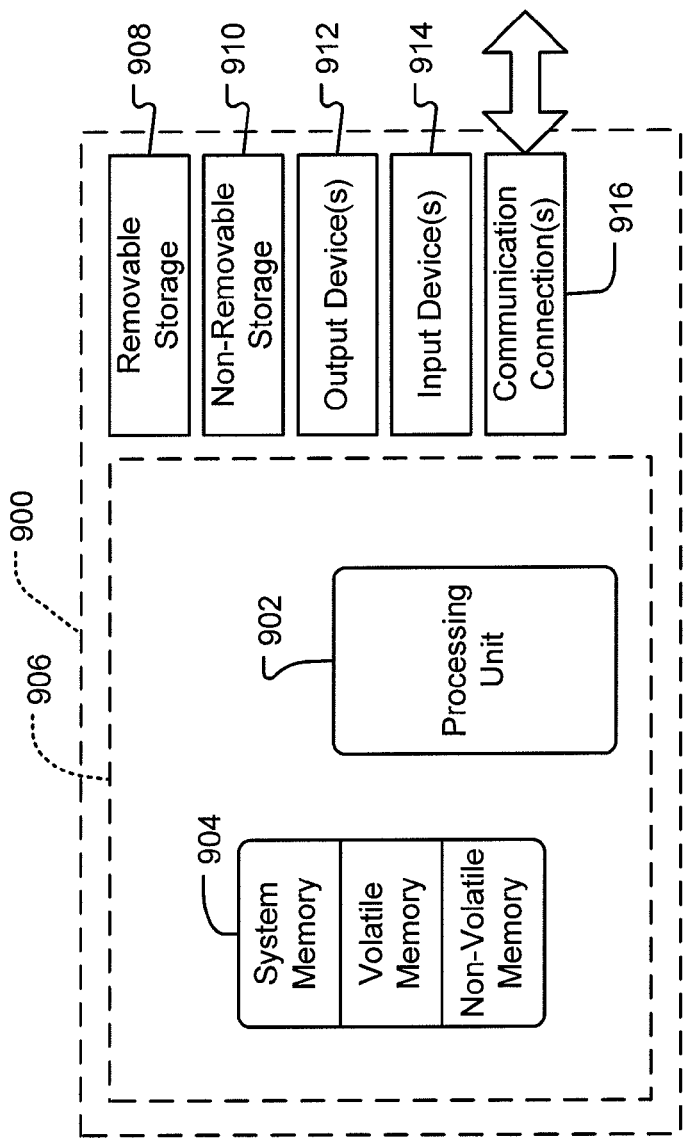
FIG. 9 depicts an example computing system upon which embodiments of the present disclosure may be implemented.

Finally, FIG. 9 illustrates an example computing system 900 upon which embodiments disclosed herein may be implemented. A computer system 900, such as client computer 104, server 102, or other computing device, which has at least one processor 902 and a system memory 904, is depicted in accordance with embodiments disclosed herein, such as to configure a crawl function as shown in FIG. 1. For example, according to embodiments, memory 904 comprises an index, existing content sources, and/or current crawl rules. In its most basic configuration, computing system 900 is illustrated in FIG. 9 by dashed line 906. System 900 may include additional storage (removable and/or non-removable) including, but not limited to, magnetic or optical disks or tape. Such additional storage is illustrated in FIG. 9 by removable storage 908 and non-removable storage 910. By way of example, and not limitation, computer-readable media may comprise computer storage media and communication media.

Computer storage media includes volatile and nonvolatile, removable and non-removable media implemented in any method or technology for storage of information such as computer readable instructions, data structures, program modules or other data. System memory 904, removable storage 908 and non-removable storage 910 are all examples of computer storage media (i.e., memory storage). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by system 900. Any such computer storage media may be part of system 900. Depending on the configuration and type of computing device, memory 904 may be volatile, non-volatile or some combination of the two. The illustration in FIG. 9 is intended in no way to limit the scope of the present disclosure.

Communication media may be embodied by computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media, in accordance with an embodiment, includes wired media such as a wired network or direct-wired connection, and wireless media such as acoustic, RF, infrared and other wireless media. Combinations of any of the above should also be included within the scope of computer readable media.

System 900 may also contain communications connection(s) 916 that allow the device to communicate with other devices. Additionally, to input content into the fields of the UI on client computer 104 as provided by a corresponding UI module (not shown) on client computer 104, for example, in accordance with an embodiment of the present disclosure, system 900 may have input device(s) 914 such as a keyboard, mouse, pen, voice input device, touch input device, etc. Output device(s) 912 such as a display, speakers, printer, etc. may also be included, in which such devices may be used to display the UI for viewing configuration options, receiving input data for a crawl or configuration request, etc., in accordance with embodiments. All of these devices are well known in the art and need not be discussed at length here.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple client computers, multiple protocol servers, multiple networks, etc. Or, in other embodiments, a single client computer with a single protocol server and single network are used. One skilled in the art will recognize other embodiments or improvements that are within the scope and spirit of the present disclosure. Therefore, the specific structure, acts, or media are disclosed as example embodiments of implementing the present disclosure. The disclosure is defined by the appended claims.

APPENDIX A

Embodiment of Web Services Description Language ("WSDL") Schema

```xml
<?xml version="1.0" encoding="utf-8"?>
<wsdl:definitions xmlns:tns="http://tempuri.org/"
xmlns:soap="http://schemas.xmlsoap.org/wsdl/soap/"
xmlns:wsam="http://www.w3.org/2007/05/addressing/metadata"
xmlns:xsd="http://www.w3.org/2001/XMLSchema"
name="ISearchApplicationAdminWebService" targetNamespace="http://tempuri.org/"
xmlns:wsdl="http://schemas.xmlsoap.org/wsdl/">
  <wsdl:types>
    <xs:schema elementFormDefault="qualified" targetNamespace="http://tempuri.org/"
xmlns:xs="http://www.w3.org/2001/XMLSchema">
      <xs:import
namespace="http://schemas.datacontract.org/2004/07/Microsoft.Office.Server.Search.Administration" />
      <xs:import namespace="http://schemas.microsoft.com/2003/10/Serialization/" />
      <xs:import
namespace="http://schemas.datacontract.org/2004/07/Microsoft.Office.Server.Search.Internal.Administration" />
      <xs:import namespace="http://schemas.microsoft.com/2003/10/Serialization/Arrays" />
      <xs:element name="AddApp">
        <xs:complexType>
          <xs:sequence>
            <xs:element
xmlns:q1="http://schemas.datacontract.org/2004/07/Microsoft.Office.Server.Search.Administration" minOccurs="0" name="role" type="q1:ComponentRole" />
            <xs:element minOccurs="0" name="isInReadyState" type="xs:boolean" />
            <xs:element minOccurs="0" name="id" type="xs:int" />
            <xs:element minOccurs="0" name="localStoragePath" nillable="true" type="xs:string" />
            <xs:element minOccurs="0" name="master" type="xs:boolean" />
            <xs:element xmlns:q2="http://schemas.microsoft.com/2003/10/Serialization/" minOccurs="0" name="partitionGuid" type="q2:guid" />
          </xs:sequence>
        </xs:complexType>
      </xs:element>
      <xs:element name="AddAppResponse">
        <xs:complexType>
          <xs:sequence>
            <xs:element minOccurs="0" name="AddAppResult" type="xs:boolean" />
          </xs:sequence>
        </xs:complexType>
      </xs:element>
      <xs:element name="RemoveAllGathererApplications">
        <xs:complexType>
```

```
          <xs:sequence />
        </xs:complexType>
      </xs:element>
      <xs:element name="RemoveAllGathererApplicationsResponse">
        <xs:complexType>
          <xs:sequence>
            <xs:element minOccurs="0" name="RemoveAllGathererApplicationsResult" type="xs:int" />
          </xs:sequence>
        </xs:complexType>
      </xs:element>
      <xs:element name="ValidateScheduleTrigger">
        <xs:complexType>
          <xs:sequence>
            <xs:element minOccurs="0" name="versionIn" type="xs:int" />
            <xs:element minOccurs="0" name="trigger" nillable="true" type="xs:base64Binary" />
          </xs:sequence>
        </xs:complexType>
      </xs:element>
      <xs:element name="ValidateScheduleTriggerResponse">
        <xs:complexType>
          <xs:sequence>
            <xs:element xmlns:q3="http://schemas.datacontract.org/2004/07/Microsoft.Office.Server.Search.Internal.Administration" minOccurs="0" name="ValidateScheduleTriggerResult" type="q3:TriggerUpdate" />
          </xs:sequence>
        </xs:complexType>
      </xs:element>
      <xs:element name="AddExtension">
        <xs:complexType>
          <xs:sequence>
            <xs:element minOccurs="0" name="versionIn" type="xs:int" />
            <xs:element minOccurs="0" name="currentUser" nillable="true" type="xs:string" />
            <xs:element minOccurs="0" name="ext" nillable="true" type="xs:string" />
          </xs:sequence>
        </xs:complexType>
      </xs:element>
      <xs:element name="AddExtensionResponse">
        <xs:complexType>
          <xs:sequence>
            <xs:element minOccurs="0" name="AddExtensionResult" type="xs:int" />
          </xs:sequence>
        </xs:complexType>
      </xs:element>
      <xs:element name="RemoveExtension">
        <xs:complexType>
```

```xml
            <xs:sequence>
                <xs:element minOccurs="0" name="versionIn" type="xs:int" />
                <xs:element minOccurs="0" name="currentUser" nillable="true" type="xs:string" />
                <xs:element minOccurs="0" name="ext" nillable="true" type="xs:string" />
            </xs:sequence>
        </xs:complexType>
    </xs:element>
    <xs:element name="RemoveExtensionResponse">
        <xs:complexType>
            <xs:sequence>
                <xs:element minOccurs="0" name="RemoveExtensionResult" type="xs:int" />
            </xs:sequence>
        </xs:complexType>
    </xs:element>
    <xs:element name="ClearExtensionList">
        <xs:complexType>
            <xs:sequence>
                <xs:element minOccurs="0" name="versionIn" type="xs:int" />
                <xs:element minOccurs="0" name="currentUser" nillable="true" type="xs:string" />
            </xs:sequence>
        </xs:complexType>
    </xs:element>
    <xs:element name="ClearExtensionListResponse">
        <xs:complexType>
            <xs:sequence>
                <xs:element minOccurs="0" name="ClearExtensionListResult" type="xs:int" />
            </xs:sequence>
        </xs:complexType>
    </xs:element>
    <xs:element name="GetExtensionList">
        <xs:complexType>
            <xs:sequence>
                <xs:element minOccurs="0" name="versionIn" type="xs:int" />
            </xs:sequence>
        </xs:complexType>
    </xs:element>
    <xs:element name="GetExtensionListResponse">
        <xs:complexType>
            <xs:sequence>
                <xs:element xmlns:q4="http://schemas.microsoft.com/2003/10/Serialization/Arrays" minOccurs="0" name="GetExtensionListResult" nillable="true" type="q4:ArrayOfstring" />
            </xs:sequence>
        </xs:complexType>
    </xs:element>
    <xs:element name="SetIsExtensionIncludeList">
```

```xml
        <xs:complexType>
         <xs:sequence>
          <xs:element minOccurs="0" name="versionIn" type="xs:int" />
          <xs:element minOccurs="0" name="isInclude" type="xs:boolean" />
         </xs:sequence>
        </xs:complexType>
       </xs:element>
       <xs:element name="SetIsExtensionIncludeListResponse">
        <xs:complexType>
         <xs:sequence>
          <xs:element minOccurs="0" name="SetIsExtensionIncludeListResult" type="xs:int" />
         </xs:sequence>
        </xs:complexType>
       </xs:element>
       <xs:element name="IsExtensionIncludeList">
        <xs:complexType>
         <xs:sequence>
          <xs:element minOccurs="0" name="versionIn" type="xs:int" />
         </xs:sequence>
        </xs:complexType>
       </xs:element>
       <xs:element name="IsExtensionIncludeListResponse">
        <xs:complexType>
         <xs:sequence>
          <xs:element minOccurs="0" name="IsExtensionIncludeListResult" type="xs:boolean" />
         </xs:sequence>
        </xs:complexType>
       </xs:element>
       <xs:element name="AddCrawlRule">
        <xs:complexType>
         <xs:sequence>
          <xs:element minOccurs="0" name="versionIn" type="xs:int" />
          <xs:element minOccurs="0" name="currentUser" nillable="true" type="xs:string" />
          <xs:element minOccurs="0" name="isIncludeRule" type="xs:boolean" />
          <xs:element minOccurs="0" name="path" nillable="true" type="xs:string" />
         </xs:sequence>
        </xs:complexType>
       </xs:element>
       <xs:element name="AddCrawlRuleResponse">
        <xs:complexType>
         <xs:sequence>
          <xs:element minOccurs="0" name="AddCrawlRuleResult" nillable="true" type="xs:string" />
         </xs:sequence>
        </xs:complexType>
       </xs:element>
```

```xml
<xs:element name="AddAdvancedCrawlRule">
    <xs:complexType>
        <xs:sequence>
            <xs:element minOccurs="0" name="versionIn" type="xs:int" />
            <xs:element minOccurs="0" name="currentUser" nillable="true" type="xs:string" />
            <xs:element minOccurs="0" name="isIncludeRule" type="xs:boolean" />
            <xs:element minOccurs="0" name="isAdvancedRegularExpression" type="xs:boolean" />
            <xs:element minOccurs="0" name="caseSensitiveUR" type="xs:boolean" />
            <xs:element minOccurs="0" name="path" nillable="true" type="xs:string" />
        </xs:sequence>
    </xs:complexType>
</xs:element>
<xs:element name="AddAdvancedCrawlRuleResponse">
    <xs:complexType>
        <xs:sequence>
            <xs:element minOccurs="0" name="AddAdvancedCrawlRuleResult" nillable="true" type="xs:string" />
        </xs:sequence>
    </xs:complexType>
</xs:element>
<xs:element name="RemoveCrawlRule">
    <xs:complexType>
        <xs:sequence>
            <xs:element minOccurs="0" name="versionIn" type="xs:int" />
            <xs:element minOccurs="0" name="currentUser" nillable="true" type="xs:string" />
            <xs:element minOccurs="0" name="path" nillable="true" type="xs:string" />
        </xs:sequence>
    </xs:complexType>
</xs:element>
<xs:element name="RemoveCrawlRuleResponse">
    <xs:complexType>
        <xs:sequence>
            <xs:element minOccurs="0" name="RemoveCrawlRuleResult" type="xs:int" />
        </xs:sequence>
    </xs:complexType>
</xs:element>
<xs:element name="GetCrawlRuleList">
    <xs:complexType>
        <xs:sequence>
            <xs:element minOccurs="0" name="versionIn" type="xs:int" />
        </xs:sequence>
    </xs:complexType>
```

```
            </xs:element>
            <xs:element name="GetCrawlRuleListResponse">
                <xs:complexType>
                    <xs:sequence>
                        <xs:element
xmlns:q5="http://schemas.datacontract.org/2004/07/Microsoft.Office.Server.Search.Internal.
Administration" minOccurs="0" name="GetCrawlRuleListResult" nillable="true"
type="q5:ArrayOfCrawlRuleInternal" />
                    </xs:sequence>
                </xs:complexType>
            </xs:element>
            <xs:element name="UpdateCrawlRule">
                <xs:complexType>
                    <xs:sequence>
                        <xs:element minOccurs="0" name="versionIn" type="xs:int" />
                        <xs:element minOccurs="0" name="currentUser" nillable="true"
type="xs:string" />
                        <xs:element minOccurs="0" name="path" nillable="true"
type="xs:string" />
                        <xs:element
xmlns:q6="http://schemas.datacontract.org/2004/07/Microsoft.Office.Server.Search.Internal.
Administration" minOccurs="0" name="rule" nillable="true" type="q6:CrawlRuleInternal"
/>
                    </xs:sequence>
                </xs:complexType>
            </xs:element>
            <xs:element name="UpdateCrawlRuleResponse">
                <xs:complexType>
                    <xs:sequence>
                        <xs:element minOccurs="0" name="UpdateCrawlRuleResult"
nillable="true" type="xs:string" />
                    </xs:sequence>
                </xs:complexType>
            </xs:element>
            <xs:element name="ActivateCrawlRule">
                <xs:complexType>
                    <xs:sequence>
                        <xs:element minOccurs="0" name="versionIn" type="xs:int" />
                        <xs:element minOccurs="0" name="path" nillable="true"
type="xs:string" />
                    </xs:sequence>
                </xs:complexType>
            </xs:element>
            <xs:element name="ActivateCrawlRuleResponse">
                <xs:complexType>
                    <xs:sequence>
                        <xs:element minOccurs="0" name="ActivateCrawlRuleResult"
type="xs:int" />
                    </xs:sequence>
```

```
            </xs:complexType>
         </xs:element>
         <xs:element name="TestCrawlRule">
            <xs:complexType>
               <xs:sequence>
                  <xs:element minOccurs="0" name="versionIn" type="xs:int" />
                  <xs:element minOccurs="0" name="path" nillable="true"
type="xs:string" />
                  <xs:element minOccurs="0" name="url" nillable="true"
type="xs:string" />
               </xs:sequence>
            </xs:complexType>
         </xs:element>
         <xs:element name="TestCrawlRuleResponse">
            <xs:complexType>
               <xs:sequence>
                  <xs:element minOccurs="0" name="TestCrawlRuleResult"
type="xs:boolean" />
               </xs:sequence>
            </xs:complexType>
         </xs:element>
         <xs:element name="TestCrawlRules">
            <xs:complexType>
               <xs:sequence>
                  <xs:element minOccurs="0" name="versionIn" type="xs:int" />
                  <xs:element minOccurs="0" name="url" nillable="true"
type="xs:string" />
               </xs:sequence>
            </xs:complexType>
         </xs:element>
         <xs:element name="TestCrawlRulesResponse">
            <xs:complexType>
               <xs:sequence>
                  <xs:element minOccurs="0" name="TestCrawlRulesResult"
nillable="true" type="xs:string" />
               </xs:sequence>
            </xs:complexType>
         </xs:element>
         <xs:element name="SetCrawlRulePriority">
            <xs:complexType>
               <xs:sequence>
                  <xs:element minOccurs="0" name="versionIn" type="xs:int" />
                  <xs:element minOccurs="0" name="currentUser" nillable="true"
type="xs:string" />
                  <xs:element minOccurs="0" name="path" nillable="true"
type="xs:string" />
                  <xs:element minOccurs="0" name="currentPriority" type="xs:int" />
                  <xs:element minOccurs="0" name="newPriority" type="xs:int" />
               </xs:sequence>
```

```xml
          </xs:complexType>
        </xs:element>
        <xs:element name="SetCrawlRulePriorityResponse">
          <xs:complexType>
            <xs:sequence>
              <xs:element minOccurs="0" name="SetCrawlRulePriorityResult" type="xs:int" />
            </xs:sequence>
          </xs:complexType>
        </xs:element>
        <xs:element name="SetCrawlRuleCredentials">
          <xs:complexType>
            <xs:sequence>
              <xs:element minOccurs="0" name="versionIn" type="xs:int" />
              <xs:element minOccurs="0" name="path" nillable="true" type="xs:string" />
              <xs:element minOccurs="0" name="authType" type="xs:int" />
              <xs:element minOccurs="0" name="authString1" nillable="true" type="xs:string" />
              <xs:element minOccurs="0" name="authString2" nillable="true" type="xs:string" />
            </xs:sequence>
          </xs:complexType>
        </xs:element>
        <xs:element name="SetCrawlRuleCredentialsResponse">
          <xs:complexType>
            <xs:sequence>
              <xs:element minOccurs="0" name="SetCrawlRuleCredentialsResult" type="xs:int" />
            </xs:sequence>
          </xs:complexType>
        </xs:element>
        <xs:element name="SetCrawlRuleCredentials2">
          <xs:complexType>
            <xs:sequence>
              <xs:element minOccurs="0" name="versionIn" type="xs:int" />
              <xs:element minOccurs="0" name="currentUser" nillable="true" type="xs:string" />
              <xs:element minOccurs="0" name="path" nillable="true" type="xs:string" />
              <xs:element minOccurs="0" name="authType" type="xs:int" />
              <xs:element minOccurs="0" name="authString1" nillable="true" type="xs:string" />
              <xs:element minOccurs="0" name="authString2" nillable="true" type="xs:string" />
              <xs:element minOccurs="0" name="authString3" nillable="true" type="xs:string" />
              <xs:element minOccurs="0" name="authString4" nillable="true" type="xs:string" />
```

```xml
                <xs:element minOccurs="0" name="lastModified" type="xs:dateTime" />
            </xs:sequence>
        </xs:complexType>
    </xs:element>
    <xs:element name="SetCrawlRuleCredentials2Response">
        <xs:complexType>
            <xs:sequence>
                <xs:element minOccurs="0" name="SetCrawlRuleCredentials2Result" type="xs:int" />
            </xs:sequence>
        </xs:complexType>
    </xs:element>
    <xs:element name="GetSiteRestrictionList">
        <xs:complexType>
            <xs:sequence>
                <xs:element minOccurs="0" name="versionIn" type="xs:int" />
            </xs:sequence>
        </xs:complexType>
    </xs:element>
    <xs:element name="GetSiteRestrictionListResponse">
        <xs:complexType>
            <xs:sequence>
                <xs:element xmlns:q7="http://schemas.datacontract.org/2004/07/Microsoft.Office.Server.Search.Internal.Administration" minOccurs="0" name="GetSiteRestrictionListResult" nillable="true" type="q7:ArrayOfSiteRestrictionInternal" />
            </xs:sequence>
        </xs:complexType>
    </xs:element>
    <xs:element name="AddSiteRestriction">
        <xs:complexType>
            <xs:sequence>
                <xs:element minOccurs="0" name="versionIn" type="xs:int" />
                <xs:element minOccurs="0" name="name" nillable="true" type="xs:string" />
            </xs:sequence>
        </xs:complexType>
    </xs:element>
    <xs:element name="AddSiteRestrictionResponse">
        <xs:complexType>
            <xs:sequence>
                <xs:element minOccurs="0" name="AddSiteRestrictionResult" nillable="true" type="xs:string" />
            </xs:sequence>
        </xs:complexType>
    </xs:element>
    <xs:element name="RemoveSiteRestriction">
        <xs:complexType>
```

```
                <xs:sequence>
                        <xs:element minOccurs="0" name="versionIn" type="xs:int" />
                        <xs:element minOccurs="0" name="name" nillable="true" type="xs:string" />
                </xs:sequence>
            </xs:complexType>
        </xs:element>
        <xs:element name="RemoveSiteRestrictionResponse">
            <xs:complexType>
                <xs:sequence>
                        <xs:element minOccurs="0" name="RemoveSiteRestriction Result" type="xs:int" />
                </xs:sequence>
            </xs:complexType>
        </xs:element>
        <xs:element name="AddSitePath">
            <xs:complexType>
                <xs:sequence>
                        <xs:element minOccurs="0" name="versionIn" type="xs:int" />
                        <xs:element minOccurs="0" name="restrictionName" nillable="true" type="xs:string" />
                        <xs:element minOccurs="0" name="path" nillable="true" type="xs:string" />
                        <xs:element minOccurs="0" name="contentClass" nillable="true" type="xs:string" />
                </xs:sequence>
            </xs:complexType>
        </xs:element>
        <xs:element name="AddSitePathResponse">
            <xs:complexType>
                <xs:sequence>
                        <xs:element minOccurs="0" name="AddSitePathResult" nillable="true" type="xs:string" />
                </xs:sequence>
            </xs:complexType>
        </xs:element>
        <xs:element name="RemoveSitePath">
            <xs:complexType>
                <xs:sequence>
                        <xs:element minOccurs="0" name="versionIn" type="xs:int" />
                        <xs:element minOccurs="0" name="restrictionName" nillable="true" type="xs:string" />
                        <xs:element minOccurs="0" name="path" nillable="true" type="xs:string" />
                </xs:sequence>
            </xs:complexType>
        </xs:element>
        <xs:element name="RemoveSitePathResponse">
```

```
                <xs:complexType>
                    <xs:sequence>
                        <xs:element minOccurs="0" name="RemoveSitePathResult"
type="xs:int" />
                    </xs:sequence>
                </xs:complexType>
            </xs:element>
            <xs:element name="GetContentSources">
                <xs:complexType>
                    <xs:sequence>
                        <xs:element minOccurs="0" name="versionIn" type="xs:int"
/>
                    </xs:sequence>
                </xs:complexType>
            </xs:element>
            <xs:element name="GetContentSourcesResponse">
                <xs:complexType>
                    <xs:sequence>
                        <xs:element
xmlns:q8="http://schemas.datacontract.org/2004/07/Microsoft.Office.Server.Search.Internal.
Administration" minOccurs="0" name="GetContentSourcesResult"
type="q8:ContentSourcesInternal" />
                    </xs:sequence>
                </xs:complexType>
            </xs:element>
            <xs:element name="AddContentSource">
                <xs:complexType>
                    <xs:sequence>
                        <xs:element minOccurs="0" name="versionIn" type="xs:int"
/>
                        <xs:element minOccurs="0" name="currentUser"
nillable="true" type="xs:string" />
                        <xs:element minOccurs="0" name="type" type="xs:int" />
<xs:element xmlns:q9="http://schemas.datacontract.org/2004/07/Microsoft.Office.
Server.Search.Administration" minOccurs="0" name="wssCrawlStyle"
type="q9:SharePointCrawlBehavior" />
                        <xs:element minOccurs="0" name="name" nillable="true"
type="xs:string" />
                    </xs:sequence>
                </xs:complexType>
            </xs:element>
            <xs:element name="AddContentSourceResponse">
                <xs:complexType>
                    <xs:sequence>
                        <xs:element minOccurs="0" name="AddContentSource
Result" type="xs:int" />
                    </xs:sequence>
                </xs:complexType>
            </xs:element>
```

```xml
<xs:element name="RemoveContentSource">
    <xs:complexType>
        <xs:sequence>
            <xs:element minOccurs="0" name="versionIn" type="xs:int" />
            <xs:element minOccurs="0" name="currentUser" nillable="true" type="xs:string" />
            <xs:element minOccurs="0" name="id" type="xs:int" />
        </xs:sequence>
    </xs:complexType>
</xs:element>
<xs:element name="RemoveContentSourceResponse">
    <xs:complexType>
        <xs:sequence>
            <xs:element minOccurs="0" name="RemoveContentSourceResult" type="xs:int" />
        </xs:sequence>
    </xs:complexType>
</xs:element>
<xs:element name="GetCrawlMappings">
    <xs:complexType>
        <xs:sequence>
            <xs:element minOccurs="0" name="versionIn" type="xs:int" />
        </xs:sequence>
    </xs:complexType>
</xs:element>
<xs:element name="GetCrawlMappingsResponse">
    <xs:complexType>
        <xs:sequence>
            <xs:element xmlns:q10="http://schemas.datacontract.org/2004/07/Microsoft.Office.Server.Search.Internal.Administration" minOccurs="0" name="GetCrawlMappingsResult" nillable="true" type="q10:ArrayOfCrawlMappingInternal" />
        </xs:sequence>
    </xs:complexType>
</xs:element>
<xs:element name="AddCrawlMapping">
    <xs:complexType>
        <xs:sequence>
            <xs:element minOccurs="0" name="versionIn" type="xs:int" />
            <xs:element minOccurs="0" name="currentUser" nillable="true" type="xs:string" />
            <xs:element minOccurs="0" name="source" nillable="true" type="xs:string" />
            <xs:element minOccurs="0" name="target" nillable="true" type="xs:string" />
        </xs:sequence>
```

```
                </xs:complexType>
            </xs:element>
            <xs:element name="AddCrawlMappingResponse">
                <xs:complexType>
                    <xs:sequence>
                        <xs:element minOccurs="0" name="AddCrawlMappingResult" type="xs:int" />
                    </xs:sequence>
                </xs:complexType>
            </xs:element>
            <xs:element name="RemoveCrawlMapping">
                <xs:complexType>
                    <xs:sequence>
                        <xs:element minOccurs="0" name="versionIn" type="xs:int" />
                        <xs:element minOccurs="0" name="currentUser" nillable="true" type="xs:string" />
                        <xs:element minOccurs="0" name="source" nillable="true" type="xs:string" />
                    </xs:sequence>
                </xs:complexType>
            </xs:element>
            <xs:element name="RemoveCrawlMappingResponse">
                <xs:complexType>
                    <xs:sequence>
                        <xs:element minOccurs="0" name="RemoveCrawlMappingResult" type="xs:int" />
                    </xs:sequence>
                </xs:complexType>
            </xs:element>
            <xs:element name="ListKnownLotusNotesDatabases">
                <xs:complexType>
                    <xs:sequence>
                        <xs:element minOccurs="0" name="serverName" nillable="true" type="xs:string" />
                    </xs:sequence>
                </xs:complexType>
            </xs:element>
            <xs:element name="ListKnownLotusNotesDatabasesResponse">
                <xs:complexType>
                    <xs:sequence>
                        <xs:element xmlns:q11="http://schemas.microsoft.com/2003/10/Serialization/Arrays" minOccurs="0" name="ListKnownLotusNotesDatabasesResult" nillable="true" type="q11:ArrayOfstring" />
                    </xs:sequence>
                </xs:complexType>
            </xs:element>
            <xs:element name="DisableCrawlComponent">
                <xs:complexType>
```

```xml
                    <xs:sequence>
                        <xs:element minOccurs="0" name="crawlComponent
Number" type="xs:unsignedInt" />
                    </xs:sequence>
                </xs:complexType>
            </xs:element>
            <xs:element name="DisableCrawlComponentResponse">
                <xs:complexType>
                    <xs:sequence />
                </xs:complexType>
            </xs:element>
            <xs:element name="GetConnectorProperty">
                <xs:complexType>
                    <xs:sequence>
                        <xs:element minOccurs="0" name="name"
nillable="true" type="xs:string" />
                    </xs:sequence>
                </xs:complexType>
            </xs:element>
            <xs:element name="GetConnectorPropertyResponse">
                <xs:complexType>
                    <xs:sequence>
                        <xs:element minOccurs="0"
name="GetConnectorPropertyResult" nillable="true" type="xs:string" />
                    </xs:sequence>
                </xs:complexType>
            </xs:element>
            <xs:element name="SetConnectorProperty">
                <xs:complexType>
                    <xs:sequence>
                        <xs:element minOccurs="0" name="name"
nillable="true" type="xs:string" />
                        <xs:element minOccurs="0" name="value"
nillable="true" type="xs:string" />
                    </xs:sequence>
                </xs:complexType>
            </xs:element>
            <xs:element name="SetConnectorPropertyResponse">
                <xs:complexType>
                    <xs:sequence />
                </xs:complexType>
            </xs:element>
            <xs:element name="IncreaseRegistryVersion">
                <xs:complexType>
                    <xs:sequence />
                </xs:complexType>
            </xs:element>
            <xs:element name="IncreaseRegistryVersionResponse">
                <xs:complexType>
```

```xml
                        <xs:sequence />
                    </xs:complexType>
                </xs:element>
                <xs:element name="ValidateApplicationPath">
                    <xs:complexType>
                        <xs:sequence>
                            <xs:element minOccurs="0" name="path" nillable="true" type="xs:string" />
                            <xs:element minOccurs="0" name="minFreeDiskSpace" type="xs:long" />
                        </xs:sequence>
                    </xs:complexType>
                </xs:element>
                <xs:element name="ValidateApplicationPathResponse">
                    <xs:complexType>
                        <xs:sequence>
                            <xs:element minOccurs="0" name="ValidateApplicationPathResult" type="xs:long" />
                        </xs:sequence>
                    </xs:complexType>
                </xs:element>
                <xs:element name="GetVersion">
                    <xs:complexType>
                        <xs:sequence />
                    </xs:complexType>
                </xs:element>
                <xs:element name="GetVersionResponse">
                    <xs:complexType>
                        <xs:sequence>
                            <xs:element minOccurs="0" name="GetVersionResult" type="xs:int" />
                        </xs:sequence>
                    </xs:complexType>
                </xs:element>
                <xs:element name="GetRegistryVersion">
                    <xs:complexType>
                        <xs:sequence />
                    </xs:complexType>
                </xs:element>
                <xs:element name="GetRegistryVersionResponse">
                    <xs:complexType>
                        <xs:sequence>
                            <xs:element minOccurs="0" name="GetRegistryVersionResult" type="xs:int" />
                        </xs:sequence>
                    </xs:complexType>
                </xs:element>
                <xs:element name="IsCaseSensitiveURL">
                    <xs:complexType>
```

```
                    <xs:sequence>
                        <xs:element minOccurs="0" name="strURL"
nillable="true" type="xs:string" />
                    </xs:sequence>
                </xs:complexType>
            </xs:element>
            <xs:element name="IsCaseSensitiveURLResponse">
                <xs:complexType>
                    <xs:sequence>
                        <xs:element minOccurs="0" name="IsCaseSensitive
URLResult" type="xs:boolean" />
                    </xs:sequence>
                </xs:complexType>
            </xs:element>
            <xs:element name="ReEncryptExistingPasswords">
                <xs:complexType>
                    <xs:sequence>
                        <xs:element minOccurs="0" name="oldMasterKey"
nillable="true" type="xs:string" />
                    </xs:sequence>
                </xs:complexType>
            </xs:element>
            <xs:element name="ReEncryptExistingPasswordsResponse">
                <xs:complexType>
                    <xs:sequence>
                        <xs:element minOccurs="0" name="ReEncrypt
ExistingPasswordsResult" type="xs:boolean" />
                    </xs:sequence>
                </xs:complexType>
            </xs:element>
            <xs:element name="WaitForInProgressAnchorCrawlToComplete">
                <xs:complexType>
                    <xs:sequence />
                </xs:complexType>
            </xs:element>
            <xs:element name="WaitForInProgressAnchorCrawlToComplete
Response">
                <xs:complexType>
                    <xs:sequence>
                        <xs:element minOccurs="0" name="WaitFor
InProgressAnchorCrawlToCompleteResult" type="xs:boolean" />
                    </xs:sequence>
                </xs:complexType>
            </xs:element>
            <xs:element name="IsAnchorCrawlIdle">
                <xs:complexType>
                    <xs:sequence />
                </xs:complexType>
            </xs:element>
```

```
                <xs:element name="IsAnchorCrawlIdleResponse">
                    <xs:complexType>
                        <xs:sequence>
                            <xs:element minOccurs="0" name="IsAnchorCrawl
IdleResult" type="xs:boolean" />
                        </xs:sequence>
                    </xs:complexType>
                </xs:element>
                <xs:element name="SetProperty">
                    <xs:complexType>
                        <xs:sequence>
                            <xs:element minOccurs="0" name="propertyName"
nillable="true" type="xs:string" />
                            <xs:element minOccurs="0" name="value"
nillable="true" type="xs:anyType" />
                        </xs:sequence>
                    </xs:complexType>
                </xs:element>
                <xs:element name="SetPropertyResponse">
                    <xs:complexType>
                        <xs:sequence>
                            <xs:element minOccurs="0" name="SetProperty
Result" type="xs:boolean" />
                        </xs:sequence>
                    </xs:complexType>
                </xs:element>
                <xs:element name="GetProperty">
                    <xs:complexType>
                        <xs:sequence>
                            <xs:element minOccurs="0" name="property
Name" nillable="true" type="xs:string" />
                        </xs:sequence>
                    </xs:complexType>
                </xs:element>
                <xs:element name="GetPropertyResponse">
                    <xs:complexType>
                        <xs:sequence>
                            <xs:element minOccurs="0"
name="GetPropertyResult" nillable="true" type="xs:anyType" />
                        </xs:sequence>
                    </xs:complexType>
                </xs:element>
                <xs:element name="GetCrawlComponentRegistryVersion">
                    <xs:complexType>
                        <xs:sequence>
                            <xs:element minOccurs="0" name="application
Name" nillable="true" type="xs:string" />
                        </xs:sequence>
                    </xs:complexType>
```

```
                </xs:element>
                <xs:element name="GetCrawlComponentRegistry
VersionResponse">
                    <xs:complexType>
                        <xs:sequence>
                            <xs:element minOccurs="0" name="GetCrawl
ComponentRegistryVersionResult" type="xs:int" />
                        </xs:sequence>
                    </xs:complexType>
                </xs:element>
                <xs:element name="IncrementVersion">
                    <xs:complexType>
                        <xs:sequence>
                            <xs:element minOccurs="0" name="versionIn"
type="xs:int" />
                        </xs:sequence>
                    </xs:complexType>
                </xs:element>
                <xs:element name="IncrementVersionResponse">
                    <xs:complexType>
                        <xs:sequence>
                            <xs:element minOccurs="0" name="Increment
VersionResult" type="xs:int" />
                        </xs:sequence>
                    </xs:complexType>
                </xs:element>
                <xs:element name="SetDefaultGatheringAccount">
                    <xs:complexType>
                        <xs:sequence>
                            <xs:element minOccurs="0" name="versionIn"
type="xs:int" />
                            <xs:element minOccurs="0" name="account"
nillable="true" type="xs:string" />
                            <xs:element minOccurs="0" name="password"
nillable="true" type="xs:string" />
                        </xs:sequence>
                    </xs:complexType>
                </xs:element>
                <xs:element name="SetDefaultGatheringAccountResponse">
                    <xs:complexType>
                        <xs:sequence>
                            <xs:element minOccurs="0" name="SetDefault
GatheringAccountResult" type="xs:int" />
                        </xs:sequence>
                    </xs:complexType>
                </xs:element>
                <xs:element name="GetContentState">
                    <xs:complexType>
                        <xs:sequence>
```

```
                                        <xs:element minOccurs="0" name=
"versionIn" type="xs:int" />
                                        </xs:sequence>
                                    </xs:complexType>
                                </xs:element>
                                <xs:element name="GetContentStateResponse">
                                    <xs:complexType>
                                        <xs:sequence>
                                            <xs:element
xmlns:q12="http://schemas.datacontract.org/2004/07/Microsoft.Office.Server.Search.Internal
.Administration" minOccurs="0" name="GetContentStateResult" nillable="true"
type="q12:ContentStateInternal" />
                                        </xs:sequence>
                                    </xs:complexType>
                                </xs:element>
                                <xs:element name="SetRetryLimit">
                                    <xs:complexType>
                                        <xs:sequence>
                                            <xs:element minOccurs="0" name=
"versionIn" type="xs:int" />
                                            <xs:element minOccurs="0"
name="retryLimit" type="xs:int" />
                                        </xs:sequence>
                                    </xs:complexType>
                                </xs:element>
                                <xs:element name="SetRetryLimitResponse">
                                    <xs:complexType>
                                        <xs:sequence>
                                            <xs:element minOccurs="0"
name="SetRetryLimitResult" type="xs:int" />
                                        </xs:sequence>
                                    </xs:complexType>
                                </xs:element>
                                <xs:element name="SetContentSourcesMetadata">
                                    <xs:complexType>
                                        <xs:sequence>
                                            <xs:element minOccurs="0"
name="versionIn" type="xs:int" />
                                            <xs:element minOccurs="0"
name="metadata" nillable="true" type="xs:string" />
                                        </xs:sequence>
                                    </xs:complexType>
                                </xs:element>
                                <xs:element name="SetContentSourcesMetadataResponse">
                                    <xs:complexType>
                                        <xs:sequence>
                                            <xs:element minOccurs="0"
name="SetContentSourcesMetadataResult" type="xs:int" />
                                        </xs:sequence>
```

```xml
        </xs:complexType>
    </xs:element>
    <xs:element name="CatalogPauseStatus">
        <xs:complexType>
            <xs:sequence />
        </xs:complexType>
    </xs:element>
    <xs:element name="CatalogPauseStatusResponse">
        <xs:complexType>
            <xs:sequence>
                <xs:element minOccurs="0" name="CatalogPauseStatusResult" type="xs:int" />
            </xs:sequence>
        </xs:complexType>
    </xs:element>
    <xs:element name="IsCatalogPauseCompleted">
        <xs:complexType>
            <xs:sequence>
                <xs:element minOccurs="0" name="reason" type="xs:int" />
            </xs:sequence>
        </xs:complexType>
    </xs:element>
    <xs:element name="IsCatalogPauseCompletedResponse">
        <xs:complexType>
            <xs:sequence>
                <xs:element minOccurs="0" name="IsCatalogPauseCompletedResult" type="xs:boolean" />
            </xs:sequence>
        </xs:complexType>
    </xs:element>
    <xs:element name="StartRankingUpdate">
        <xs:complexType>
            <xs:sequence>
                <xs:element minOccurs="0" name="versionIn" type="xs:int" />
                <xs:element xmlns:q13="http://schemas.datacontract.org/2004/07/Microsoft.Office.Server.Search.Administration" minOccurs="0" name="type" type="q13:RankingUpdateType" />
            </xs:sequence>
        </xs:complexType>
    </xs:element>
    <xs:element name="StartRankingUpdateResponse">
        <xs:complexType>
            <xs:sequence />
        </xs:complexType>
    </xs:element>
    <xs:element name="IsDeleteCrawlInProgress">
        <xs:complexType>
```

```
                                <xs:sequence>
                                        <xs:element minOccurs="0"
name="versionIn" type="xs:int" />
                                </xs:sequence>
                        </xs:complexType>
                </xs:element>
                <xs:element name="IsDeleteCrawlInProgressResponse">
                        <xs:complexType>
                                <xs:sequence>
                                        <xs:element minOccurs="0"
name="IsDeleteCrawlInProgressResult" type="xs:boolean" />
                                </xs:sequence>
                        </xs:complexType>
                </xs:element>
                <xs:element name="RefreshContentSource">
                        <xs:complexType>
                                <xs:sequence>
                                        <xs:element minOccurs="0"
name="versionIn" type="xs:int" />
                                        <xs:element minOccurs="0" name="id"
type="xs:int" />
                                </xs:sequence>
                        </xs:complexType>
                </xs:element>
                <xs:element name="RefreshContentSourceResponse">
                        <xs:complexType>
                                <xs:sequence>
                                        <xs:element
xmlns:q14="http://schemas.datacontract.org/2004/07/Microsoft.Office.Server.Search.Internal
.Administration" minOccurs="0" name="RefreshContentSourceResult" nillable="true"
type="q14:ContentSourceDynamicPropsInternal" />
                                </xs:sequence>
                        </xs:complexType>
                </xs:element>
                <xs:element name="RefreshAnchorContentSource">
                        <xs:complexType>
                                <xs:sequence>
                                        <xs:element minOccurs="0"
name="versionIn" type="xs:int" />
                                </xs:sequence>
                        </xs:complexType>
                </xs:element>
                <xs:element name="RefreshAnchorContentSource
Response">
                        <xs:complexType>
                                <xs:sequence>
                                        <xs:element
xmlns:q15="http://schemas.datacontract.org/2004/07/Microsoft.Office.Server.Search.Internal
```

```xml
.Administration" minOccurs="0" name="RefreshAnchorContentSourceResult" nillable="true" type="q15:ContentSourceDynamicPropsInternal" />
                    </xs:sequence>
                  </xs:complexType>
                </xs:element>
                <xs:element name="EditContentSource">
                  <xs:complexType>
                    <xs:sequence>
                      <xs:element minOccurs="0" name="versionIn" type="xs:int" />
                      <xs:element minOccurs="0" name="currentUser" nillable="true" type="xs:string" />
                      <xs:element minOccurs="0" name="id" type="xs:int" />
                      <xs:element minOccurs="0" name="name" nillable="true" type="xs:string" />
                      <xs:element minOccurs="0" name="metadata" nillable="true" type="xs:string" />
                      <xs:element minOccurs="0" name="hostDepth" type="xs:int" />
                      <xs:element minOccurs="0" name="enumerationDepth" type="xs:int" />
                      <xs:element minOccurs="0" name="followDirectories" type="xs:boolean" />
                      <xs:element xmlns:q16="http://schemas.microsoft.com/2003/10/Serialization/Arrays" minOccurs="0" name="startAddresses" nillable="true" type="q16:ArrayOfstring" />
                      <xs:element minOccurs="0" name="fullCrawlTrigger" nillable="true" type="xs:base64Binary" />
                      <xs:element minOccurs="0" name="incCrawlTrigger" nillable="true" type="xs:base64Binary" />
                      <xs:element minOccurs="0" name="crawlPriority" type="xs:int" />
                    </xs:sequence>
                  </xs:complexType>
                </xs:element>
                <xs:element name="EditContentSourceResponse">
                  <xs:complexType>
                    <xs:sequence>
                      <xs:element minOccurs="0" name="EditContentSourceResult" type="xs:int" />
                    </xs:sequence>
                  </xs:complexType>
                </xs:element>
                <xs:element name="GetPropagationInternal">
                  <xs:complexType>
                    <xs:sequence>
                      <xs:element minOccurs="0" name="versionIn" type="xs:int" />
```

```xml
            </xs:sequence>
          </xs:complexType>
        </xs:element>
        <xs:element name="GetPropagationInternalResponse">
          <xs:complexType>
            <xs:sequence>
              <xs:element xmlns:q17="http://schemas.datacontract.org/2004/07/Microsoft.Office.Server.Search.Internal.Administration" minOccurs="0" name="GetPropagationInternalResult" nillable="true" type="q17:PropagationInternal" />
            </xs:sequence>
          </xs:complexType>
        </xs:element>
        <xs:element name="RemoveQueryServer">
          <xs:complexType>
            <xs:sequence>
              <xs:element minOccurs="0" name="versionIn" type="xs:int" />
              <xs:element minOccurs="0" name="serverName" nillable="true" type="xs:string" />
            </xs:sequence>
          </xs:complexType>
        </xs:element>
        <xs:element name="RemoveQueryServerResponse">
          <xs:complexType>
            <xs:sequence />
          </xs:complexType>
        </xs:element>
        <xs:element name="StartCrawl">
          <xs:complexType>
            <xs:sequence>
              <xs:element minOccurs="0" name="versionIn" type="xs:int" />
              <xs:element minOccurs="0" name="currentUser" nillable="true" type="xs:string" />
              <xs:element minOccurs="0" name="contentSource" type="xs:int" />
              <xs:element minOccurs="0" name="type" type="xs:int" />
            </xs:sequence>
          </xs:complexType>
        </xs:element>
        <xs:element name="StartCrawlResponse">
          <xs:complexType>
            <xs:sequence>
              <xs:element xmlns:q18="http://schemas.datacontract.org/2004/07/Microsoft.Office.Server.Search.Internal.Administration" minOccurs="0" name="StartCrawlResult" nillable="true" type="q18:ContentSourceDynamicPropsInternal" />
```

```
                        </xs:sequence>
                    </xs:complexType>
                </xs:element>
                <xs:element name="PauseCrawl">
                    <xs:complexType>
                        <xs:sequence>
                            <xs:element minOccurs="0" name="versionIn" type="xs:int" />
                            <xs:element minOccurs="0" name="currentUser" nillable="true" type="xs:string" />
                            <xs:element minOccurs="0" name="contentSource" type="xs:int" />
                        </xs:sequence>
                    </xs:complexType>
                </xs:element>
                <xs:element name="PauseCrawlResponse">
                    <xs:complexType>
                        <xs:sequence>
                            <xs:element xmlns:q19="http://schemas.datacontract.org/2004/07/Microsoft.Office.Server.Search.Internal.Administration" minOccurs="0" name="PauseCrawlResult" nillable="true" type="q19:ContentSourceDynamicPropsInternal" />
                        </xs:sequence>
                    </xs:complexType>
                </xs:element>
                <xs:element name="ResumeCrawl">
                    <xs:complexType>
                        <xs:sequence>
                            <xs:element minOccurs="0" name="versionIn" type="xs:int" />
                            <xs:element minOccurs="0" name="currentUser" nillable="true" type="xs:string" />
                            <xs:element minOccurs="0" name="contentSource" type="xs:int" />
                        </xs:sequence>
                    </xs:complexType>
                </xs:element>
                <xs:element name="ResumeCrawlResponse">
                    <xs:complexType>
                        <xs:sequence>
                            <xs:element xmlns:q20="http://schemas.datacontract.org/2004/07/Microsoft.Office.Server.Search.Internal.Administration" minOccurs="0" name="ResumeCrawlResult" nillable="true" type="q20:ContentSourceDynamicPropsInternal" />
                        </xs:sequence>
                    </xs:complexType>
                </xs:element>
                <xs:element name="StopCrawl">
                    <xs:complexType>
```

```xml
<xs:sequence>
    <xs:element minOccurs="0" name="versionIn" type="xs:int" />
    <xs:element minOccurs="0" name="currentUser" nillable="true" type="xs:string" />
    <xs:element minOccurs="0" name="contentSource" type="xs:int" />
</xs:sequence>
        </xs:complexType>
    </xs:element>
    <xs:element name="StopCrawlResponse">
        <xs:complexType>
            <xs:sequence>
                <xs:element xmlns:q21="http://schemas.datacontract.org/2004/07/Microsoft.Office.Server.Search.Internal.Administration" minOccurs="0" name="StopCrawlResult" nillable="true" type="q21:ContentSourceDynamicPropsInternal" />
            </xs:sequence>
        </xs:complexType>
    </xs:element>
    <xs:element name="SetContentSourceProperty">
        <xs:complexType>
            <xs:sequence>
                <xs:element minOccurs="0" name="versionIn" type="xs:int" />
                <xs:element minOccurs="0" name="contentSource" type="xs:int" />
                <xs:element minOccurs="0" name="propertyName" nillable="true" type="xs:string" />
                <xs:element minOccurs="0" name="value" nillable="true" type="xs:anyType" />
            </xs:sequence>
        </xs:complexType>
    </xs:element>
    <xs:element name="SetContentSourcePropertyResponse">
        <xs:complexType>
            <xs:sequence>
                <xs:element xmlns:q22="http://schemas.datacontract.org/2004/07/Microsoft.Office.Server.Search.Internal.Administration" minOccurs="0" name="SetContentSourcePropertyResult" nillable="true" type="q22:ContentSourceDynamicPropsInternal" />
            </xs:sequence>
        </xs:complexType>
    </xs:element>
    <xs:element name="GetContentSourceProperty">
        <xs:complexType>
            <xs:sequence>
                <xs:element minOccurs="0" name="versionIn" type="xs:int" />
```

```
                                        <xs:element minOccurs="0"
name="contentSource" type="xs:int" />
                                        <xs:element minOccurs="0"
name="propertyName" nillable="true" type="xs:string" />
                                </xs:sequence>
                        </xs:complexType>
                </xs:element>
                <xs:element name="GetContentSourcePropertyResponse">
                        <xs:complexType>
                                <xs:sequence>
                                        <xs:element minOccurs="0" name=
"GetContentSourcePropertyResult" nillable="true" type="xs:anyType" />
                                </xs:sequence>
                        </xs:complexType>
                </xs:element>
                <xs:element name="MountApp">
                        <xs:complexType>
                                <xs:sequence>
                                        <xs:element minOccurs="0" name=
"gathererApplicationName" nillable="true" type="xs:string" />
                                </xs:sequence>
                        </xs:complexType>
                </xs:element>
                <xs:element name="MountAppResponse">
                        <xs:complexType>
                                <xs:sequence />
                        </xs:complexType>
                </xs:element>
                <xs:element name="DismountApp">
                        <xs:complexType>
                                <xs:sequence>
                                        <xs:element minOccurs="0" name=
"applicationName" nillable="true" type="xs:string" />
                                </xs:sequence>
                        </xs:complexType>
                </xs:element>
                <xs:element name="DismountAppResponse">
                        <xs:complexType>
                                <xs:sequence />
                        </xs:complexType>
                </xs:element>
                <xs:element name="IsMounted">
                        <xs:complexType>
                                <xs:sequence>
                                        <xs:element minOccurs="0" name="applicationName"
nillable="true" type="xs:string" />
                                </xs:sequence>
                        </xs:complexType>
                </xs:element>
```

```xml
<xs:element name="IsMountedResponse">
    <xs:complexType>
        <xs:sequence>
            <xs:element minOccurs="0" name="IsMountedResult" type="xs:boolean" />
        </xs:sequence>
    </xs:complexType>
</xs:element>
<xs:element name="RemoveApp">
    <xs:complexType>
        <xs:sequence>
            <xs:element minOccurs="0" name="applicationName" nillable="true" type="xs:string" />
            <xs:element minOccurs="0" name="indexLocation" nillable="true" type="xs:string" />
            <xs:element minOccurs="0" name="force" type="xs:boolean" />
        </xs:sequence>
    </xs:complexType>
</xs:element>
<xs:element name="RemoveAppResponse">
    <xs:complexType>
        <xs:sequence />
    </xs:complexType>
</xs:element>
<xs:element name="GetGathererApplications">
    <xs:complexType>
        <xs:sequence />
    </xs:complexType>
</xs:element>
<xs:element name="GetGathererApplicationsResponse">
    <xs:complexType>
        <xs:sequence>
            <xs:element xmlns:q23="http://schemas.microsoft.com/2003/10/Serialization/Arrays" minOccurs="0" name="GetGathererApplicationsResult" nillable="true" type="q23:ArrayOfstring" />
        </xs:sequence>
    </xs:complexType>
</xs:element>
</xs:schema>
<xs:schema xmlns:tns="http://schemas.datacontract.org/2004/07/Microsoft.Office.Server.Search.Administration" elementFormDefault="qualified" targetNamespace="http://schemas.datacontract.org/2004/07/Microsoft.Office.Server.Search.Administration" xmlns:xs="http://www.w3.org/2001/XMLSchema">
    <xs:simpleType name="ComponentRole">
        <xs:restriction base="xs:string">
            <xs:enumeration value="Admin" />
            <xs:enumeration value="Query" />
```

```xml
            <xs:enumeration value="Crawl" />
            <xs:enumeration value="Standalone" />
          </xs:restriction>
        </xs:simpleType>
        <xs:element name="ComponentRole" nillable="true" type="tns:ComponentRole" />
        <xs:simpleType name="SharePointCrawlBehavior">
          <xs:restriction base="xs:string">
            <xs:enumeration value="CrawlVirtualServers" />
            <xs:enumeration value="CrawlSites" />
          </xs:restriction>
        </xs:simpleType>
        <xs:element name="SharePointCrawlBehavior" nillable="true" type="tns:SharePointCrawlBehavior" />
        <xs:simpleType name="RankingUpdateType">
          <xs:restriction base="xs:string">
            <xs:enumeration value="FullUpdate" />
            <xs:enumeration value="ClickDistanceUpdate" />
            <xs:enumeration value="QueryIndependentRankRefresh" />
          </xs:restriction>
        </xs:simpleType>
        <xs:element name="RankingUpdateType" nillable="true" type="tns:RankingUpdateType" />
      </xs:schema>
      <xs:schema xmlns:tns="http://schemas.microsoft.com/2003/10/Serialization/" attributeFormDefault="qualified" elementFormDefault="qualified" targetNamespace="http://schemas.microsoft.com/2003/10/Serialization/" xmlns:xs="http://www.w3.org/2001/XMLSchema">
        <xs:element name="anyType" nillable="true" type="xs:anyType" />
        <xs:element name="anyURI" nillable="true" type="xs:anyURI" />
        <xs:element name="base64Binary" nillable="true" type="xs:base64Binary" />
        <xs:element name="boolean" nillable="true" type="xs:boolean" />
        <xs:element name="byte" nillable="true" type="xs:byte" />
        <xs:element name="dateTime" nillable="true" type="xs:dateTime" />
        <xs:element name="decimal" nillable="true" type="xs:decimal" />
        <xs:element name="double" nillable="true" type="xs:double" />
        <xs:element name="float" nillable="true" type="xs:float" />
        <xs:element name="int" nillable="true" type="xs:int" />
        <xs:element name="long" nillable="true" type="xs:long" />
        <xs:element name="QName" nillable="true" type="xs:QName" />
        <xs:element name="short" nillable="true" type="xs:short" />
        <xs:element name="string" nillable="true" type="xs:string" />
        <xs:element name="unsignedByte" nillable="true" type="xs:unsignedByte" />
        <xs:element name="unsignedInt" nillable="true" type="xs:unsignedInt" />
        <xs:element name="unsignedLong" nillable="true" type="xs:unsignedLong" />
        <xs:element name="unsignedShort" nillable="true" type="xs:unsignedShort" />
        <xs:element name="char" nillable="true" type="tns:char" />
        <xs:simpleType name="char">
          <xs:restriction base="xs:int" />
```

```
      </xs:simpleType>
      <xs:element name="duration" nillable="true" type="tns:duration" />
      <xs:simpleType name="duration">
         <xs:restriction base="xs:duration">
            <xs:pattern value="\-?P(\d*D)?(T(\d*H)?(\d*M)?(\d*(\.\d*)?S)?)?" />
            <xs:minInclusive value="-P10675199DT2H48M5.4775808S" />
            <xs:maxInclusive value="P10675199DT2H48M5.4775807S" />
         </xs:restriction>
      </xs:simpleType>
      <xs:element name="guid" nillable="true" type="tns:guid" />
      <xs:simpleType name="guid">
         <xs:restriction base="xs:string">
            <xs:pattern value="[\da-fA-F]{8}-[\da-fA-F]{4}-[\da-fA-F]{4}-[\da-fA-F]{4}-[\da-fA-F]{12}" />
         </xs:restriction>
      </xs:simpleType>
      <xs:attribute name="FactoryType" type="xs:QName" />
      <xs:attribute name="Id" type="xs:ID" />
      <xs:attribute name="Ref" type="xs:IDREF" />
   </xs:schema>
   <xs:schema xmlns:tns="http://schemas.datacontract.org/2004/07/Microsoft.Office.Server.Search.Internal.Administration" elementFormDefault="qualified" targetNamespace="http://schemas.datacontract.org/2004/07/Microsoft.Office.Server.Search.Internal.Administration" xmlns:xs="http://www.w3.org/2001/XMLSchema">
      <xs:import namespace="http://schemas.microsoft.com/2003/10/Serialization/" />
      <xs:import namespace="http://schemas.microsoft.com/2003/10/Serialization/Arrays" />
      <xs:import namespace="http://schemas.datacontract.org/2004/07/Microsoft.Office.Server.Search.Administration" />
      <xs:complexType name="TriggerUpdate">
         <xs:sequence>
            <xs:element minOccurs="0" name="description" nillable="true" type="xs:string" />
            <xs:element minOccurs="0" name="nextStart" type="xs:dateTime" />
         </xs:sequence>
      </xs:complexType>
      <xs:element name="TriggerUpdate" nillable="true" type="tns:TriggerUpdate" />
      <xs:complexType name="ArrayOfCrawlRuleInternal">
         <xs:sequence>
            <xs:element minOccurs="0" maxOccurs="unbounded" name="CrawlRuleInternal" nillable="true" type="tns:CrawlRuleInternal" />
         </xs:sequence>
      </xs:complexType>
      <xs:element name="ArrayOfCrawlRuleInternal" nillable="true" type="tns:ArrayOfCrawlRuleInternal" />
      <xs:complexType name="CrawlRuleInternal">
         <xs:sequence>
```

```xml
            <xs:element minOccurs="0" name="accountLastModified" type="xs:dateTime" />
            <xs:element minOccurs="0" name="accountName" nillable="true" type="xs:string" />
            <xs:element minOccurs="0" name="authData" nillable="true" type="xs:string" />
            <xs:element minOccurs="0" name="authUrl" nillable="true" type="xs:string" />
            <xs:element minOccurs="0" name="authenticationType" type="xs:int" />
            <xs:element minOccurs="0" name="caseSensitiveURL" type="xs:boolean" />
            <xs:element minOccurs="0" name="contentClass" nillable="true" type="xs:string" />
            <xs:element minOccurs="0" name="crawlAsHttp" type="xs:boolean" />
            <xs:element minOccurs="0" name="followComplexUrls" type="xs:boolean" />
            <xs:element minOccurs="0" name="isAdvancedRegularExpression" type="xs:boolean" />
            <xs:element minOccurs="0" name="miscData" nillable="true" type="xs:string" />
            <xs:element minOccurs="0" name="path" nillable="true" type="xs:string" />
            <xs:element minOccurs="0" name="pluggableSecurityTrimmerId" type="xs:int" />
            <xs:element minOccurs="0" name="suppressIndexing" type="xs:boolean" />
            <xs:element minOccurs="0" name="type" type="xs:int" />
        </xs:sequence>
    </xs:complexType>
    <xs:element name="CrawlRuleInternal" nillable="true" type="tns:CrawlRuleInternal" />
    <xs:complexType name="ArrayOfSiteRestrictionInternal">
        <xs:sequence>
            <xs:element minOccurs="0" maxOccurs="unbounded" name="SiteRestrictionInternal" nillable="true" type="tns:SiteRestrictionInternal" />
        </xs:sequence>
    </xs:complexType>
    <xs:element name="ArrayOfSiteRestrictionInternal" nillable="true" type="tns:ArrayOfSiteRestrictionInternal" />
    <xs:complexType name="SiteRestrictionInternal">
        <xs:sequence>
            <xs:element minOccurs="0" name="name" nillable="true" type="xs:string" />
            <xs:element minOccurs="0" name="paths" nillable="true" type="tns:ArrayOfSitePathInternal" />
        </xs:sequence>
    </xs:complexType>
    <xs:element name="SiteRestrictionInternal" nillable="true" type="tns:SiteRestrictionInternal" />
    <xs:complexType name="ArrayOfSitePathInternal">
      <xs:sequence>
            <xs:element minOccurs="0" maxOccurs="unbounded" name="SitePathInternal" nillable="true" type="tns:SitePathInternal" />
        </xs:sequence>
```

```
        </xs:complexType>
        <xs:element name="ArrayOfSitePathInternal" nillable="true"
type="tns:ArrayOfSitePathInternal" />
        <xs:complexType name="SitePathInternal">
          <xs:sequence>
            <xs:element minOccurs="0" name="contentClass" nillable="true"
type="xs:string" />
            <xs:element minOccurs="0" name="path" nillable="true" type="xs:string" />
          </xs:sequence>
        </xs:complexType>
        <xs:element name="SitePathInternal" nillable="true" type="tns:SitePathInternal" />
        <xs:complexType name="ContentSourcesInternal">
          <xs:sequence>
            <xs:element minOccurs="0" name="contentSourcesInternal" nillable="true"
type="tns:ArrayOfContentSourceInternal" />
            <xs:element minOccurs="0" name="metadata" nillable="true"
type="xs:string" />
          </xs:sequence>
        </xs:complexType>
        <xs:element name="ContentSourcesInternal" nillable="true"
type="tns:ContentSourcesInternal" />
        <xs:complexType name="ArrayOfContentSourceInternal">
          <xs:sequence>
            <xs:element minOccurs="0" maxOccurs="unbounded"
name="ContentSourceInternal" nillable="true" type="tns:ContentSourceInternal" />
          </xs:sequence>
        </xs:complexType>
        <xs:element name="ArrayOfContentSourceInternal" nillable="true"
type="tns:ArrayOfContentSourceInternal" />
        <xs:complexType name="ContentSourceInternal">
          <xs:sequence>
            <xs:element minOccurs="0" name="crawlPriority" type="xs:int" />
            <xs:element minOccurs="0" name="dynamic" nillable="true"
type="tns:ContentSourceDynamicPropsInternal" />
            <xs:element minOccurs="0" name="followDirectories" type="xs:boolean" />
            <xs:element minOccurs="0" name="fullCrawlTrigger" nillable="true"
type="xs:base64Binary" />
            <xs:element minOccurs="0" name="fullScheduleDescription" nillable="true"
type="xs:string" />
            <xs:element minOccurs="0" name="id" type="xs:int" />
            <xs:element minOccurs="0" name="incCrawlTrigger" nillable="true"
type="xs:base64Binary" />
            <xs:element minOccurs="0" name="incScheduleDescription" nillable="true"
type="xs:string" />
            <xs:element minOccurs="0" name="metadata" nillable="true" type="xs:string"
/>
            <xs:element minOccurs="0" name="name" nillable="true" type="xs:string" />
            <xs:element minOccurs="0" name="nextFullCrawlStart" type="xs:dateTime"
/>
```

```xml
            <xs:element minOccurs="0" name="nextIncCrawlStart" type="xs:dateTime" />
            <xs:element minOccurs="0" name="pageDepth" type="xs:int" />
            <xs:element minOccurs="0" name="siteDepth" type="xs:int" />
            <xs:element xmlns:q1="http://schemas.microsoft.com/2003/10/Serialization/Arrays" minOccurs="0" name="startAddresses" nillable="true" type="q1:ArrayOfstring" />
            <xs:element minOccurs="0" name="systemCreated" type="xs:boolean" />
            <xs:element minOccurs="0" name="type" type="xs:int" />
            <xs:element xmlns:q2="http://schemas.datacontract.org/2004/07/Microsoft.Office.Server.Search.Administration" minOccurs="0" name="wssCrawlStyle" type="q2:SharePointCrawlBehavior" />
        </xs:sequence>
    </xs:complexType>
    <xs:element name="ContentSourceInternal" nillable="true" type="tns:ContentSourceInternal" />
    <xs:complexType name="ContentSourceDynamicPropsInternal">
        <xs:sequence>
            <xs:element minOccurs="0" name="crawlCompleted" type="xs:dateTime" />
            <xs:element minOccurs="0" name="crawlStarted" type="xs:dateTime" />
            <xs:element minOccurs="0" name="crawlStatus" type="xs:int" />
            <xs:element minOccurs="0" name="deleteCount" type="xs:int" />
            <xs:element minOccurs="0" name="errorCount" type="xs:int" />
            <xs:element minOccurs="0" name="levelHighErrorCount" type="xs:int" />
            <xs:element minOccurs="0" name="successCount" type="xs:int" />
            <xs:element minOccurs="0" name="warningCount" type="xs:int" />
        </xs:sequence>
    </xs:complexType>
    <xs:element name="ContentSourceDynamicPropsInternal" nillable="true" type="tns:ContentSourceDynamicPropsInternal" />
    <xs:complexType name="ArrayOfCrawlMappingInternal">
        <xs:sequence>
            <xs:element minOccurs="0" maxOccurs="unbounded" name="CrawlMappingInternal" nillable="true" type="tns:CrawlMappingInternal" />
        </xs:sequence>
    </xs:complexType>
    <xs:element name="ArrayOfCrawlMappingInternal" nillable="true" type="tns:ArrayOfCrawlMappingInternal" />
    <xs:complexType name="CrawlMappingInternal">
        <xs:sequence>
            <xs:element minOccurs="0" name="source" nillable="true" type="xs:string" />
            <xs:element minOccurs="0" name="target" nillable="true" type="xs:string" />
        </xs:sequence>
    </xs:complexType>
    <xs:element name="CrawlMappingInternal" nillable="true" type="tns:CrawlMappingInternal" />
```

```xml
<xs:complexType name="ContentStateInternal">
    <xs:sequence>
        <xs:element xmlns:q3="http://schemas.microsoft.com/2003/10/Serialization/Arrays" minOccurs="0" name="activeDocuments" nillable="true" type="q3:ArrayOfstring" />
        <xs:element minOccurs="0" name="anchorContentSourceId" type="xs:int" />
        <xs:element xmlns:q4="http://schemas.microsoft.com/2003/10/Serialization/Arrays" minOccurs="0" name="clientCertificateNames" nillable="true" type="q4:ArrayOfstring" />
        <xs:element minOccurs="0" name="defaultGatheringAccount" nillable="true" type="xs:string" />
        <xs:element xmlns:q5="http://schemas.microsoft.com/2003/10/Serialization/Arrays" minOccurs="0" name="listKnownLotusNotesServers" nillable="true" type="q5:ArrayOfstring" />
        <xs:element minOccurs="0" name="lotusNotesConfigured" type="xs:boolean" />
        <xs:element minOccurs="0" name="retryLimit" type="xs:int" />
    </xs:sequence>
</xs:complexType>
<xs:element name="ContentStateInternal" nillable="true" type="tns:ContentStateInternal" />
<xs:complexType name="PropagationInternal">
    <xs:sequence>
        <xs:element minOccurs="0" name="propagationStatus" type="xs:int" />
        <xs:element minOccurs="0" name="type" type="xs:int" />
    </xs:sequence>
</xs:complexType>
<xs:element name="PropagationInternal" nillable="true" type="tns:PropagationInternal" />
</xs:schema>
<xs:schema xmlns:tns="http://schemas.microsoft.com/2003/10/Serialization/Arrays" elementFormDefault="qualified" targetNamespace="http://schemas.microsoft.com/2003/10/Serialization/Arrays" xmlns:xs="http://www.w3.org/2001/XMLSchema">
    <xs:complexType name="ArrayOfstring">
        <xs:sequence>
            <xs:element minOccurs="0" maxOccurs="unbounded" name="string" nillable="true" type="xs:string" />
        </xs:sequence>
    </xs:complexType>
    <xs:element name="ArrayOfstring" nillable="true" type="tns:ArrayOfstring" />
</xs:schema>
</wsdl:types>
<wsdl:message name="ISearchApplicationAdminWebService_AddApp_InputMessage">
    <wsdl:part name="parameters" element="tns:AddApp" />
</wsdl:message>
<wsdl:message name="ISearchApplicationAdminWebService_AddApp_OutputMessage">
```

```xml
        <wsdl:part name="parameters" element="tns:AddAppResponse" />
    </wsdl:message>
    <wsdl:message name="ISearchApplicationAdminWebService_RemoveAll
GathererApplications_InputMessage">
        <wsdl:part name="parameters" element="tns:RemoveAllGatherer
Applications" />
    </wsdl:message>
    <wsdl:message
name="ISearchApplicationAdminWebService_RemoveAllGathererApplications_OutputMes
sage">
        <wsdl:part name="parameters" element="tns:RemoveAllGatherer
ApplicationsResponse" />
    </wsdl:message>
    <wsdl:message
name="ISearchApplicationAdminWebService_ValidateScheduleTrigger_InputMessage">
        <wsdl:part name="parameters" element="tns:ValidateScheduleTrigger" />
    </wsdl:message>
    <wsdl:message
name="ISearchApplicationAdminWebService_ValidateScheduleTrigger_OutputMessage">
<wsdl:part name="parameters" element="tns:ValidateScheduleTriggerResponse" />
    </wsdl:message>
    <wsdl:message
name="ISearchApplicationAdminWebService_AddExtension_InputMessage">
<wsdl:part name="parameters" element="tns:AddExtension" />
    </wsdl:message>
    <wsdl:message name="ISearchApplicationAdminWebService_AddExtension
_OutputMessage">
        <wsdl:part name="parameters" element="tns:AddExtensionResponse" />
    </wsdl:message>
    <wsdl:message name="ISearchApplicationAdminWebService_RemoveExtension
_InputMessage">
        <wsdl:part name="parameters" element="tns:RemoveExtension" />
    </wsdl:message>
    <wsdl:message name="ISearchApplicationAdminWebService_Remove
Extension_OutputMessage">
        <wsdl:part name="parameters" element="tns:RemoveExtensionResponse" />
    </wsdl:message>
    <wsdl:message name="ISearchApplicationAdminWebService_ClearExtensionList
_InputMessage">
        <wsdl:part name="parameters" element="tns:ClearExtensionList" />
    </wsdl:message>
    <wsdl:message name="ISearchApplicationAdminWebService_ClearExtensionList_
OutputMessage">
        <wsdl:part name="parameters" element="tns:ClearExtensionListResponse" />
    </wsdl:message>
    <wsdl:message name="ISearchApplicationAdminWebService_GetExtensionList_
InputMessage">
        <wsdl:part name="parameters" element="tns:GetExtensionList" />
    </wsdl:message>
```

```xml
<wsdl:message name="ISearchApplicationAdminWebService_GetExtensionList_OutputMessage">
    <wsdl:part name="parameters" element="tns:GetExtensionListResponse" />
</wsdl:message>
<wsdl:message name="ISearchApplicationAdminWebService_SetIsExtensionIncludeList_InputMessage">
    <wsdl:part name="parameters" element="tns:SetIsExtensionIncludeList" />
</wsdl:message>
<wsdl:message name="ISearchApplicationAdminWebService_SetIsExtensionIncludeList_OutputMessage">
    <wsdl:part name="parameters" element="tns:SetIsExtensionIncludeListResponse" />
</wsdl:message>
<wsdl:message name="ISearchApplicationAdminWebService_IsExtensionIncludeList_InputMessage">
    <wsdl:part name="parameters" element="tns:IsExtensionIncludeList" />
</wsdl:message>
<wsdl:message name="ISearchApplicationAdminWebService_IsExtensionIncludeList_OutputMessage">
    <wsdl:part name="parameters" element="tns:IsExtensionIncludeListResponse" />
</wsdl:message>
<wsdl:message name="ISearchApplicationAdminWebService_AddCrawlRule_InputMessage">
    <wsdl:part name="parameters" element="tns:AddCrawlRule" />
</wsdl:message>
<wsdl:message name="ISearchApplicationAdminWebService_AddCrawlRule_OutputMessage">
    <wsdl:part name="parameters" element="tns:AddCrawlRuleResponse" />
</wsdl:message>
<wsdl:message name="ISearchApplicationAdminWebService_AddAdvancedCrawlRule_InputMessage">
    <wsdl:part name="parameters" element="tns:AddAdvancedCrawlRule" />
</wsdl:message>
<wsdl:message name="ISearchApplicationAdminWebService_AddAdvancedCrawlRule_OutputMessage">
    <wsdl:part name="parameters" element="tns:AddAdvancedCrawlRuleResponse" />
</wsdl:message>
<wsdl:message name="ISearchApplicationAdminWebService_RemoveCrawlRule_InputMessage">
    <wsdl:part name="parameters" element="tns:RemoveCrawlRule" />
</wsdl:message>
<wsdl:message name="ISearchApplicationAdminWebService_RemoveCrawlRule_OutputMessage">
    <wsdl:part name="parameters" element="tns:RemoveCrawlRuleResponse" />
</wsdl:message>
<wsdl:message name="ISearchApplicationAdminWebService_GetCrawlRuleList_InputMessage">
```

```
        <wsdl:part name="parameters" element="tns:GetCrawlRuleList" />
    </wsdl:message>
    <wsdl:message name="ISearchApplicationAdminWebService_GetCrawlRuleList_OutputMessage">
        <wsdl:part name="parameters" element="tns:GetCrawlRuleListResponse" />
    </wsdl:message>
    <wsdl:message name="ISearchApplicationAdminWebService_UpdateCrawlRule_InputMessage">
        <wsdl:part name="parameters" element="tns:UpdateCrawlRule" />
    </wsdl:message>
    <wsdl:message name="ISearchApplicationAdminWebService_UpdateCrawlRule_OutputMessage">
        <wsdl:part name="parameters" element="tns:UpdateCrawlRuleResponse" />
    </wsdl:message>
    <wsdl:message name="ISearchApplicationAdminWebService_ActivateCrawlRule_InputMessage">
        <wsdl:part name="parameters" element="tns:ActivateCrawlRule" />
    </wsdl:message>
    <wsdl:message name="ISearchApplicationAdminWebService_ActivateCrawlRule_OutputMessage">
        <wsdl:part name="parameters" element="tns:ActivateCrawlRuleResponse" />
    </wsdl:message>
    <wsdl:message name="ISearchApplicationAdminWebService_TestCrawlRule_InputMessage">
        <wsdl:part name="parameters" element="tns:TestCrawlRule" />
    </wsdl:message>
    <wsdl:message name="ISearchApplicationAdminWebService_TestCrawlRule_OutputMessage">
        <wsdl:part name="parameters" element="tns:TestCrawlRuleResponse" />
    </wsdl:message>
    <wsdl:message name="ISearchApplicationAdminWebService_TestCrawlRules_InputMessage">
        <wsdl:part name="parameters" element="tns:TestCrawlRules" />
    </wsdl:message>
    <wsdl:message name="ISearchApplicationAdminWebService_TestCrawlRules_OutputMessage">
        <wsdl:part name="parameters" element="tns:TestCrawlRulesResponse" />
    </wsdl:message>
    <wsdl:message name="ISearchApplicationAdminWebService_SetCrawlRulePriority_InputMessage">
        <wsdl:part name="parameters" element="tns:SetCrawlRulePriority" />
    </wsdl:message>
    <wsdl:message name="ISearchApplicationAdminWebService_SetCrawlRulePriority_OutputMessage">
        <wsdl:part name="parameters" element="tns:SetCrawlRulePriorityResponse" />
    </wsdl:message>
    <wsdl:message name="ISearchApplicationAdminWebService_SetCrawlRuleCredentials_InputMessage">
        <wsdl:part name="parameters" element="tns:SetCrawlRuleCredentials" />
```

```
            </wsdl:message>
            <wsdl:message name="ISearchApplicationAdminWebService_SetCrawlRule
Credentials_OutputMessage">
                <wsdl:part name="parameters" element="tns:SetCrawlRuleCredentials
Response" />
            </wsdl:message>
            <wsdl:message name="ISearchApplicationAdminWebService_SetCrawlRule
Credentials2_InputMessage">
                <wsdl:part name="parameters" element="tns:SetCrawlRuleCredentials2" />
            </wsdl:message>
            <wsdl:message name="ISearchApplicationAdminWebService_SetCrawlRule
Credentials2_OutputMessage">
                <wsdl:part name="parameters" element="tns:SetCrawlRuleCredentials
2Response" />
            </wsdl:message>
            <wsdl:message name="ISearchApplicationAdminWebService_GetSiteRestriction
List_InputMessage">
                <wsdl:part name="parameters" element="tns:GetSiteRestrictionList" />
            </wsdl:message>
            <wsdl:message name="ISearchApplicationAdminWebService_GetSiteRestriction
List_OutputMessage">
                <wsdl:part name="parameters" element="tns:GetSiteRestrictionListResponse" />
            </wsdl:message>
            <wsdl:message name="ISearchApplicationAdminWebService_AddSite
Restriction_InputMessage">
                <wsdl:part name="parameters" element="tns:AddSiteRestriction" />
            </wsdl:message>
            <wsdl:message name="ISearchApplicationAdminWebService_AddSite
Restriction_OutputMessage">
                <wsdl:part name="parameters" element="tns:AddSiteRestrictionResponse" />
            </wsdl:message>
            <wsdl:message name="ISearchApplicationAdminWebService_RemoveSite
Restriction_InputMessage">
                <wsdl:part name="parameters" element="tns:RemoveSiteRestriction" />
            </wsdl:message>
            <wsdl:message name="ISearchApplicationAdminWebService_RemoveSite
Restriction_OutputMessage">
                <wsdl:part name="parameters" element="tns:RemoveSiteRestrictionResponse" />
            </wsdl:message>
            <wsdl:message name="ISearchApplicationAdminWebService_
AddSitePath_InputMessage">
                <wsdl:part name="parameters" element="tns:AddSitePath" />
            </wsdl:message>
            <wsdl:message name="ISearchApplicationAdminWebService_AddSitePath
_OutputMessage">
                <wsdl:part name="parameters" element="tns:AddSitePathResponse" />
            </wsdl:message>
```

```xml
<wsdl:message name="ISearchApplicationAdminWebService_Remove
SitePath_InputMessage">
        <wsdl:part name="parameters" element="tns:RemoveSitePath" />
</wsdl:message>
<wsdl:message name="ISearchApplicationAdminWebService_RemoveSitePath
_OutputMessage">
        <wsdl:part name="parameters" element="tns:RemoveSitePathResponse" />
</wsdl:message>
<wsdl:message name="ISearchApplicationAdminWebService_GetContent
Sources_InputMessage">
        <wsdl:part name="parameters" element="tns:GetContentSources" />
</wsdl:message>
<wsdl:message name="ISearchApplicationAdminWebService_GetContent
Sources_OutputMessage">
        <wsdl:part name="parameters" element="tns:GetContentSourcesResponse" />
</wsdl:message>
<wsdl:message name="ISearchApplicationAdminWebService_AddContent
Source_InputMessage">
        <wsdl:part name="parameters" element="tns:AddContentSource" />
</wsdl:message>
<wsdl:message name="ISearchApplicationAdminWebService_AddContentSource
_OutputMessage">
        <wsdl:part name="parameters" element="tns:AddContentSourceResponse" />
</wsdl:message>
<wsdl:message name="ISearchApplicationAdminWebService_RemoveContent
Source_InputMessage">
        <wsdl:part name="parameters" element="tns:RemoveContentSource" />
</wsdl:message>
<wsdl:message name="ISearchApplicationAdminWebService_RemoveContent
Source_OutputMessage">
        <wsdl:part name="parameters" element="tns:RemoveContentSourceResponse"
/>
</wsdl:message>
<wsdl:message name="ISearchApplicationAdminWebService_GetCrawl
Mappings_InputMessage">
        <wsdl:part name="parameters" element="tns:GetCrawlMappings" />
</wsdl:message>
<wsdl:message name="ISearchApplicationAdminWebService_GetCrawlMappings
_OutputMessage">
        <wsdl:part name="parameters" element="tns:GetCrawlMappingsResponse" />
</wsdl:message>
<wsdl:message name="ISearchApplicationAdminWebService_AddCrawl
Mapping_InputMessage">
        <wsdl:part name="parameters" element="tns:AddCrawlMapping" />
</wsdl:message>
<wsdl:message name="ISearchApplicationAdminWebService_AddCrawl
Mapping_OutputMessage">
        <wsdl:part name="parameters" element="tns:AddCrawlMappingResponse" />
</wsdl:message>
```

```xml
<wsdl:message name="ISearchApplicationAdminWebService_RemoveCrawl
Mapping_InputMessage">
        <wsdl:part name="parameters" element="tns:RemoveCrawlMapping" />
</wsdl:message>
<wsdl:message name="ISearchApplicationAdminWebService_RemoveCrawlMapping
_OutputMessage">
        <wsdl:part name="parameters" element="tns:RemoveCrawlMappingResponse" />
</wsdl:message>
<wsdl:message name="ISearchApplicationAdminWebService_ListKnownLotus
NotesDatabases_InputMessage">
        <wsdl:part name="parameters" element="tns:ListKnownLotusNotesDatabases" />
</wsdl:message>
<wsdl:message name="ISearchApplicationAdminWebService_ListKnownLotus
NotesDatabases_OutputMessage">
        <wsdl:part name="parameters" element="tns:ListKnownLotusNotes
DatabasesResponse" />
</wsdl:message>
<wsdl:message name="ISearchApplicationAdminWebService_DisableCrawl
Component_InputMessage">
        <wsdl:part name="parameters" element="tns:DisableCrawlComponent" />
</wsdl:message>
<wsdl:message name="ISearchApplicationAdminWebService_DisableCrawl
Component_OutputMessage">
        <wsdl:part name="parameters" element="tns:DisableCrawlComponent
Response" />
</wsdl:message>
<wsdl:message name="ISearchApplicationAdminWebService_GetConnector
Property_InputMessage">
        <wsdl:part name="parameters" element="tns:GetConnectorProperty" />
</wsdl:message>
<wsdl:message name="ISearchApplicationAdminWebService_GetConnector
Property_OutputMessage">
        <wsdl:part name="parameters" element="tns:GetConnectorPropertyResponse" />
</wsdl:message>
<wsdl:message name="ISearchApplicationAdminWebService_SetConnector
Property_InputMessage">
        <wsdl:part name="parameters" element="tns:SetConnectorProperty" />
</wsdl:message>
<wsdl:message name="ISearchApplicationAdminWebService_SetConnector
Property_OutputMessage">
        <wsdl:part name="parameters" element="tns:SetConnectorPropertyResponse" />
</wsdl:message>
<wsdl:message name="ISearchApplicationAdminWebService_IncreaseRegistry
Version_InputMessage">
        <wsdl:part name="parameters" element="tns:IncreaseRegistryVersion" />
</wsdl:message>
```

```
            <wsdl:message name="ISearchApplicationAdminWebService_IncreaseRegistry
Version_OutputMessage">
                    <wsdl:part name="parameters" element="tns:IncreaseRegistryVersion
Response" />
            </wsdl:message>
            <wsdl:message name="ISearchApplicationAdminWebService_ValidateApplication
Path_InputMessage">
                    <wsdl:part name="parameters" element="tns:ValidateApplicationPath" />
            </wsdl:message>
            <wsdl:message name="ISearchApplicationAdminWebService_ValidateApplication
Path_OutputMessage">
                    <wsdl:part name="parameters" element="tns:ValidateApplicationPath
Response" />
            </wsdl:message>
            <wsdl:message name="ISearchApplicationAdminWebService_GetVersion_
InputMessage">
                    <wsdl:part name="parameters" element="tns:GetVersion" />
            </wsdl:message>
            <wsdl:message name="ISearchApplicationAdminWebService_GetVersion_
OutputMessage">
                    <wsdl:part name="parameters" element="tns:GetVersionResponse" />
            </wsdl:message>
            <wsdl:message name="ISearchApplicationAdminWebService_GetRegistry
Version_InputMessage">
                    <wsdl:part name="parameters" element="tns:GetRegistryVersion" />
            </wsdl:message>
            <wsdl:message name="ISearchApplicationAdminWebService_GetRegistry
Version_OutputMessage">
                    <wsdl:part name="parameters" element="tns:GetRegistryVersionResponse"
/>
            </wsdl:message>
            <wsdl:message name="ISearchApplicationAdminWebService_IsCaseSensitive
URL_InputMessage">
                    <wsdl:part name="parameters" element="tns:IsCaseSensitiveURL" />
            </wsdl:message>
            <wsdl:message name="ISearchApplicationAdminWebService_IsCaseSensitive
URL_OutputMessage">
                    <wsdl:part name="parameters" element="tns:IsCaseSensitive
URLResponse" />
            </wsdl:message>
            <wsdl:message name="ISearchApplicationAdminWebService_ReEncryptExisting
Passwords_InputMessage">
                    <wsdl:part name="parameters" element="tns:ReEncryptExisting
Passwords" />
            </wsdl:message>
            <wsdl:message name="ISearchApplicationAdminWebService_ReEncryptExisting
Passwords_OutputMessage">
                    <wsdl:part name="parameters" element="tns:ReEncryptExisting
PasswordsResponse" />
```

```xml
        </wsdl:message>
        <wsdl:message name="ISearchApplicationAdminWebService_WaitForInProgressAnchorCrawlToComplete_InputMessage">
            <wsdl:part name="parameters" element="tns:WaitForInProgressAnchorCrawlToComplete" />
        </wsdl:message>
        <wsdl:message name="ISearchApplicationAdminWebService_WaitForInProgressAnchorCrawlToComplete_OutputMessage">
            <wsdl:part name="parameters" element="tns:WaitForInProgressAnchorCrawlToCompleteResponse" />
        </wsdl:message>
        <wsdl:message name="ISearchApplicationAdminWebService_IsAnchorCrawlIdle_InputMessage">
            <wsdl:part name="parameters" element="tns:IsAnchorCrawlIdle" />
        </wsdl:message>
        <wsdl:message name="ISearchApplicationAdminWebService_IsAnchorCrawlIdle_OutputMessage">
            <wsdl:part name="parameters" element="tns:IsAnchorCrawlIdleResponse" />
        </wsdl:message>
        <wsdl:message name="ISearchApplicationAdminWebService_SetProperty_InputMessage">
            <wsdl:part name="parameters" element="tns:SetProperty" />
        </wsdl:message>
        <wsdl:message name="ISearchApplicationAdminWebService_SetProperty_OutputMessage">
            <wsdl:part name="parameters" element="tns:SetPropertyResponse" />
        </wsdl:message>
        <wsdl:message name="ISearchApplicationAdminWebService_GetProperty_InputMessage">
            <wsdl:part name="parameters" element="tns:GetProperty" />
        </wsdl:message>
        <wsdl:message name="ISearchApplicationAdminWebService_GetProperty_OutputMessage">
            <wsdl:part name="parameters" element="tns:GetPropertyResponse" />
        </wsdl:message>
        <wsdl:message name="ISearchApplicationAdminWebService_GetCrawlComponentRegistryVersion_InputMessage">
            <wsdl:part name="parameters" element="tns:GetCrawlComponentRegistryVersion" />
        </wsdl:message>
        <wsdl:message name="ISearchApplicationAdminWebService_GetCrawlComponentRegistryVersion_OutputMessage">
            <wsdl:part name="parameters" element="tns:GetCrawlComponentRegistryVersionResponse" />
        </wsdl:message>
        <wsdl:message name="ISearchApplicationAdminWebService_IncrementVersion_InputMessage">
            <wsdl:part name="parameters" element="tns:IncrementVersion" />
```

```xml
</wsdl:message>
<wsdl:message name="ISearchApplicationAdminWebService_IncrementVersion_OutputMessage">
    <wsdl:part name="parameters" element="tns:IncrementVersionResponse" />
</wsdl:message>
<wsdl:message name="ISearchApplicationAdminWebService_SetDefaultGatheringAccount_InputMessage">
    <wsdl:part name="parameters" element="tns:SetDefaultGatheringAccount" />
</wsdl:message>
<wsdl:message name="ISearchApplicationAdminWebService_SetDefaultGatheringAccount_OutputMessage">
    <wsdl:part name="parameters" element="tns:SetDefaultGatheringAccountResponse" />
</wsdl:message>
<wsdl:message name="ISearchApplicationAdminWebService_GetContentState_InputMessage">
    <wsdl:part name="parameters" element="tns:GetContentState" />
</wsdl:message>
<wsdl:message name="ISearchApplicationAdminWebService_GetContentState_OutputMessage">
    <wsdl:part name="parameters" element="tns:GetContentStateResponse" />
</wsdl:message>
<wsdl:message name="ISearchApplicationAdminWebService_SetRetryLimit_InputMessage">
    <wsdl:part name="parameters" element="tns:SetRetryLimit" />
</wsdl:message>
<wsdl:message name="ISearchApplicationAdminWebService_SetRetryLimit_OutputMessage">
    <wsdl:part name="parameters" element="tns:SetRetryLimitResponse" />
</wsdl:message>
<wsdl:message name="ISearchApplicationAdminWebService_SetContentSourcesMetadata_InputMessage">
    <wsdl:part name="parameters" element="tns:SetContentSourcesMetadata" />
</wsdl:message>
<wsdl:message name="ISearchApplicationAdminWebService_SetContentSourcesMetadata_OutputMessage">
    <wsdl:part name="parameters" element="tns:SetContentSourcesMetadataResponse" />
</wsdl:message>
<wsdl:message name="ISearchApplicationAdminWebService_CatalogPauseStatus_InputMessage">
    <wsdl:part name="parameters" element="tns:CatalogPauseStatus" />
</wsdl:message>
<wsdl:message name="ISearchApplicationAdminWebService_CatalogPauseStatus_OutputMessage">
    <wsdl:part name="parameters" element="tns:CatalogPauseStatusResponse" />
</wsdl:message>
<wsdl:message name="ISearchApplicationAdminWebService_IsCatalogPauseCompleted_InputMessage">
```

```xml
            <wsdl:part name="parameters" element="tns:IsCatalogPauseCompleted" />
        </wsdl:message>
        <wsdl:message name="ISearchApplicationAdminWebService_IsCatalogPauseCompleted_OutputMessage">
            <wsdl:part name="parameters" element="tns:IsCatalogPauseCompletedResponse" />
        </wsdl:message>
        <wsdl:message name="ISearchApplicationAdminWebService_StartRankingUpdate_InputMessage">
            <wsdl:part name="parameters" element="tns:StartRankingUpdate" />
        </wsdl:message>
        <wsdl:message name="ISearchApplicationAdminWebService_StartRankingUpdate_OutputMessage">
            <wsdl:part name="parameters" element="tns:StartRankingUpdateResponse" />
        </wsdl:message>
        <wsdl:message name="ISearchApplicationAdminWebService_IsDeleteCrawlInProgress_InputMessage">
            <wsdl:part name="parameters" element="tns:IsDeleteCrawlInProgress" />
        </wsdl:message>
        <wsdl:message name="ISearchApplicationAdminWebService_IsDeleteCrawlInProgress_OutputMessage">
            <wsdl:part name="parameters" element="tns:IsDeleteCrawlInProgressResponse" />
        </wsdl:message>
        <wsdl:message name="ISearchApplicationAdminWebService_RefreshContentSource_InputMessage">
            <wsdl:part name="parameters" element="tns:RefreshContentSource" />
        </wsdl:message>
        <wsdl:message name="ISearchApplicationAdminWebService_RefreshContentSource_OutputMessage">
            <wsdl:part name="parameters" element="tns:RefreshContentSourceResponse" />
        </wsdl:message>
        <wsdl:message name="ISearchApplicationAdminWebService_RefreshAnchorContentSource_InputMessage">
            <wsdl:part name="parameters" element="tns:RefreshAnchorContentSource" />
        </wsdl:message>
        <wsdl:message name="ISearchApplicationAdminWebService_RefreshAnchorContentSource_OutputMessage">
            <wsdl:part name="parameters" element="tns:RefreshAnchorContentSourceResponse" />
        </wsdl:message>
        <wsdl:message name="ISearchApplicationAdminWebService_EditContentSource_InputMessage">
            <wsdl:part name="parameters" element="tns:EditContentSource" />
        </wsdl:message>
        <wsdl:message name="ISearchApplicationAdminWebService_EditContentSource_OutputMessage">
```

```xml
            <wsdl:part name="parameters" element="tns:EditContentSource Response" />
        </wsdl:message>
        <wsdl:message name="ISearchApplicationAdminWebService_GetPropagationInternal_InputMessage">
            <wsdl:part name="parameters" element="tns:GetPropagationInternal" />
        </wsdl:message>
        <wsdl:message name="ISearchApplicationAdminWebService_GetPropagationInternal_OutputMessage">
            <wsdl:part name="parameters" element="tns:GetPropagationInternal Response" />
        </wsdl:message>
        <wsdl:message name="ISearchApplicationAdminWebService_RemoveQueryServer_InputMessage">
            <wsdl:part name="parameters" element="tns:RemoveQueryServer" />
        </wsdl:message>
        <wsdl:message name="ISearchApplicationAdminWebService_RemoveQueryServer_OutputMessage">
            <wsdl:part name="parameters" element="tns:RemoveQueryServerResponse" />
        </wsdl:message>
        <wsdl:message name="ISearchApplicationAdminWebService_StartCrawl_InputMessage">
            <wsdl:part name="parameters" element="tns:StartCrawl" />
        </wsdl:message>
        <wsdl:message name="ISearchApplicationAdminWebService_StartCrawl_OutputMessage">
            <wsdl:part name="parameters" element="tns:StartCrawlResponse" />
        </wsdl:message>
        <wsdl:message name="ISearchApplicationAdminWebService_PauseCrawl_InputMessage">
            <wsdl:part name="parameters" element="tns:PauseCrawl" />
        </wsdl:message>
        <wsdl:message name="ISearchApplicationAdminWebService_PauseCrawl_OutputMessage">
            <wsdl:part name="parameters" element="tns:PauseCrawlResponse" />
        </wsdl:message>
        <wsdl:message name="ISearchApplicationAdminWebService_ResumeCrawl_InputMessage">
            <wsdl:part name="parameters" element="tns:ResumeCrawl" />
        </wsdl:message>
        <wsdl:message name="ISearchApplicationAdminWebService_ResumeCrawl_OutputMessage">
            <wsdl:part name="parameters" element="tns:ResumeCrawl Response" />
        </wsdl:message>
```

```xml
<wsdl:message name="ISearchApplicationAdminWebService_StopCrawl_InputMessage">
    <wsdl:part name="parameters" element="tns:StopCrawl" />
</wsdl:message>
<wsdl:message name="ISearchApplicationAdminWebService_StopCrawl_OutputMessage">
    <wsdl:part name="parameters" element="tns:StopCrawlResponse" />
</wsdl:message>
<wsdl:message name="ISearchApplicationAdminWebService_SetContentSourceProperty_InputMessage">
    <wsdl:part name="parameters" element="tns:SetContentSource Property" />
</wsdl:message>
<wsdl:message name="ISearchApplicationAdminWebService_SetContentSourceProperty_OutputMessage">
    <wsdl:part name="parameters" element="tns:SetContentSource PropertyResponse" />
</wsdl:message>
<wsdl:message name="ISearchApplicationAdminWebService_GetContentSourceProperty_InputMessage">
    <wsdl:part name="parameters" element="tns:GetContentSource Property" />
</wsdl:message>
<wsdl:message name="ISearchApplicationAdminWebService_GetContentSourceProperty_OutputMessage">
    <wsdl:part name="parameters" element="tns:GetContentSource PropertyResponse" />
</wsdl:message>
<wsdl:message name="ISearchApplicationAdminWebService_MountApp_InputMessage">
    <wsdl:part name="parameters" element="tns:MountApp" />
</wsdl:message>
<wsdl:message name="ISearchApplicationAdminWebService_MountApp_OutputMessage">
    <wsdl:part name="parameters" element="tns:MountApp Response" />
</wsdl:message>
<wsdl:message name="ISearchApplicationAdminWebService_DismountApp_InputMessage">
    <wsdl:part name="parameters" element="tns:DismountApp" />
</wsdl:message>
<wsdl:message name="ISearchApplicationAdminWebService_DismountApp_OutputMessage">
    <wsdl:part name="parameters" element="tns:DismountApp Response" />
</wsdl:message>
```

```xml
<wsdl:message name="ISearchApplicationAdminWebService_IsMounted_InputMessage">
    <wsdl:part name="parameters" element="tns:IsMounted" />
</wsdl:message>
<wsdl:message name="ISearchApplicationAdminWebService_IsMounted_OutputMessage">
    <wsdl:part name="parameters" element="tns:IsMountedResponse" />
</wsdl:message>
<wsdl:message name="ISearchApplicationAdminWebService_RemoveApp_InputMessage">
    <wsdl:part name="parameters" element="tns:RemoveApp" />
</wsdl:message>
<wsdl:message name="ISearchApplicationAdminWebService_RemoveApp_OutputMessage">
    <wsdl:part name="parameters" element="tns:RemoveAppResponse" />
</wsdl:message>
<wsdl:message name="ISearchApplicationAdminWebService_GetGathererApplications_InputMessage">
    <wsdl:part name="parameters" element="tns:GetGathererApplications" />
</wsdl:message>
<wsdl:message name="ISearchApplicationAdminWebService_GetGathererApplications_OutputMessage">
    <wsdl:part name="parameters" element="tns:GetGathererApplicationsResponse" />
</wsdl:message>
<wsdl:portType name="ISearchApplicationAdminWebService">
    <wsdl:operation name="AddApp">
        <wsdl:input wsam:Action="http://tempuri.org/ISearchApplicationAdminWebService/AddApp" message="tns:ISearchApplicationAdminWebService_AddApp_InputMessage" />
        <wsdl:output wsam:Action="http://tempuri.org/ISearchApplicationAdminWebService/AddAppResponse" message="tns:ISearchApplicationAdminWebService_AddApp_OutputMessage" />
    </wsdl:operation>
    <wsdl:operation name="RemoveAllGathererApplications">
        <wsdl:input wsam:Action="http://tempuri.org/ISearchApplicationAdminWebService/RemoveAllGathererApplications" message="tns:ISearchApplicationAdminWebService_RemoveAllGathererApplications_InputMessage" />
        <wsdl:output wsam:Action="http://tempuri.org/ISearchApplicationAdminWebService/RemoveAllGathererApplicationsResponse" message="tns:ISearchApplicationAdminWebService_RemoveAllGathererApplications_OutputMessage" />
```

```
        </wsdl:operation>
        <wsdl:operation name="ValidateScheduleTrigger">
          <wsdl:input
wsam:Action="http://tempuri.org/ISearchApplicationAdminWebService/ValidateScheduleTr
igger"
message="tns:ISearchApplicationAdminWebService_ValidateScheduleTrigger_InputMessag
e" />
          <wsdl:output
wsam:Action="http://tempuri.org/ISearchApplicationAdminWebService/ValidateScheduleTr
iggerResponse"
message="tns:ISearchApplicationAdminWebService_ValidateScheduleTrigger_OutputMess
age" />
        </wsdl:operation>
        <wsdl:operation name="AddExtension">
          <wsdl:input
wsam:Action="http://tempuri.org/ISearchApplicationAdminWebService/AddExtension"
message="tns:ISearchApplicationAdminWebService_AddExtension_InputMessage" />
          <wsdl:output
wsam:Action="http://tempuri.org/ISearchApplicationAdminWebService/AddExtensionRespo
nse"
message="tns:ISearchApplicationAdminWebService_AddExtension_OutputMessage" />
        </wsdl:operation>
        <wsdl:operation name="RemoveExtension">
          <wsdl:input
wsam:Action="http://tempuri.org/ISearchApplicationAdminWebService/RemoveExtension"
message="tns:ISearchApplicationAdminWebService_RemoveExtension_InputMessage" />
          <wsdl:output
wsam:Action="http://tempuri.org/ISearchApplicationAdminWebService/RemoveExtensionR
esponse"
message="tns:ISearchApplicationAdminWebService_Remove Extension_OutputMessage" />
        </wsdl:operation>
        <wsdl:operation name="ClearExtensionList">
          <wsdl:input
wsam:Action="http://tempuri.org/ISearchApplicationAdminWebService/ClearExtensionList"
message="tns:ISearchApplicationAdminWebService_ClearExtensionList_InputMessage" />
          <wsdl:output
wsam:Action="http://tempuri.org/ISearchApplicationAdminWebService/ClearExtensionList
Response"
message="tns:ISearchApplicationAdminWebService_ClearExtension List_OutputMessage"
/>
        </wsdl:operation>
        <wsdl:operation name="GetExtensionList">
          <wsdl:input
wsam:Action="http://tempuri.org/ISearchApplicationAdminWebService/GetExtensionList"
message="tns:ISearchApplicationAdminWebService_GetExtensionList_InputMessage" />
          <wsdl:output
wsam:Action="http://tempuri.org/ISearchApplicationAdminWebService/GetExtensionListRe
sponse"
message="tns:ISearchApplicationAdminWebService_GetExtension List_OutputMessage" />
```

```
            </wsdl:operation>
            <wsdl:operation name="SetIsExtensionIncludeList">
                <wsdl:input
wsam:Action="http://tempuri.org/ISearchApplicationAdminWebService/SetIsExtensionIncludeList"
message="tns:ISearchApplicationAdminWebService_SetIsExtensionIncludeList_InputMessage" />
                <wsdl:output
wsam:Action="http://tempuri.org/ISearchApplicationAdminWebService/SetIsExtensionIncludeListResponse"
message="tns:ISearchApplicationAdminWebService_SetIsExtensionIncludeList_OutputMessage" />
            </wsdl:operation>
            <wsdl:operation name="IsExtensionIncludeList">
                <wsdl:input
wsam:Action="http://tempuri.org/ISearchApplicationAdminWebService/IsExtensionIncludeList"
message="tns:ISearchApplicationAdminWebService_IsExtensionIncludeList_InputMessage" />
                <wsdl:output
wsam:Action="http://tempuri.org/ISearchApplicationAdminWebService/IsExtensionIncludeListResponse"
message="tns:ISearchApplicationAdminWebService_IsExtensionIncludeList_OutputMessage" />
            </wsdl:operation>
            <wsdl:operation name="AddCrawlRule">
                <wsdl:input
wsam:Action="http://tempuri.org/ISearchApplicationAdminWebService/AddCrawlRule"
message="tns:ISearchApplicationAdminWebService_AddCrawlRule_InputMessage" />
                <wsdl:output
wsam:Action="http://tempuri.org/ISearchApplicationAdminWebService/AddCrawlRuleResponse"
message="tns:ISearchApplicationAdminWebService_AddCrawlRule_OutputMessage" />
            </wsdl:operation>
            <wsdl:operation name="AddAdvancedCrawlRule">
                <wsdl:input
wsam:Action="http://tempuri.org/ISearchApplicationAdminWebService/AddAdvancedCrawlRule"
message="tns:ISearchApplicationAdminWebService_AddAdvancedCrawlRule_InputMessage" />
                <wsdl:output
wsam:Action="http://tempuri.org/ISearchApplicationAdminWebService/AddAdvancedCrawlRuleResponse"
message="tns:ISearchApplicationAdminWebService_AddAdvancedCrawlRule_OutputMessage" />
            </wsdl:operation>
            <wsdl:operation name="RemoveCrawlRule">
```

```xml
            <wsdl:input
wsam:Action="http://tempuri.org/ISearchApplicationAdminWebService/RemoveCrawlRule"
message="tns:ISearchApplicationAdminWebService_RemoveCrawlRule_InputMessage" />
            <wsdl:output wsam:Action="http://tempuri.org/ISearchApplicationAdmin
WebService/RemoveCrawlRuleResponse"
message="tns:ISearchApplicationAdminWebService_RemoveCrawlRule_OutputMessage"
/>
          </wsdl:operation>
          <wsdl:operation name="GetCrawlRuleList">
            <wsdl:input
wsam:Action="http://tempuri.org/ISearchApplicationAdminWebService/GetCrawlRuleList"
message="tns:ISearchApplicationAdminWebService_GetCrawlRuleList_InputMessage" />
            <wsdl:output
wsam:Action="http://tempuri.org/ISearchApplicationAdminWebService/GetCrawlRuleListR
esponse"
message="tns:ISearchApplicationAdminWebService_GetCrawlRuleList_OutputMessage" />
          </wsdl:operation>
          <wsdl:operation name="UpdateCrawlRule">
            <wsdl:input
wsam:Action="http://tempuri.org/ISearchApplicationAdminWebService/UpdateCrawlRule"
message="tns:ISearchApplicationAdminWebService_UpdateCrawlRule_InputMessage" />
            <wsdl:output
wsam:Action="http://tempuri.org/ISearchApplicationAdminWebService/UpdateCrawlRuleR
esponse"
message="tns:ISearchApplicationAdminWebService_UpdateCrawlRule_OutputMessage" />
          </wsdl:operation>
          <wsdl:operation name="ActivateCrawlRule">
            <wsdl:input
wsam:Action="http://tempuri.org/ISearchApplicationAdminWebService/ActivateCrawlRule"
message="tns:ISearchApplicationAdminWebService_ActivateCrawlRule_InputMessage" />
            <wsdl:output
wsam:Action="http://tempuri.org/ISearchApplicationAdminWebService/ActivateCrawlRule
Response"
message="tns:ISearchApplicationAdminWebService_ActivateCrawlRule_OutputMessage"
/>
          </wsdl:operation>
          <wsdl:operation name="TestCrawlRule">
            <wsdl:input
wsam:Action="http://tempuri.org/ISearchApplicationAdminWebService/TestCrawlRule"
message="tns:ISearchApplicationAdminWebService_TestCrawlRule_InputMessage" />
            <wsdl:output
wsam:Action="http://tempuri.org/ISearchApplicationAdminWebService/TestCrawlRuleResp
onse"
message="tns:ISearchApplicationAdminWebService_TestCrawlRule_OutputMessage" />
          </wsdl:operation>
          <wsdl:operation name="TestCrawlRules">
            <wsdl:input
wsam:Action="http://tempuri.org/ISearchApplicationAdminWebService/TestCrawlRules"
message="tns:ISearchApplicationAdminWebService_TestCrawlRules_InputMessage" />
```

```
            <wsdl:output
wsam:Action="http://tempuri.org/ISearchApplicationAdminWebService/TestCrawlRulesRes
ponse"
message="tns:ISearchApplicationAdminWebService_TestCrawlRules_OutputMessage" />
            </wsdl:operation>
            <wsdl:operation name="SetCrawlRulePriority">
            <wsdl:input
wsam:Action="http://tempuri.org/ISearchApplicationAdminWebService/SetCrawlRulePriorit
y"
message="tns:ISearchApplicationAdminWebService_SetCrawlRulePriority_InputMessage"
/>
            <wsdl:output
wsam:Action="http://tempuri.org/ISearchApplicationAdminWebService/SetCrawlRulePriorit
yResponse"
message="tns:ISearchApplicationAdminWebService_SetCrawlRulePriority_OutputMessage"
/>
            </wsdl:operation>
            <wsdl:operation name="SetCrawlRuleCredentials">
            <wsdl:input
wsam:Action="http://tempuri.org/ISearchApplicationAdminWebService/SetCrawlRuleCrede
ntials"
message="tns:ISearchApplicationAdminWebService_SetCrawlRuleCredentials_InputMessag
e" />
            <wsdl:output
wsam:Action="http://tempuri.org/ISearchApplicationAdminWebService/SetCrawlRuleCrede
ntialsResponse"
message="tns:ISearchApplicationAdminWebService_SetCrawlRuleCredentials_OutputMess
age" />
            </wsdl:operation>
            <wsdl:operation name="SetCrawlRuleCredentials2">
            <wsdl:input
wsam:Action="http://tempuri.org/ISearchApplicationAdminWebService/SetCrawlRuleCrede
ntials2"
message="tns:ISearchApplicationAdminWebService_SetCrawlRuleCredentials2_InputMessa
ge" />
            <wsdl:output
wsam:Action="http://tempuri.org/ISearchApplicationAdminWebService/SetCrawlRuleCrede
ntials2Response"
message="tns:ISearchApplicationAdminWebService_SetCrawlRuleCredentials2_OutputMes
sage" />
            </wsdl:operation>
            <wsdl:operation name="GetSiteRestrictionList">
            <wsdl:input
wsam:Action="http://tempuri.org/ISearchApplicationAdminWebService/GetSiteRestrictionL
ist"
message="tns:ISearchApplicationAdminWebService_GetSiteRestrictionList_InputMessage"
/>
            <wsdl:output
wsam:Action="http://tempuri.org/ISearchApplicationAdminWebService/GetSiteRestrictionL
``` istResponse"
message="tns:ISearchApplicationAdminWebService_GetSiteRestrictionList_OutputMessage" />
        </wsdl:operation>
        <wsdl:operation name="AddSiteRestriction">
        <wsdl:input
wsam:Action="http://tempuri.org/ISearchApplicationAdminWebService/AddSiteRestriction"
message="tns:ISearchApplicationAdminWebService_AddSiteRestriction_InputMessage" />
        <wsdl:output
wsam:Action="http://tempuri.org/ISearchApplicationAdminWebService/AddSiteRestrictionResponse"
message="tns:ISearchApplicationAdminWebService_AddSiteRestriction_OutputMessage" />
        </wsdl:operation>
        <wsdl:operation name="RemoveSiteRestriction">
        <wsdl:input
wsam:Action="http://tempuri.org/ISearchApplicationAdminWebService/RemoveSiteRestriction"
message="tns:ISearchApplicationAdminWebService_RemoveSiteRestriction_InputMessage" />
        <wsdl:output
wsam:Action="http://tempuri.org/ISearchApplicationAdminWebService/RemoveSiteRestrictionResponse"
message="tns:ISearchApplicationAdminWebService_RemoveSiteRestriction_OutputMessage" />
        </wsdl:operation>
        <wsdl:operation name="AddSitePath">
        <wsdl:input
wsam:Action="http://tempuri.org/ISearchApplicationAdminWebService/AddSitePath"
message="tns:ISearchApplicationAdminWebService_AddSitePath_InputMessage" />
        <wsdl:output
wsam:Action="http://tempuri.org/ISearchApplicationAdminWebService/AddSitePathResponse"
message="tns:ISearchApplicationAdminWebService_AddSitePath_OutputMessage" />
        </wsdl:operation>
        <wsdl:operation name="RemoveSitePath">
        <wsdl:input
wsam:Action="http://tempuri.org/ISearchApplicationAdminWebService/RemoveSitePath"
message="tns:ISearchApplicationAdminWebService_RemoveSitePath_InputMessage" />
        <wsdl:output
wsam:Action="http://tempuri.org/ISearchApplicationAdminWebService/RemoveSitePathResponse"
message="tns:ISearchApplicationAdminWebService_RemoveSitePath_OutputMessage" />
        </wsdl:operation>
        <wsdl:operation name="GetContentSources">
        <wsdl:input
wsam:Action="http://tempuri.org/ISearchApplicationAdminWebService/GetContentSources"
message="tns:ISearchApplicationAdminWebService_GetContentSources_InputMessage" />

```xml
            <wsdl:output
wsam:Action="http://tempuri.org/ISearchApplicationAdminWebService/GetContentSourcesResponse"
message="tns:ISearchApplicationAdminWebService_GetContent Sources_OutputMessage" />
            </wsdl:operation>
            <wsdl:operation name="AddContentSource">
                <wsdl:input
wsam:Action="http://tempuri.org/ISearchApplicationAdminWebService/AddContentSource"
message="tns:ISearchApplicationAdminWebService_AddContentSource_InputMessage" />
                <wsdl:output
wsam:Action="http://tempuri.org/ISearchApplicationAdminWebService/AddContentSourceResponse"
message="tns:ISearchApplicationAdminWebService_AddContentSource_OutputMessage" />
            </wsdl:operation>
            <wsdl:operation name="RemoveContentSource">
                <wsdl:input
wsam:Action="http://tempuri.org/ISearchApplicationAdminWebService/RemoveContentSource"
message="tns:ISearchApplicationAdminWebService_RemoveContentSource_InputMessage" />
                <wsdl:output
wsam:Action="http://tempuri.org/ISearchApplicationAdminWebService/RemoveContentSourceResponse"
message="tns:ISearchApplicationAdminWebService_RemoveContentSource_OutputMessage" />
            </wsdl:operation>
            <wsdl:operation name="GetCrawlMappings">
                <wsdl:input
wsam:Action="http://tempuri.org/ISearchApplicationAdminWebService/GetCrawlMappings"
message="tns:ISearchApplicationAdminWebService_GetCrawlMappings_InputMessage" />
                <wsdl:output
wsam:Action="http://tempuri.org/ISearchApplicationAdminWebService/GetCrawlMappingsResponse"
message="tns:ISearchApplicationAdminWebService_GetCrawlMappings_OutputMessage" />
            </wsdl:operation>
            <wsdl:operation name="AddCrawlMapping">
                <wsdl:input
wsam:Action="http://tempuri.org/ISearchApplicationAdminWebService/AddCrawlMapping"
message="tns:ISearchApplicationAdminWebService_AddCrawlMapping_InputMessage" />
                <wsdl:output
wsam:Action="http://tempuri.org/ISearchApplicationAdminWebService/AddCrawlMappingResponse"
message="tns:ISearchApplicationAdminWebService_AddCrawlMapping_OutputMessage" />
            </wsdl:operation>
```

```
            <wsdl:operation name="RemoveCrawlMapping">
                <wsdl:input
wsam:Action="http://tempuri.org/ISearchApplicationAdminWebService/RemoveCrawlMapp
ing"
message="tns:ISearchApplicationAdminWebService_RemoveCrawlMapping_InputMessage
" />
                <wsdl:output
wsam:Action="http://tempuri.org/ISearchApplicationAdminWebService/RemoveCrawlMapp
ingResponse"
message="tns:ISearchApplicationAdminWebService_RemoveCrawlMapping_OutputMessag
e" />
            </wsdl:operation>
            <wsdl:operation name="ListKnownLotusNotesDatabases">
                <wsdl:input
wsam:Action="http://tempuri.org/ISearchApplicationAdminWebService/ListKnownLotusNo
tesDatabases"
message="tns:ISearchApplicationAdminWebService_ListKnownLotusNotesDatabases_Input
Message" />
                <wsdl:output
wsam:Action="http://tempuri.org/ISearchApplicationAdminWebService/ListKnownLotusNo
tesDatabasesResponse"
message="tns:ISearchApplicationAdminWebService_ListKnownLotusNotesDatabases_Outp
utMessage" />
            </wsdl:operation>
            <wsdl:operation name="DisableCrawlComponent">
                <wsdl:input
wsam:Action="http://tempuri.org/ISearchApplicationAdminWebService/DisableCrawlComp
onent"
message="tns:ISearchApplicationAdminWebService_DisableCrawlComponent_InputMessag
e" />
                <wsdl:output
wsam:Action="http://tempuri.org/ISearchApplicationAdminWebService/DisableCrawlComp
onentResponse"
message="tns:ISearchApplicationAdminWebService_DisableCrawlComponent_OutputMess
age" />
            </wsdl:operation>
            <wsdl:operation name="GetConnectorProperty">
                <wsdl:input
wsam:Action="http://tempuri.org/ISearchApplicationAdminWebService/GetConnectorPrope
rty"
message="tns:ISearchApplicationAdminWebService_GetConnectorProperty_InputMessage"
/>
                <wsdl:output
wsam:Action="http://tempuri.org/ISearchApplicationAdminWebService/GetConnectorPrope
rtyResponse"
message="tns:ISearchApplicationAdminWebService_GetConnectorProperty_OutputMessage
" />
            </wsdl:operation>
            <wsdl:operation name="SetConnectorProperty">
```

```xml
            <wsdl:input
wsam:Action="http://tempuri.org/ISearchApplicationAdminWebService/SetConnectorProperty"
message="tns:ISearchApplicationAdminWebService_SetConnectorProperty_InputMessage"
/>
            <wsdl:output
wsam:Action="http://tempuri.org/ISearchApplicationAdminWebService/SetConnectorPropertyResponse"
message="tns:ISearchApplicationAdminWebService_SetConnectorProperty_OutputMessage"
/>
          </wsdl:operation>
          <wsdl:operation name="IncreaseRegistryVersion">
            <wsdl:input
wsam:Action="http://tempuri.org/ISearchApplicationAdminWebService/IncreaseRegistryVersion"
message="tns:ISearchApplicationAdminWebService_IncreaseRegistryVersion_InputMessage"
/>
            <wsdl:output
wsam:Action="http://tempuri.org/ISearchApplicationAdminWebService/IncreaseRegistryVersionResponse"
message="tns:ISearchApplicationAdminWebService_IncreaseRegistryVersion_OutputMessage"
/>
          </wsdl:operation>
          <wsdl:operation name="ValidateApplicationPath">
            <wsdl:input
wsam:Action="http://tempuri.org/ISearchApplicationAdminWebService/ValidateApplicationPath"
message="tns:ISearchApplicationAdminWebService_ValidateApplicationPath_InputMessage"
/>
            <wsdl:output
wsam:Action="http://tempuri.org/ISearchApplicationAdminWebService/ValidateApplicationPathResponse"
message="tns:ISearchApplicationAdminWebService_ValidateApplicationPath_OutputMessage"
/>
          </wsdl:operation>
          <wsdl:operation name="GetVersion">
            <wsdl:input
wsam:Action="http://tempuri.org/ISearchApplicationAdminWebService/GetVersion"
message="tns:ISearchApplicationAdminWebService_GetVersion_InputMessage" />
            <wsdl:output
wsam:Action="http://tempuri.org/ISearchApplicationAdminWebService/GetVersionResponse"
message="tns:ISearchApplicationAdminWebService_GetVersion_OutputMessage" />
          </wsdl:operation>
          <wsdl:operation name="GetRegistryVersion">
            <wsdl:input
wsam:Action="http://tempuri.org/ISearchApplicationAdminWebService/GetRegistryVersion"
message="tns:ISearchApplicationAdminWebService_GetRegistryVersion_InputMessage" />
```

```xml
            <wsdl:output
wsam:Action="http://tempuri.org/ISearchApplicationAdminWebService/GetRegistryVersionResponse"
message="tns:ISearchApplicationAdminWebService_GetRegistryVersion_OutputMessage"
/>
        </wsdl:operation>
        <wsdl:operation name="IsCaseSensitiveURL">
            <wsdl:input
wsam:Action="http://tempuri.org/ISearchApplicationAdminWebService/IsCaseSensitiveURL"
message="tns:ISearchApplicationAdminWebService_IsCaseSensitiveURL_InputMessage"
/>
            <wsdl:output
wsam:Action="http://tempuri.org/ISearchApplicationAdminWebService/IsCaseSensitiveURLResponse"
message="tns:ISearchApplicationAdminWebService_IsCaseSensitiveURL_OutputMessage"
/>
        </wsdl:operation>
        <wsdl:operation name="ReEncryptExistingPasswords">
            <wsdl:input
wsam:Action="http://tempuri.org/ISearchApplicationAdminWebService/ReEncryptExistingPasswords"
message="tns:ISearchApplicationAdminWebService_ReEncryptExistingPasswords_InputMessage" />
            <wsdl:output
wsam:Action="http://tempuri.org/ISearchApplicationAdminWebService/ReEncryptExistingPasswordsResponse"
message="tns:ISearchApplicationAdminWebService_ReEncryptExistingPasswords_OutputMessage" />
        </wsdl:operation>
        <wsdl:operation name="WaitForInProgressAnchorCrawlToComplete">
            <wsdl:input
wsam:Action="http://tempuri.org/ISearchApplicationAdminWebService/WaitForInProgressAnchorCrawlToComplete"
message="tns:ISearchApplicationAdminWebService_WaitForInProgressAnchorCrawlToComplete_InputMessage" />
            <wsdl:output
wsam:Action="http://tempuri.org/ISearchApplicationAdminWebService/WaitForInProgressAnchorCrawlToCompleteResponse"
message="tns:ISearchApplicationAdminWebService_WaitForInProgressAnchorCrawlToComplete_OutputMessage" />
        </wsdl:operation>
        <wsdl:operation name="IsAnchorCrawlIdle">
            <wsdl:input
wsam:Action="http://tempuri.org/ISearchApplicationAdminWebService/IsAnchorCrawlIdle"
message="tns:ISearchApplicationAdminWebService_IsAnchorCrawlIdle_InputMessage" />
            <wsdl:output
wsam:Action="http://tempuri.org/ISearchApplicationAdminWebService/IsAnchorCrawlIdleResponse"
```

```
message="tns:ISearchApplicationAdminWebService_IsAnchorCrawlIdle_OutputMessage"
/>
        </wsdl:operation>
        <wsdl:operation name="SetProperty">
            <wsdl:input
wsam:Action="http://tempuri.org/ISearchApplicationAdminWebService/SetProperty"
message="tns:ISearchApplicationAdminWebService_SetProperty_InputMessage" />
            <wsdl:output
wsam:Action="http://tempuri.org/ISearchApplicationAdminWebService/SetPropertyResponse"
message="tns:ISearchApplicationAdminWebService_SetProperty_OutputMessage" />
        </wsdl:operation>
        <wsdl:operation name="GetProperty">
            <wsdl:input
wsam:Action="http://tempuri.org/ISearchApplicationAdminWebService/GetProperty"
message="tns:ISearchApplicationAdminWebService_GetProperty_InputMessage" />
            <wsdl:output
wsam:Action="http://tempuri.org/ISearchApplicationAdminWebService/GetPropertyResponse"
message="tns:ISearchApplicationAdminWebService_GetProperty_OutputMessage" />
        </wsdl:operation>
        <wsdl:operation name="GetCrawlComponentRegistryVersion">
            <wsdl:input
wsam:Action="http://tempuri.org/ISearchApplicationAdminWebService/GetCrawlComponentRegistryVersion"
message="tns:ISearchApplicationAdminWebService_GetCrawlComponentRegistryVersion_InputMessage" />
            <wsdl:output
wsam:Action="http://tempuri.org/ISearchApplicationAdminWebService/GetCrawlComponentRegistryVersionResponse"
message="tns:ISearchApplicationAdminWebService_GetCrawlComponentRegistryVersion_OutputMessage" />
        </wsdl:operation>
        <wsdl:operation name="IncrementVersion">
            <wsdl:input
wsam:Action="http://tempuri.org/ISearchApplicationAdminWebService/IncrementVersion"
message="tns:ISearchApplicationAdminWebService_IncrementVersion_InputMessage" />
            <wsdl:output
wsam:Action="http://tempuri.org/ISearchApplicationAdminWebService/IncrementVersionResponse"
message="tns:ISearchApplicationAdminWebService_IncrementVersion_OutputMessage" />
        </wsdl:operation>
        <wsdl:operation name="SetDefaultGatheringAccount">
            <wsdl:input
wsam:Action="http://tempuri.org/ISearchApplicationAdminWebService/SetDefaultGatheringAccount"
message="tns:ISearchApplicationAdminWebService_SetDefaultGatheringAccount_InputMessage" />
```

```xml
            <wsdl:output
wsam:Action="http://tempuri.org/ISearchApplicationAdminWebService/SetDefaultGatherin
gAccountResponse"
message="tns:ISearchApplicationAdminWebService_SetDefaultGatheringAccount_OutputM
essage" />
          </wsdl:operation>
          <wsdl:operation name="GetContentState">
            <wsdl:input
wsam:Action="http://tempuri.org/ISearchApplicationAdminWebService/GetContentState"
message="tns:ISearchApplicationAdminWebService_GetContentState_InputMessage" />
            <wsdl:output
wsam:Action="http://tempuri.org/ISearchApplicationAdminWebService/GetContentStateRes
ponse"
message="tns:ISearchApplicationAdminWebService_GetContentState_OutputMessage" />
          </wsdl:operation>
          <wsdl:operation name="SetRetryLimit">
            <wsdl:input
wsam:Action="http://tempuri.org/ISearchApplicationAdminWebService/SetRetryLimit"
message="tns:ISearchApplicationAdminWebService_SetRetryLimit_InputMessage" />
            <wsdl:output
wsam:Action="http://tempuri.org/ISearchApplicationAdminWebService/SetRetryLimitRespo
nse" message="tns:ISearchApplicationAdminWebService_SetRetryLimit_OutputMessage"
/>
          </wsdl:operation>
          <wsdl:operation name="SetContentSourcesMetadata">
            <wsdl:input
wsam:Action="http://tempuri.org/ISearchApplicationAdminWebService/SetContentSources
Metadata"
message="tns:ISearchApplicationAdminWebService_SetContentSourcesMetadata_InputMes
sage" />
            <wsdl:output
wsam:Action="http://tempuri.org/ISearchApplicationAdminWebService/SetContentSources
MetadataResponse"
message="tns:ISearchApplicationAdminWebService_SetContentSourcesMetadata_OutputM
essage" />
          </wsdl:operation>
          <wsdl:operation name="CatalogPauseStatus">
            <wsdl:input
wsam:Action="http://tempuri.org/ISearchApplicationAdminWebService/CatalogPauseStatus
"
message="tns:ISearchApplicationAdminWebService_CatalogPauseStatus_InputMessage" />
            <wsdl:output
wsam:Action="http://tempuri.org/ISearchApplicationAdminWebService/CatalogPauseStatus
Response"
message="tns:ISearchApplicationAdminWebService_CatalogPauseStatus_OutputMessage"
/>
          </wsdl:operation>
          <wsdl:operation name="IsCatalogPauseCompleted">
```

```xml
            <wsdl:input
wsam:Action="http://tempuri.org/ISearchApplicationAdminWebService/IsCatalogPauseCompleted"
message="tns:ISearchApplicationAdminWebService_IsCatalogPauseCompleted_InputMessage" />
            <wsdl:output
wsam:Action="http://tempuri.org/ISearchApplicationAdminWebService/IsCatalogPauseCompletedResponse"
message="tns:ISearchApplicationAdminWebService_IsCatalogPauseCompleted_OutputMessage" />
          </wsdl:operation>
          <wsdl:operation name="StartRankingUpdate">
            <wsdl:input
wsam:Action="http://tempuri.org/ISearchApplicationAdminWebService/StartRankingUpdate"
message="tns:ISearchApplicationAdminWebService_StartRankingUpdate_InputMessage" />
            <wsdl:output
wsam:Action="http://tempuri.org/ISearchApplicationAdminWebService/StartRankingUpdateResponse"
message="tns:ISearchApplicationAdminWebService_StartRankingUpdate_OutputMessage" />
          </wsdl:operation>
          <wsdl:operation name="IsDeleteCrawlInProgress">
            <wsdl:input
wsam:Action="http://tempuri.org/ISearchApplicationAdminWebService/IsDeleteCrawlInProgress"
message="tns:ISearchApplicationAdminWebService_IsDeleteCrawlInProgress_InputMessage" />
            <wsdl:output
wsam:Action="http://tempuri.org/ISearchApplicationAdminWebService/IsDeleteCrawlInProgressResponse"
message="tns:ISearchApplicationAdminWebService_IsDeleteCrawlInProgress_OutputMessage" />
          </wsdl:operation>
          <wsdl:operation name="RefreshContentSource">
            <wsdl:input
wsam:Action="http://tempuri.org/ISearchApplicationAdminWebService/RefreshContentSource"
message="tns:ISearchApplicationAdminWebService_RefreshContentSource_InputMessage" />
            <wsdl:output
wsam:Action="http://tempuri.org/ISearchApplicationAdminWebService/RefreshContentSourceResponse"
message="tns:ISearchApplicationAdminWebService_RefreshContentSource_OutputMessage" />
          </wsdl:operation>
          <wsdl:operation name="RefreshAnchorContentSource">
            <wsdl:input
wsam:Action="http://tempuri.org/ISearchApplicationAdminWebService/RefreshAnchorCont
```

```
entSource"
message="tns:ISearchApplicationAdminWebService_RefreshAnchorContentSource_InputM
essage" />
                        <wsdl:output
wsam:Action="http://tempuri.org/ISearchApplicationAdminWebService/RefreshAnchorCont
entSourceResponse"
message="tns:ISearchApplicationAdminWebService_RefreshAnchorContentSource_Output
Message" />
          </wsdl:operation>
          <wsdl:operation name="EditContentSource">
                        <wsdl:input
wsam:Action="http://tempuri.org/ISearchApplicationAdminWebService/EditContentSource"
message="tns:ISearchApplicationAdminWebService_EditContentSource_InputMessage" />
                        <wsdl:output
wsam:Action="http://tempuri.org/ISearchApplicationAdminWebService/EditContentSource
Response"
message="tns:ISearchApplicationAdminWebService_EditContentSource_OutputMessage"
/>
          </wsdl:operation>
          <wsdl:operation name="GetPropagationInternal">
                        <wsdl:input
wsam:Action="http://tempuri.org/ISearchApplicationAdminWebService/GetPropagationInter
nal"
message="tns:ISearchApplicationAdminWebService_GetPropagationInternal_InputMessage
" />
                        <wsdl:output
wsam:Action="http://tempuri.org/ISearchApplicationAdminWebService/GetPropagationInter
nalResponse"
message="tns:ISearchApplicationAdminWebService_GetPropagationInternal_OutputMessag
e" />
          </wsdl:operation>
          <wsdl:operation name="RemoveQueryServer">
                        <wsdl:input
wsam:Action="http://tempuri.org/ISearchApplicationAdminWebService/RemoveQueryServe
r"
message="tns:ISearchApplicationAdminWebService_RemoveQueryServer_InputMessage"
/>
                        <wsdl:output
wsam:Action="http://tempuri.org/ISearchApplicationAdminWebService/RemoveQueryServe
rResponse"
message="tns:ISearchApplicationAdminWebService_RemoveQueryServer_OutputMessage"
/>
          </wsdl:operation>
          <wsdl:operation name="StartCrawl">
                        <wsdl:input
wsam:Action="http://tempuri.org/ISearchApplicationAdminWebService/StartCrawl"
message="tns:ISearchApplicationAdminWebService_StartCrawl_InputMessage" />
```

```xml
                    <wsdl:output
wsam:Action="http://tempuri.org/ISearchApplicationAdminWebService/StartCrawlResponse" message="tns:ISearchApplicationAdminWebService_StartCrawl_OutputMessage" />
        </wsdl:operation>
        <wsdl:operation name="PauseCrawl">
                    <wsdl:input
wsam:Action="http://tempuri.org/ISearchApplicationAdminWebService/PauseCrawl" message="tns:ISearchApplicationAdminWebService_PauseCrawl_InputMessage" />
                    <wsdl:output
wsam:Action="http://tempuri.org/ISearchApplicationAdminWebService/PauseCrawlResponse" message="tns:ISearchApplicationAdminWebService_PauseCrawl_OutputMessage" />
        </wsdl:operation>
        <wsdl:operation name="ResumeCrawl">
                    <wsdl:input
wsam:Action="http://tempuri.org/ISearchApplicationAdminWebService/ResumeCrawl" message="tns:ISearchApplicationAdminWebService_ResumeCrawl_InputMessage" />
                    <wsdl:output
wsam:Action="http://tempuri.org/ISearchApplicationAdminWebService/ResumeCrawlResponse" message="tns:ISearchApplicationAdminWebService_ResumeCrawl_OutputMessage" />
        </wsdl:operation>
        <wsdl:operation name="StopCrawl">
                    <wsdl:input
wsam:Action="http://tempuri.org/ISearchApplicationAdminWebService/StopCrawl" message="tns:ISearchApplicationAdminWebService_StopCrawl_InputMessage" />
                    <wsdl:output
wsam:Action="http://tempuri.org/ISearchApplicationAdminWebService/StopCrawlResponse"
message="tns:ISearchApplicationAdminWebService_StopCrawl_OutputMessage" />
        </wsdl:operation>
        <wsdl:operation name="SetContentSourceProperty">
                    <wsdl:input
wsam:Action="http://tempuri.org/ISearchApplicationAdminWebService/SetContentSourceProperty"
message="tns:ISearchApplicationAdminWebService_SetContentSourceProperty_InputMessage" />
                    <wsdl:output
wsam:Action="http://tempuri.org/ISearchApplicationAdminWebService/SetContentSourcePropertyResponse"
message="tns:ISearchApplicationAdminWebService_SetContentSourceProperty_OutputMessage" />
        </wsdl:operation>
        <wsdl:operation name="GetContentSourceProperty">
                    <wsdl:input
wsam:Action="http://tempuri.org/ISearchApplicationAdminWebService/GetContentSourceProperty"
message="tns:ISearchApplicationAdminWebService_GetContentSourceProperty_InputMessage" />
```

```xml
            <wsdl:output
wsam:Action="http://tempuri.org/ISearchApplicationAdminWebService/GetContentSourceProperty Response"
message="tns:ISearchApplicationAdminWebService_GetContentSourceProperty_OutputMessage" />
        </wsdl:operation>
        <wsdl:operation name="MountApp">
            <wsdl:input
wsam:Action="http://tempuri.org/ISearchApplicationAdminWebService/MountApp"
message="tns:ISearchApplicationAdminWebService_MountApp_InputMessage" />
            <wsdl:output
wsam:Action="http://tempuri.org/ISearchApplicationAdminWebService/MountAppResponse" message="tns:ISearchApplicationAdminWebService_MountApp_OutputMessage" />
        </wsdl:operation>
        <wsdl:operation name="DismountApp">
            <wsdl:input
wsam:Action="http://tempuri.org/ISearchApplicationAdminWebService/DismountApp"
message="tns:ISearchApplicationAdminWebService_DismountApp_InputMessage" />
            <wsdl:output
wsam:Action="http://tempuri.org/ISearchApplicationAdminWebService/DismountAppResponse"
message="tns:ISearchApplicationAdminWebService_DismountApp_OutputMessage" />
        </wsdl:operation>
        <wsdl:operation name="IsMounted">
            <wsdl:input
wsam:Action="http://tempuri.org/ISearchApplicationAdminWebService/IsMounted"
message="tns:ISearchApplicationAdminWebService_IsMounted_InputMessage" />
            <wsdl:output
wsam:Action="http://tempuri.org/ISearchApplicationAdminWebService/IsMountedResponse" message="tns:ISearchApplicationAdminWebService_IsMounted_OutputMessage" />
        </wsdl:operation>
        <wsdl:operation name="RemoveApp">
            <wsdl:input
wsam:Action="http://tempuri.org/ISearchApplicationAdminWebService/RemoveApp"
message="tns:ISearchApplicationAdminWebService_RemoveApp_InputMessage" />
            <wsdl:output
wsam:Action="http://tempuri.org/ISearchApplicationAdminWebService/RemoveAppResponse" message="tns:ISearchApplicationAdminWebService_RemoveApp_OutputMessage" />
        </wsdl:operation>
        <wsdl:operation name="GetGathererApplications">
            <wsdl:input
wsam:Action="http://tempuri.org/ISearchApplicationAdminWebService/GetGathererApplications"
message="tns:ISearchApplicationAdminWebService_GetGathererApplications_InputMessage" />
            <wsdl:output
wsam:Action="http://tempuri.org/ISearchApplicationAdminWebService/GetGathererApplicationsResponse"
```

```xml
message="tns:ISearchApplicationAdminWebService_GetGathererApplications_OutputMess
age" />
        </wsdl:operation>
    </wsdl:portType>
    <wsdl:binding name="CustomBinding_ISearchApplicationAdminWebService"
type="tns:ISearchApplicationAdminWebService">
        <soap:binding transport="http://schemas.xmlsoap.org/soap/http" />
        <wsdl:operation name="AddApp">
            <soap:operation
soapAction="http://tempuri.org/ISearchApplicationAdminWebService/AddApp"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="RemoveAllGathererApplications">
            <soap:operation
soapAction="http://tempuri.org/ISearchApplicationAdminWebService/RemoveAllGathererA
pplications" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="ValidateScheduleTrigger">
            <soap:operation
soapAction="http://tempuri.org/ISearchApplicationAdminWebService/ValidateScheduleTrig
ger" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="AddExtension">
            <soap:operation
soapAction="http://tempuri.org/ISearchApplicationAdminWebService/AddExtension"
style="document" />
            <wsdl:input>
                <soap:body use="literal" />
            </wsdl:input>
            <wsdl:output>
                <soap:body use="literal" />
```

```
    </wsdl:output>
  </wsdl:operation>
  <wsdl:operation name="RemoveExtension">
      <soap:operation
soapAction="http://tempuri.org/ISearchApplicationAdminWebService/RemoveExtension"
style="document" />
      <wsdl:input>
          <soap:body use="literal" />
      </wsdl:input>
      <wsdl:output>
          <soap:body use="literal" />
      </wsdl:output>
  </wsdl:operation>
  <wsdl:operation name="ClearExtensionList">
      <soap:operation
soapAction="http://tempuri.org/ISearchApplicationAdminWebService/ClearExtensionList"
style="document" />
      <wsdl:input>
          <soap:body use="literal" />
      </wsdl:input>
      <wsdl:output>
          <soap:body use="literal" />
      </wsdl:output>
  </wsdl:operation>
  <wsdl:operation name="GetExtensionList">
      <soap:operation
soapAction="http://tempuri.org/ISearchApplicationAdminWebService/GetExtensionList"
style="document" />
      <wsdl:input>
          <soap:body use="literal" />
      </wsdl:input>
      <wsdl:output>
          <soap:body use="literal" />
      </wsdl:output>
  </wsdl:operation>
  <wsdl:operation name="SetIsExtensionIncludeList">
      <soap:operation
soapAction="http://tempuri.org/ISearchApplicationAdminWebService/SetIsExtensionInclude
List" style="document" />
      <wsdl:input>
          <soap:body use="literal" />
      </wsdl:input>
      <wsdl:output>
          <soap:body use="literal" />
      </wsdl:output>
  </wsdl:operation>
  <wsdl:operation name="IsExtensionIncludeList">
```

```
        <soap:operation
soapAction="http://tempuri.org/ISearchApplicationAdminWebService/IsExtensionIncludeLis
t" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="AddCrawlRule">
            <soap:operation
soapAction="http://tempuri.org/ISearchApplicationAdminWebService/AddCrawlRule"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="AddAdvancedCrawlRule">
            <soap:operation
soapAction="http://tempuri.org/ISearchApplicationAdminWebService/AddAdvancedCrawlR
ule" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="RemoveCrawlRule">
            <soap:operation
soapAction="http://tempuri.org/ISearchApplicationAdminWebService/RemoveCrawlRule"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="GetCrawlRuleList">
            <soap:operation
soapAction="http://tempuri.org/ISearchApplicationAdminWebService/GetCrawlRuleList"
style="document" />
            <wsdl:input>
                <soap:body use="literal" />
```

```
            </wsdl:input>
            <wsdl:output>
                <soap:body use="literal" />
            </wsdl:output>
        </wsdl:operation>
        <wsdl:operation name="UpdateCrawlRule">
            <soap:operation
soapAction="http://tempuri.org/ISearchApplicationAdminWebService/UpdateCrawlRule"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="ActivateCrawlRule">
            <soap:operation
soapAction="http://tempuri.org/ISearchApplicationAdminWebService/ActivateCrawlRule"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="TestCrawlRule">
            <soap:operation
soapAction="http://tempuri.org/ISearchApplicationAdminWebService/TestCrawlRule"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="TestCrawlRules">
            <soap:operation
soapAction="http://tempuri.org/ISearchApplicationAdminWebService/TestCrawlRules"
style="document" />
            <wsdl:input>
                <soap:body use="literal" />
            </wsdl:input>
            <wsdl:output>
                <soap:body use="literal" />
            </wsdl:output>
        </wsdl:operation>
```

```
            <wsdl:operation name="SetCrawlRulePriority">
                <soap:operation
soapAction="http://tempuri.org/ISearchApplicationAdminWebService/SetCrawlRulePriority
" style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="SetCrawlRuleCredentials">
                <soap:operation
soapAction="http://tempuri.org/ISearchApplicationAdminWebService/SetCrawlRuleCredent
ials" style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="SetCrawlRuleCredentials2">
                <soap:operation
soapAction="http://tempuri.org/ISearchApplicationAdminWebService/SetCrawlRuleCredent
ials2" style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="GetSiteRestrictionList">
                <soap:operation
soapAction="http://tempuri.org/ISearchApplicationAdminWebService/GetSiteRestrictionList
" style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="AddSiteRestriction">
                <soap:operation
soapAction="http://tempuri.org/ISearchApplicationAdminWebService/AddSiteRestriction"
style="document" />
                <wsdl:input>
```

```
            <soap:body use="literal" />
        </wsdl:input>
        <wsdl:output>
            <soap:body use="literal" />
        </wsdl:output>
    </wsdl:operation>
    <wsdl:operation name="RemoveSiteRestriction">
        <soap:operation
soapAction="http://tempuri.org/ISearchApplicationAdminWebService/RemoveSiteRestrictio
n" style="document" />
        <wsdl:input>
            <soap:body usc="litcral" />
        </wsdl:input>
        <wsdl:output>
            <soap:body use="literal" />
        </wsdl:output>
    </wsdl:operation>
    <wsdl:operation name="AddSitePath">
        <soap:operation
soapAction="http://tempuri.org/ISearchApplicationAdminWebService/AddSitePath"
style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="RemoveSitePath">
        <soap:operation
soapAction="http://tempuri.org/ISearchApplicationAdminWebService/RemoveSitePath"
style="document" />
        <wsdl:input>
            <soap:body usc="litcral" />
        </wsdl:input>
        <wsdl:output>
            <soap:body use="literal" />
        </wsdl:output>
    </wsdl:operation>
    <wsdl:operation name="GetContentSources">
        <soap:operation
soapAction="http://tcmpuri.org/IScarchApplicationAdminWcbScrvicc/GctContcntSourccs"
style="document" />
        <wsdl:input>
            <soap:body use="literal" />
        </wsdl:input>
        <wsdl:output>
            <soap:body use="literal" />
        </wsdl:output>
```

```xml
        </wsdl:operation>
        <wsdl:operation name="AddContentSource">
            <soap:operation
soapAction="http://tempuri.org/ISearchApplicationAdminWebService/AddContentSource"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="RemoveContentSource">
            <soap:operation
soapAction="http://tempuri.org/ISearchApplicationAdminWebService/RemoveContentSource" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="GetCrawlMappings">
            <soap:operation
soapAction="http://tempuri.org/ISearchApplicationAdminWebService/GetCrawlMappings"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="AddCrawlMapping">
            <soap:operation
soapAction="http://tempuri.org/ISearchApplicationAdminWebService/AddCrawlMapping"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="RemoveCrawlMapping">
            <soap:operation
soapAction="http://tempuri.org/ISearchApplicationAdminWebService/RemoveCrawlMapping" style="document" />
```

```
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="ListKnownLotusNotesDatabases">
            <soap:operation
soapAction="http://tempuri.org/ISearchApplicationAdminWebService/ListKnownLotusNote
sDatabases" style="document" />
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="DisableCrawlComponent">
            <soap:operation
soapAction="http://tempuri.org/ISearchApplicationAdminWebService/DisableCrawlCompon
ent" style="document" />
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="GetConnectorProperty">
            <soap:operation
soapAction="http://tempuri.org/ISearchApplicationAdminWebService/GetConnectorPropert
y" style="document" />
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="SetConnectorProperty">
            <soap:operation
soapAction="http://tempuri.org/ISearchApplicationAdminWebService/SetConnectorProperty
" style="document" />
            <wsdl:input>
                    <soap:body use="literal" />
            </wsdl:input>
            <wsdl:output>
                    <soap:body use="literal" />
```

```
            </wsdl:output>
        </wsdl:operation>
        <wsdl:operation name="IncreaseRegistryVersion">
            <soap:operation
soapAction="http://tempuri.org/ISearchApplicationAdminWebService/IncreaseRegistryVersi
on" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="ValidateApplicationPath">
            <soap:operation
soapAction="http://tempuri.org/ISearchApplicationAdminWebService/ValidateApplicationP
ath" style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="GetVersion">
            <soap:operation
soapAction="http://tempuri.org/ISearchApplicationAdminWebService/GetVersion"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="GetRegistryVersion">
            <soap:operation
soapAction="http://tempuri.org/ISearchApplicationAdminWebService/GetRegistryVersion"
style="document" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="IsCaseSensitiveURL">
```

```xml
            <soap:operation
soapAction="http://tempuri.org/ISearchApplicationAdminWebService/IsCaseSensitiveURL"
style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="ReEncryptExistingPasswords">
                <soap:operation
soapAction="http://tempuri.org/ISearchApplicationAdminWebService/ReEncryptExistingPas
swords" style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="WaitForInProgressAnchorCrawlToComplete">
                <soap:operation
soapAction="http://tempuri.org/ISearchApplicationAdminWebService/WaitForInProgressAn
chorCrawlToComplete" style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="IsAnchorCrawlIdle">
                <soap:operation
soapAction="http://tempuri.org/ISearchApplicationAdminWebService/IsAnchorCrawlIdle"
style="document" />
                <wsdl:input>
                    <soap:body use="literal" />
                </wsdl:input>
                <wsdl:output>
                    <soap:body use="literal" />
                </wsdl:output>
            </wsdl:operation>
            <wsdl:operation name="SetProperty">
                <soap:operation
soapAction="http://tempuri.org/ISearchApplicationAdminWebService/SetProperty"
style="document" />
                <wsdl:input>
                    <soap:body use="literal" />
```

```xml
        </wsdl:input>
        <wsdl:output>
            <soap:body use="literal" />
        </wsdl:output>
    </wsdl:operation>
    <wsdl:operation name="GetProperty">
        <soap:operation soapAction="http://tempuri.org/ISearchApplicationAdminWebService/GetProperty" style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="GetCrawlComponentRegistryVersion">
        <soap:operation soapAction="http://tempuri.org/ISearchApplicationAdminWebService/GetCrawlComponentRegistryVersion" style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="IncrementVersion">
        <soap:operation soapAction="http://tempuri.org/ISearchApplicationAdminWebService/IncrementVersion" style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="SetDefaultGatheringAccount">
        <soap:operation soapAction="http://tempuri.org/ISearchApplicationAdminWebService/SetDefaultGatheringAccount" style="document" />
        <wsdl:input>
            <soap:body use="literal" />
        </wsdl:input>
        <wsdl:output>
            <soap:body use="literal" />
        </wsdl:output>
    </wsdl:operation>
```

```
                <wsdl:operation name="GetContentState">
                    <soap:operation
soapAction="http://tempuri.org/ISearchApplicationAdminWebService/GetContentState"
style="document" />
                    <wsdl:input>
                        <soap:body use="literal" />
                    </wsdl:input>
                    <wsdl:output>
                        <soap:body use="literal" />
                    </wsdl:output>
                </wsdl:operation>
                <wsdl:operation name="SetRetryLimit">
                    <soap:operation
soapAction="http://tempuri.org/ISearchApplicationAdminWebService/SetRetryLimit"
style="document" />
                    <wsdl:input>
                        <soap:body use="literal" />
                    </wsdl:input>
                    <wsdl:output>
                        <soap:body use="literal" />
                    </wsdl:output>
                </wsdl:operation>
                <wsdl:operation name="SetContentSourcesMetadata">
                    <soap:operation
soapAction="http://tempuri.org/ISearchApplicationAdminWebService/SetContentSourcesMe
tadata" style="document" />
                    <wsdl:input>
                        <soap:body use="literal" />
                    </wsdl:input>
                    <wsdl:output>
                        <soap:body use="literal" />
                    </wsdl:output>
                </wsdl:operation>
                <wsdl:operation name="CatalogPauseStatus">
                    <soap:operation
soapAction="http://tempuri.org/ISearchApplicationAdminWebService/CatalogPauseStatus"
style="document" />
                    <wsdl:input>
                        <soap:body use="literal" />
                    </wsdl:input>
                    <wsdl:output>
                        <soap:body use="literal" />
                    </wsdl:output>
                </wsdl:operation>
                <wsdl:operation name="IsCatalogPauseCompleted">
                    <soap:operation
soapAction="http://tempuri.org/ISearchApplicationAdminWebService/IsCatalogPauseCompl
eted" style="document" />
                    <wsdl:input>
```

```xml
            <soap:body use="literal" />
        </wsdl:input>
        <wsdl:output>
            <soap:body use="literal" />
        </wsdl:output>
    </wsdl:operation>
    <wsdl:operation name="StartRankingUpdate">
        <soap:operation soapAction="http://tempuri.org/ISearchApplicationAdminWebService/StartRankingUpdate" style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="IsDeleteCrawlInProgress">
        <soap:operation soapAction="http://tempuri.org/ISearchApplicationAdminWebService/IsDeleteCrawlInProgress" style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="RefreshContentSource">
        <soap:operation soapAction="http://tempuri.org/ISearchApplicationAdminWebService/RefreshContentSource" style="document" />
        <wsdl:input>
            <soap:body use="literal" />
        </wsdl:input>
        <wsdl:output>
            <soap:body use="literal" />
        </wsdl:output>
    </wsdl:operation>
    <wsdl:operation name="RefreshAnchorContentSource">
        <soap:operation soapAction="http://tempuri.org/ISearchApplicationAdminWebService/RefreshAnchorContentSource" style="document" />
        <wsdl:input>
            <soap:body use="literal" />
        </wsdl:input>
        <wsdl:output>
            <soap:body use="literal" />
        </wsdl:output>
```

```xml
      </wsdl:operation>
      <wsdl:operation name="EditContentSource">
        <soap:operation soapAction="http://tempuri.org/ISearchApplicationAdminWebService/EditContentSource" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="GetPropagationInternal">
        <soap:operation soapAction="http://tempuri.org/ISearchApplicationAdminWebService/GetPropagationInternal" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="RemoveQueryServer">
        <soap:operation soapAction="http://tempuri.org/ISearchApplicationAdminWebService/RemoveQueryServer" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="StartCrawl">
        <soap:operation soapAction="http://tempuri.org/ISearchApplicationAdminWebService/StartCrawl" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="PauseCrawl">
        <soap:operation soapAction="http://tempuri.org/ISearchApplicationAdminWebService/PauseCrawl" style="document" />
```

```xml
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="ResumeCrawl">
            <soap:operation
soapAction="http://tempuri.org/ISearchApplicationAdminWebService/ResumeCrawl" style="document" />
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="StopCrawl">
            <soap:operation
soapAction="http://tempuri.org/ISearchApplicationAdminWebService/StopCrawl" style="document" />
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="SetContentSourceProperty">
<soap:operation
soapAction="http://tempuri.org/ISearchApplicationAdminWebService/SetContentSourceProperty" style="document" />
            <wsdl:input>
                    <soap:body use="literal" />
            </wsdl:input>
            <wsdl:output>
                    <soap:body use="literal" />
            </wsdl:output>
    </wsdl:operation>
    <wsdl:operation name="GetContentSourceProperty">
            <soap:operation
soapAction="http://tempuri.org/ISearchApplicationAdminWebService/GetContentSourceProperty" style="document" />
            <wsdl:input>
                    <soap:body use="literal" />
            </wsdl:input>
            <wsdl:output>
                    <soap:body use="literal" />
```

```xml
        </wsdl:output>
      </wsdl:operation>
      <wsdl:operation name="MountApp">
        <soap:operation soapAction="http://tempuri.org/ISearchApplicationAdminWebService/MountApp" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="DismountApp">
        <soap:operation soapAction="http://tempuri.org/ISearchApplicationAdminWebService/DismountApp" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="IsMounted">
        <soap:operation soapAction="http://tempuri.org/ISearchApplicationAdminWebService/IsMounted" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="RemoveApp">
        <soap:operation soapAction="http://tempuri.org/ISearchApplicationAdminWebService/RemoveApp" style="document" />
        <wsdl:input>
          <soap:body use="literal" />
        </wsdl:input>
        <wsdl:output>
          <soap:body use="literal" />
        </wsdl:output>
      </wsdl:operation>
      <wsdl:operation name="GetGathererApplications">
```

```xml
<soap:operation soapAction="http://tempuri.org/ISearchApplicationAdminWebService/GetGathererApplications" style="document" />
        <wsdl:input>
                <soap:body use="literal" />
        </wsdl:input>
        <wsdl:output>
                <soap:body use="literal" />
        </wsdl:output>
    </wsdl:operation>
  </wsdl:binding>
</wsdl:definitions>
```

What is claimed is:

1. A computer-implemented method for configuring a crawl function of a crawler application, the method comprising:
obtaining a current version of the crawler application;
presenting a user interface to enable the configuring of the crawl function;
receiving input data for configuring the crawl function, wherein the input data comprises data to configure the crawl function to create a content source and a new rule with two or more parameters defined for the new rule, wherein at least one of the parameters requires the crawl function to execute crawling in a case-sensitive manner;
formatting the input data into a crawler configuration request message;
transmitting the crawler configuration request message to a protocol server;
receiving a crawler configuration response message from the protocol server;
wherein the crawler configuration response message comprises a fault message indicating that the crawler configuration request message does not satisfy criteria for configuring the crawl function when the crawler configuration request message does not satisfy criteria for configuring the crawl function; and
wherein the crawler configuration request message is allowed when the crawler configuration request message does satisfy criteria for configuring the crawl function.

2. The computer-implemented method of claim 1, wherein the formatting occurs according to a Simple Object Access Protocol (SOAP).

3. The computer-implemented method of claim 1, wherein the crawler application is part of a search application hosted by the protocol server.

4. The computer-implemented method of claim 1, wherein the crawler configuration request message is defined in accordance with a Search Service Administration Web Service protocol as SearchApplicationAdminWebService_AddAdvancedCrawlRule_InputMessage.

5. The computer-implemented method of claim 1, wherein the crawler configuration response message is defined in accordance with a Search Service Administration Web Service protocol as SearchApplicationAdminWebService_AddAdvancedCrawlRule_OutputMessage.

6. The computer-implemented method of claim 1, wherein formatting and syntax of the crawler configuration request message is communicated in accordance with a Web Services Description Language (WSDL) operation.

7. The computer-implemented method of claim 1, wherein the crawl function executes a crawling process on the World Wide Web.

8. In a computer system, a computer-implemented method of configuring a crawl function of a crawler application, the method comprising the steps of:
receiving an indication, at a protocol client on a client computer, to obtain a current version of the crawler application;
presenting, by the protocol client, a user interface at the client computer to allow configuring of the crawl function;
receiving, by the protocol client, input data for configuring the crawl function at a protocol server, wherein the input data comprises data to configure the authentication method and crawl account for a crawl rule;
formatting, by the protocol client, the input data into a crawler configuration request message;
transmitting the crawler configuration request message to the protocol server;
receiving a crawler configuration response message from the protocol server;
wherein the crawler configuration response message comprises a fault message indicating that the crawler configuration request message does not satisfy criteria for configuring the crawl function when the crawler configuration request message does not satisfy criteria for configuring the crawl function; and
wherein the crawler configuration request message is allowed when the crawler configuration request message does satisfy criteria for configuring the crawl function.

9. The computer system of claim 8, further comprising:
transmitting a search request to a search engine at the protocol server; and
receiving a list of electronic documents indexed at the protocol server.

10. The computer system of claim 8, wherein the authentication information comprises a password.

11. The computer system of claim 8, wherein the crawler configuration request message is defined in accordance with a Search Service Administration Web Service protocol as ISearchApplicationAdminWebService_SetCrawlRuleCredentials2_InputMessage.

* * * * *